US012667951B2

(12) United States Patent (10) Patent No.: US 12,667,951 B2
Asahi et al. (45) Date of Patent: Jun. 30, 2026

(54) POWER TOOL

(71) Applicant: MAKITA CORPORATION, Anjo (JP)

(72) Inventors: Miyuki Asahi, Anjo (JP); Yasuhito Kawai, Anjo (JP); Tomoya Hattori, Anjo (JP); Yuta Suzuki, Anjo (JP); Haruki Tejima, Anjo (JP); Tokuo Hirabayashi, Anjo (JP); Tomoyuki Kondo, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/787,219

(22) Filed: Jul. 29, 2024

(65) Prior Publication Data

US 2025/0073885 A1 Mar. 6, 2025

(30) Foreign Application Priority Data

| Aug. 29, 2023 | (JP) | 2023-139076 |
| Aug. 29, 2023 | (JP) | 2023-139077 |
| Aug. 29, 2023 | (JP) | 2023-139303 |
| Aug. 29, 2023 | (JP) | 2023-139304 |

(51) Int. Cl.
| *B25F 5/02* | (2006.01) |
| *B25B 23/00* | (2006.01) |
| *B25F 5/00* | (2006.01) |
| *H02K 5/04* | (2006.01) |
| *H02K 7/102* | (2006.01) |
| *H02K 11/30* | (2016.01) |
| *B25B 21/02* | (2006.01) |
| *B25B 23/18* | (2006.01) |

(52) U.S. Cl.
CPC ............... *B25F 5/02* (2013.01); *B25F 5/001* (2013.01); *H02K 5/04* (2013.01); *H02K 7/102* (2013.01); *H02K 11/30* (2016.01); *B25B 21/02* (2013.01); *B25B 23/18* (2013.01)

(58) Field of Classification Search
CPC ................................... B25F 5/02; B25B 21/02
See application file for complete search history.

(56) References Cited

U.S. PATENT DOCUMENTS

| 8,169,298 B2 * | 5/2012 | Wiesner | ............. G08B 13/1409 |
| | | | 340/10.33 |
| 8,264,374 B2 * | 9/2012 | Obatake | .............. B25B 23/0078 |
| | | | 701/41 |

(Continued)

FOREIGN PATENT DOCUMENTS

JP 2023-020813 A 2/2023

*Primary Examiner* — Lucas E. A. Palmer
(74) *Attorney, Agent, or Firm* — Oliff PLC

(57) ABSTRACT

A power tool includes a motor, an output part, a housing, a control circuit board, and a panel. The motor includes a rotor rotatable about a motor rotation axis extending in a front-rear direction. The output part is disposed forward of the motor and is rotated by a rotational force of the rotor. The housing includes: a motor housing part that houses the motor; a grip part that extends downward from the motor housing part; and a battery holding part that is connected to a lower end of the grip part. The control circuit board is housed in the grip part and is configured to control the motor. The panel is disposed at a rear portion of the battery holding part and is manipulated to change a control method of the motor.

20 Claims, 47 Drawing Sheets

(56) References Cited

U.S. PATENT DOCUMENTS

| 9,302,376 B2 * | 4/2016 | Agehara | B25F 5/021 |
| 9,664,387 B2 * | 5/2017 | Gerold | B25C 1/08 |
| 10,850,380 B2 * | 12/2020 | Huber | F16D 48/06 |
| 11,014,224 B2 * | 5/2021 | Dey, IV | F16F 9/535 |
| 2009/0251330 A1 * | 10/2009 | Gerold | B25C 1/08 |
| | | | 455/466 |
| 2014/0151079 A1 * | 6/2014 | Furui | B25F 5/02 |
| | | | 173/171 |
| 2016/0301340 A1 * | 10/2016 | Najjar | B25F 5/001 |
| 2017/0151657 A1 * | 6/2017 | Nagasaka | H01H 13/08 |
| 2017/0173768 A1 * | 6/2017 | Dey, IV | B25B 21/02 |
| 2018/0222022 A1 * | 8/2018 | Kumagai | B25D 11/104 |
| 2019/0111551 A1 * | 4/2019 | Kato | B25B 21/02 |
| 2019/0232469 A1 * | 8/2019 | Carlson | B25F 5/02 |
| 2020/0384627 A1 * | 12/2020 | Numata | B24B 23/005 |
| 2021/0234225 A1 * | 7/2021 | Takeda | B25D 17/00 |
| 2022/0297279 A1 * | 9/2022 | Abbott | B25B 21/00 |
| 2023/0036348 A1 * | 2/2023 | Zhao | B25B 21/02 |
| 2023/0182271 A1 * | 6/2023 | Zhao | B25B 21/026 |
| | | | 173/93 |
| 2023/0364756 A1 * | 11/2023 | Hozumi | F21V 29/503 |
| 2023/0366536 A1 * | 11/2023 | Hozumi | B25F 5/001 |
| 2024/0308034 A1 * | 9/2024 | Kamiya | B25B 21/026 |
| 2025/0001561 A1 * | 1/2025 | Ito | F21V 5/043 |
| 2025/0065487 A1 * | 2/2025 | Teng | B25B 21/02 |
| 2025/0073885 A1 * | 3/2025 | Asahi | B25F 5/006 |

* cited by examiner

REAR ← → FRONT

DOWN

FRONT

LEFT

RIGHT

REAR

DOWN

23

70

72

19A

53

73

55

57

UP

REAR

FRONT

DOWN

REAR ← → FRONT

DOWN

POWER TOOL

CROSS-REFERENCE TO RELATED APPLICATION(S)

The present application claims priority to and incorporates by reference the entire contents of Japanese Patent Applications No. 2023-139076, No. 2023-139077, No. 2023-139303 and No. 2023-139304, filed in Japan on Aug. 29, 2023.

BACKGROUND OF THE INVENTION

1. Field of the Invention

The technology disclosed in the present specification relates to a power tool.

2. Description of the Related Art

In a technical field related to a power tool, a power tool including an operation-and-display part as disclosed in JP 2023-020813 A is known.

SUMMARY OF THE INVENTION

One non-limiting object of the present teachings to disclose techniques for reducing the number of components of a power tool. Another non-limiting object of the present teachings is to disclose techniques for suppressing an increase in size of a power tool. Still another non-limiting object of the present teachings is to disclose techniques for improving visibility of a panel of an operation-and-display part and improve durability of the panel of the operation-and-display part.

According to one aspect of the present teachings, a power tool may include: a motor; a battery mounting part, which includes a body-side terminal through which electric power from a battery is supplied; and a panel that is manipulated to change a control method of the motor. A resin part that supports the panel may include the body-side terminal.

According to another aspect of the present teachings, a power tool may include: a motor; a control circuit board configured to control the motor; and a panel that is manipulated to change a control method of the motor. A resin part that supports the panel may include the control circuit board.

According to still another aspect of the present teachings, a power tool may include a motor, an output part, a housing, a control circuit board, and a panel. The motor may include a rotor rotatable about a motor rotation axis extending in a front-rear direction. The output part may be disposed forward of the motor and rotated by a rotational force of the rotor. The housing may include: a motor housing part that houses the motor; a grip part that extends downward from the motor housing part; and a battery holding part that is connected to a lower end of the grip part. The control circuit board may be housed in the grip part and configured to control the motor. The panel may be disposed at a rear portion of the battery holding part and manipulated to change a control method of the motor.

According to still another aspect of the present teachings, a power tool may include: a motor; a motor housing part that houses the motor; a grip part that extends from the motor housing part; a battery holding part to which a battery for supplying electric power to the motor is attached; an elastic body that is disposed between the grip part and the battery holding part; and a panel, which is disposed at a rear portion the battery holding part and is manipulated to change a control method of the motor.

Additional aspects, objects, embodiments, and advantages of the present teachings will become apparent upon reading the following detailed description in view of the appended drawings and claims.

BRIEF DESCRIPTION OF THE DRAWINGS

FIG. 13 is a block diagram illustrating the power tool according to the embodiment;

FIG. 32 is a rear perspective view illustrating a lower portion of a power tool according to an embodiment;

FIG. 40 is a front perspective view illustrating a power tool according to an embodiment;

DETAILED DESCRIPTION OF THE EMBODIMENTS

Figure 1:
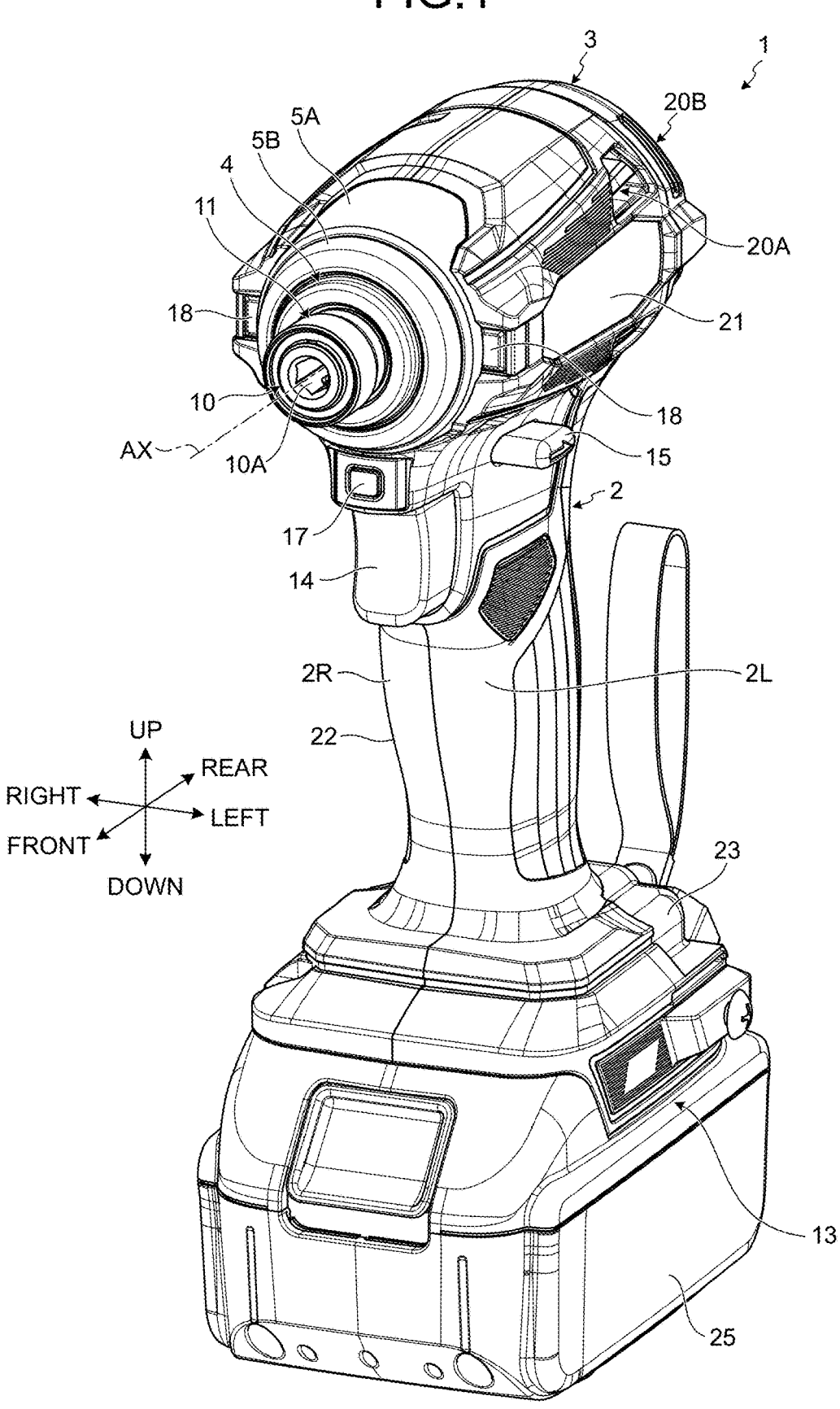
FIG. 1 is a front perspective view illustrating a power tool according to an embodiment.

In one or more embodiments, a power tool may include: a motor; a battery mounting part, which includes a body-side terminal through which electric power from a battery is supplied; and a panel that is manipulated to change a control method of the motor. A resin part that supports the panel may include the body-side terminal. The resin part that supports the panel may hold the body-side terminal. The resin part that supports the panel may be provided separately from the body-side terminal. The resin part that supports the panel may be integrated with the body-side terminal.

In the above configuration, the panel and the body-side terminal of the battery mounting part are supported by one resin part, so that the number of components of the power tool is reduced. Since the number of components of the power tool is reduced, the number of assembly processes of the power tool is reduced.

In one or more embodiments, a power tool may include: a motor; a control circuit board configured to control the motor; and a panel that is manipulated to change a control method of the motor. A resin part that supports the panel may include the control circuit board. The resin part that supports the panel may hold the control circuit board. The resin part that supports the panel may be provided separately from the control circuit board. The resin part that supports the panel may be integrated with the control circuit board.

In the above configuration, the panel and the control circuit board are supported by one resin part, so that the number of components of the power tool is reduced. Since the number of components of the power tool is reduced, the number of assembly processes of the power tool is reduced.

In one or more embodiments, a power tool may include a motor, an output part, a housing, a control circuit board, and a panel. The motor may include a rotor rotatable about a motor rotation axis extending in a front-rear direction. The output part may be disposed forward of the motor and rotated by a rotational force of the rotor. The housing may include: a motor housing part that houses the motor; a grip part that extends downward from the motor housing part; and a battery holding part that is connected to a lower end of the grip part. The control circuit board may be housed in the grip part and configured to control the motor. The panel may be disposed at a rear portion of the battery holding part and manipulated to change a control method of the motor.

In the above configuration, the control circuit board is housed in the grip part, so that an increase in size of the power tool is suppressed.

In one or more embodiments, a power tool may include: a motor; a motor housing part that houses the motor; a grip part that extends from the motor housing part; a battery holding part to which a battery for supplying electric power to the motor is attached; an elastic body that is disposed between the grip part and the battery holding part; and a panel, which is disposed at a rear portion the battery holding part and is manipulated to change a control method of the motor.

In the above configuration, vibration of the motor is suppressed from being transmitted to the panel by the elastic body. Therefore, visibility of the panel is improved, and durability of the panel is improved.

In one or more embodiments, the power tool may further include a light disposed on a front portion of the battery holding part.

In the above configuration, a work target of the power tool is illuminated by light emitted from the light.

In one or more embodiments, the power tool may further include a resin part that supports the panel.

In the above configuration, the panel is appropriately supported.

In one or more embodiments, the panel may be in contact with the resin part.

In the above configuration, the panel is directly supported by the resin part, so that the number of components of the power tool is reduced.

In one or more embodiments, the panel may be fixed to the resin part.

In the above configuration, relative movement between the panel and the resin part is suppressed.

In one or more embodiments, the panel may face a circuit board. The resin part may hold the circuit board.

In the above configuration, the resin part supports not only the panel and the body-side terminal but also the circuit board, so that the number of components of the power tool is reduced.

In one or more embodiments, the panel may include an elastically deformable part. The circuit board may support a switch element manipulated by the elastically deformable part being pressed.

In the above configuration, the elastically deformable part is pressed to operate the switch element, thereby changing the control method of the motor.

In one or more embodiments, the panel may include an optically transmissive part. The circuit board may support a light emitting element that irradiates the optically transmissive part with light.

In the above configuration, a light emission state of the light emitting element is changed according to the change of the control method of the motor, so that a user can visually recognize that the control method of the motor is changed.

In one or more embodiments, a power tool may include: a control circuit board configured to control a motor; and a housing that houses the control circuit board. The housing may include a left housing and a right housing fixed to the left housing by a screw. The screw may pass through the resin part.

In the above configuration, since the screw penetrates through the resin part without passing through the outside of the resin part, an increase in size of the power tool is suppressed. Also in the above configuration, it is easy to assemble the housing.

In one or more embodiments, the housing may include: a motor housing part that houses the motor; a grip part that extends downward from the motor housing part; and a battery holding part that is connected to a lower end of the grip part. The battery mounting part may be disposed at a lower portion of the battery holding part. The panel may be disposed on the battery holding part.

In the above configuration, the user can easily operate the panel.

In one or more embodiments, the power tool may further include a trigger lever provided at a front portion of the grip part and manipulated to start the motor. The panel may be disposed at a rear portion of the battery holding part.

In the above configuration, since the panel is disposed at the rear portion of the battery holding part, the user can operate and view the panel while a front portion of the power tool remains oriented toward the work target.

In one or more embodiments, the panel may be disposed in a recess provided in the battery holding part.

In the above configuration, the panel does not protrude from a surface of the battery holding part, the user can easily handle the power tool.

In one or more embodiments, the center of the panel may coincide with the center of the battery holding part in a left-right direction.

In the above configuration, a weight balance of the power tool in the left-right direction is improved. In addition, manipulativeness (operability) and visibility of the panel are improved.

In one or more embodiments, the panel may be disposed rearward of a rear end of the grip part.

In the above configuration, a weight balance of the power tool in the front-rear direction is improved. In addition, the manipulativeness (operability) and visibility of the panel are improved.

In one or more embodiments, the panel may be disposed rearward of a rear end of the motor housing part.

In the above configuration, the weight balance of the power tool in the front-rear direction is improved. In addition, the manipulativeness (operability) and visibility of the panel are improved.

In one or more embodiments, the control circuit board may be housed in the battery holding part.

In the above configuration, a distance between the panel and the control circuit board is shortened. Therefore, it is possible to suppress an increase in size and complexity of a connection structure between the panel and the control circuit board.

In one or more embodiments, a rear end of the control circuit board may be positioned rearward of a rear end of the grip part.

In the above configuration, the weight balance of the power tool in the front-rear direction is improved.

In one or more embodiments, the panel may be disposed rearward of the control circuit board.

In the above configuration, the panel and the control circuit board do not overlap each other, so that an increase in size of the battery holding part is suppressed, and the weight balance of the power tool is improved.

In one or more embodiments, a surface of the panel may be inclined downward as it goes rearward.

In the above configuration, the manipulativeness (operability) and visibility of the panel are improved.

In one or more embodiments, a dimension of the panel in a left-right direction may be larger than a dimension of the panel in an up-down direction.

In the above configuration, a shape of the panel is long in the left-right direction, so that manipulativeness (operability) and visibility of an operation-and-display part are improved.

In one or more embodiments, a surface of the circuit board may be downward as it goes rearward.

In the above configuration, an increase in size of the power tool is suppressed. In addition, the manipulativeness (operability) and visibility of the panel are improved.

In one or more embodiments, a surface of the control circuit board may be parallel to a motor rotation axis.

In the above configuration, since the circuit board and the control circuit board are arranged to face different directions, an increase in size of the power tool is suppressed.

In one or more embodiments, the panel may be disposed rearward of a rear end of the motor housing part.

In the above configuration, the weight balance of the power tool in the front-rear direction is improved. In addition, the manipulativeness (operability) and visibility of the panel are improved.

In one or more embodiments, a power tool may include a motor, a speed reducing mechanism, an output part, a housing, a control circuit board, and a panel. The motor may include a rotor rotatable about a motor rotation axis extending in a front-rear direction. The speed reducing mechanism may be configured to decelerate rotation input from the motor. The output part may be configured to be driven with an output of the speed reducing mechanism. The housing may include: a motor housing part that houses the motor; a grip part that extends downward from the motor housing part; a support part that is disposed forward of the grip part; and a battery holding part, which is disposed downward of the support part and to which a battery pack is connected by being slid. The control circuit board may be housed in the housing and may be configured to control the motor. The panel may be disposed at either or both of a lower portion of the grip part and a rear portion of the battery holding part and manipulated to change a control method of the motor.

The panel may be disposed only at the lower portion of the grip part, or may be disposed only at the rear portion of the battery holding part.

Hereinafter, embodiments will be described with reference to the drawings. In the embodiments, a positional relationship of each part will be described using terms including left, right, front, rear, up, and down. The terms indicate relative positions or directions with respect to the center of a power tool 1. The power tool 1 includes a motor 6 as a power source.

In the embodiments, a direction parallel to a motor rotation axis AX of the motor 6 is referred to as an axial direction as appropriate, a direction around the motor rotation axis AX is referred to as a circumferential direction or a rotation direction as appropriate, and a radiation direction of the motor rotation axis AX is referred to as a radial direction as appropriate.

The motor rotation axis AX extends in a front-rear direction. One side in the axial direction is a front side, and the other side in the axial direction is a rear side. In the radial direction, a position close to or a direction approaching the motor rotation axis AX is referred to as an inner side in the radial direction as appropriate, and a position far from or a direction away from the motor rotation axis AX is referred to as an outer side in the radial direction as appropriate.

First Embodiment

A first embodiment will be described.

Power Tool

Figure 2:
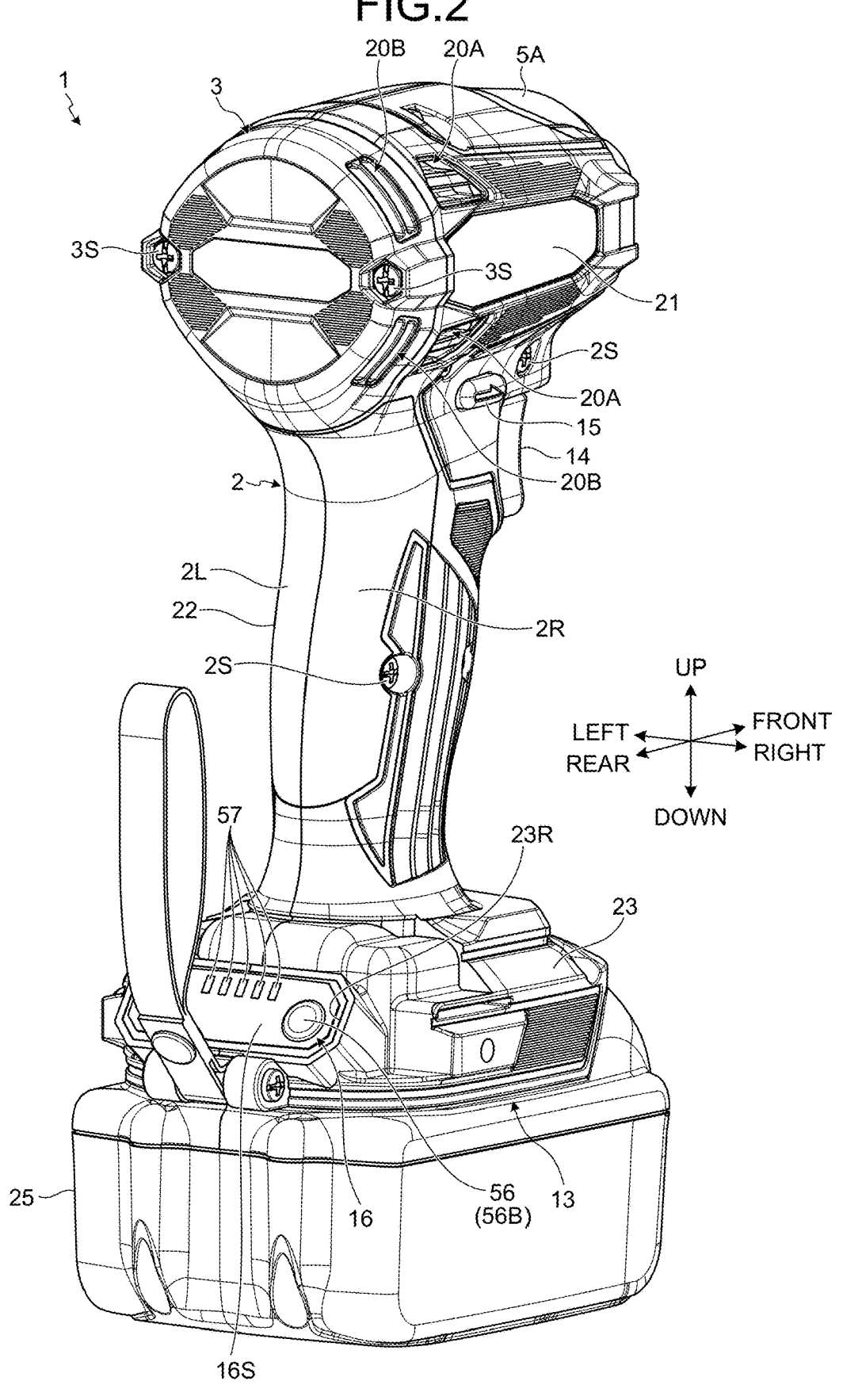
FIG. 2 is a rear perspective view illustrating the power tool according to the embodiment.
Figure 3:
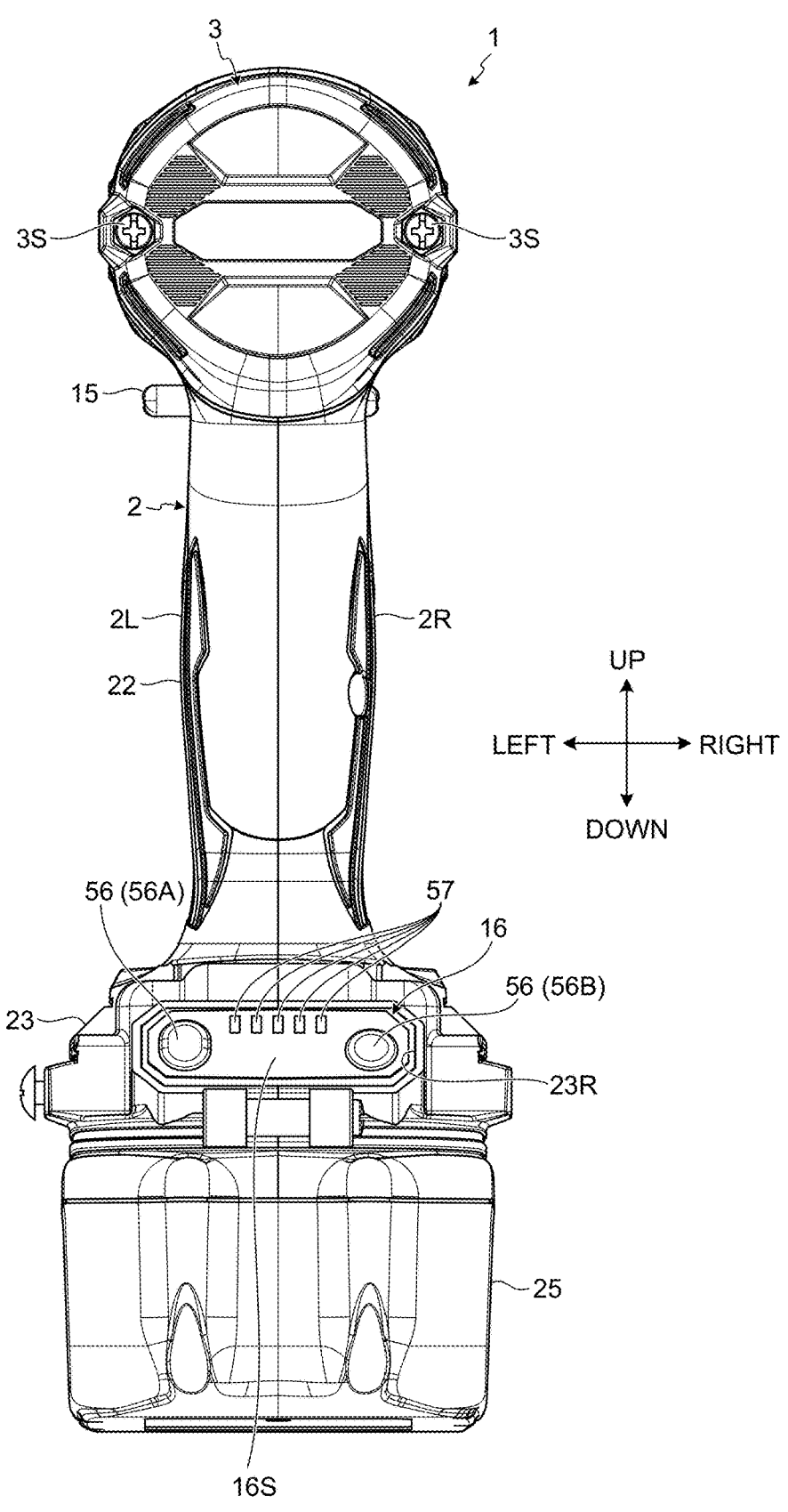
FIG. 3 is a rear view illustrating the power tool according to the embodiment.
Figure 4:
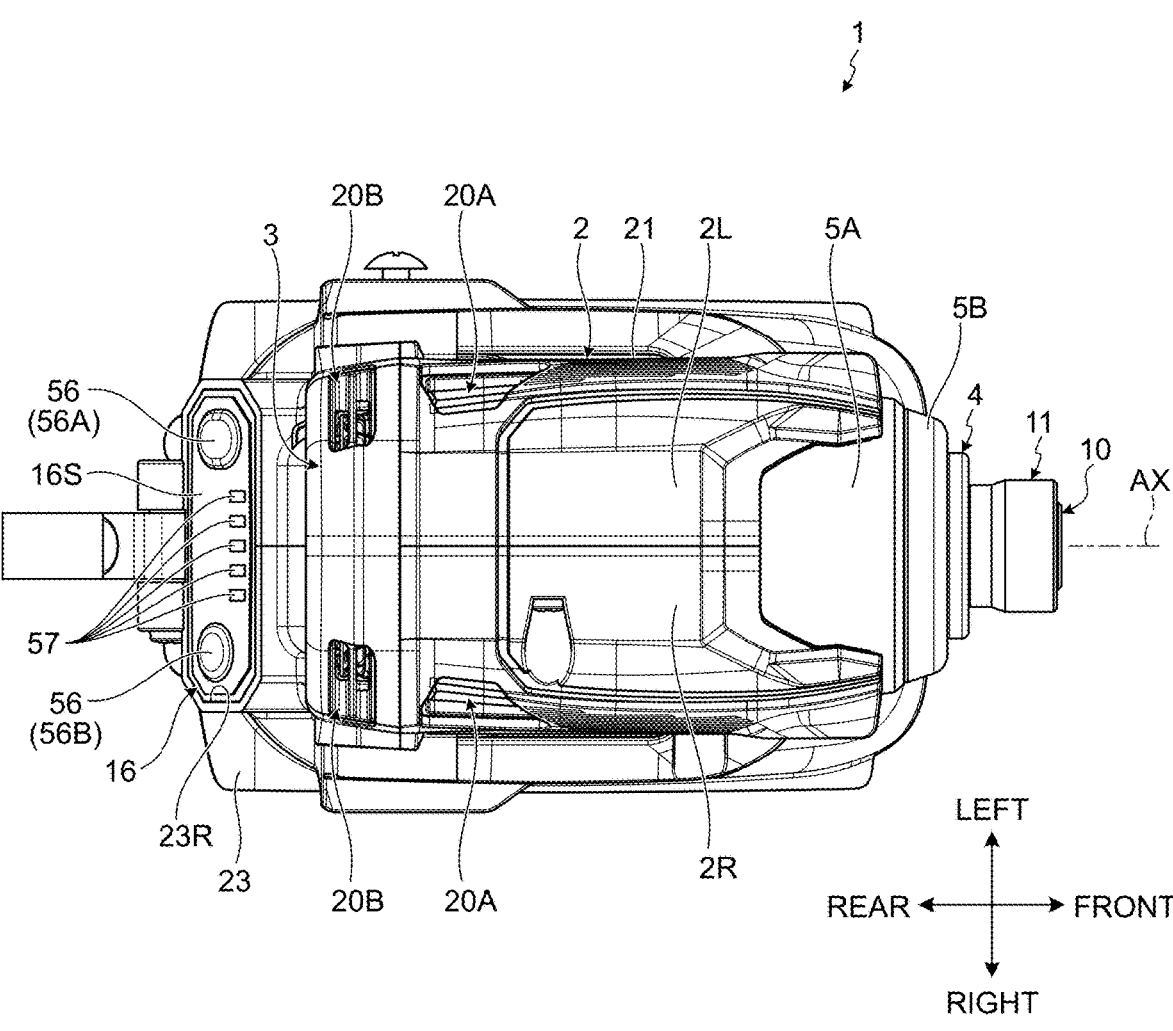
FIG. 4 is a top view illustrating the power tool according to the embodiment.
Figure 5:
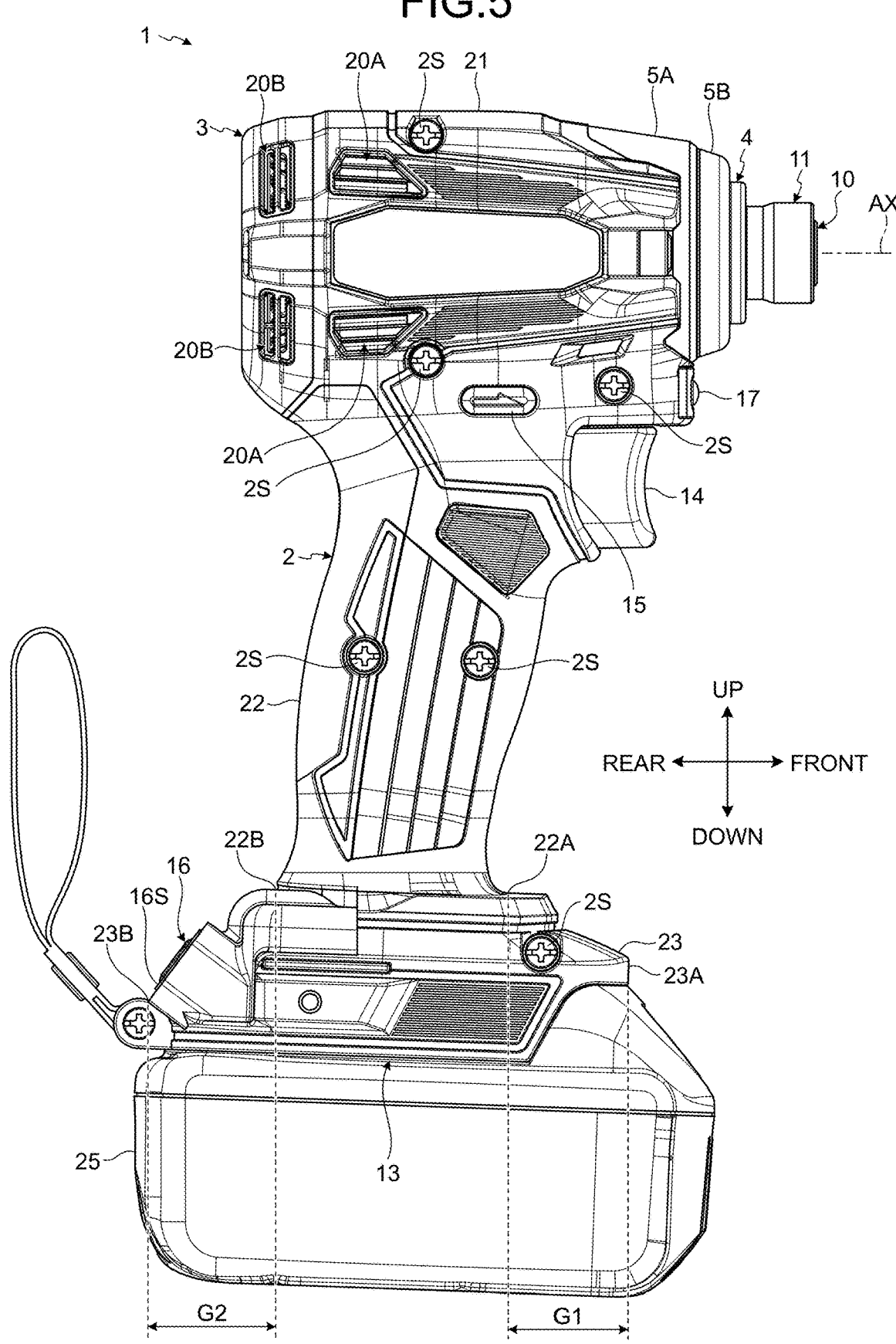
FIG. 5 is a right side view illustrating the power tool according to the embodiment.
Figure 6:
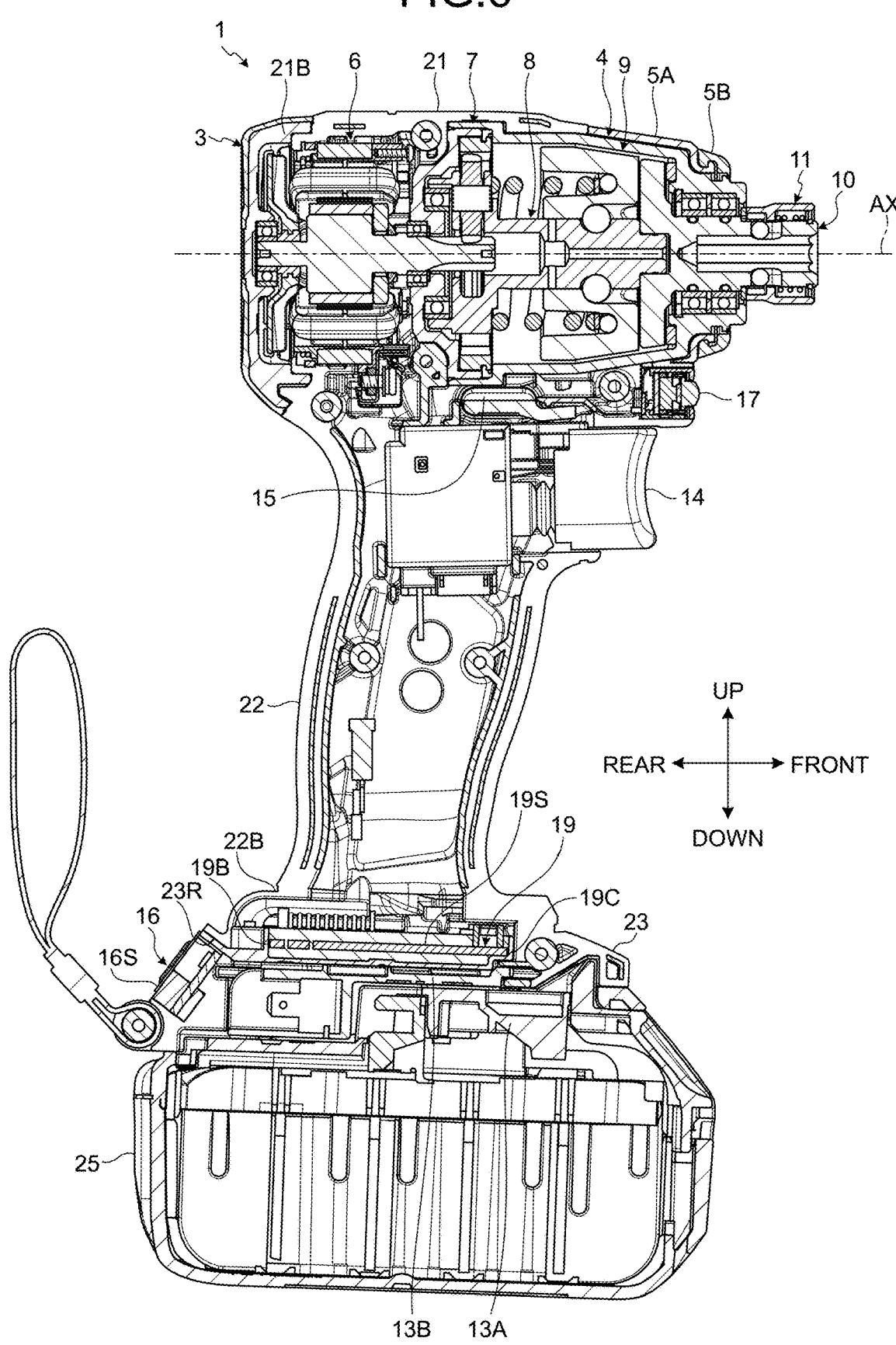
FIG. 6 is a longitudinal sectional view illustrating the power tool according to the embodiment.
Figure 7:
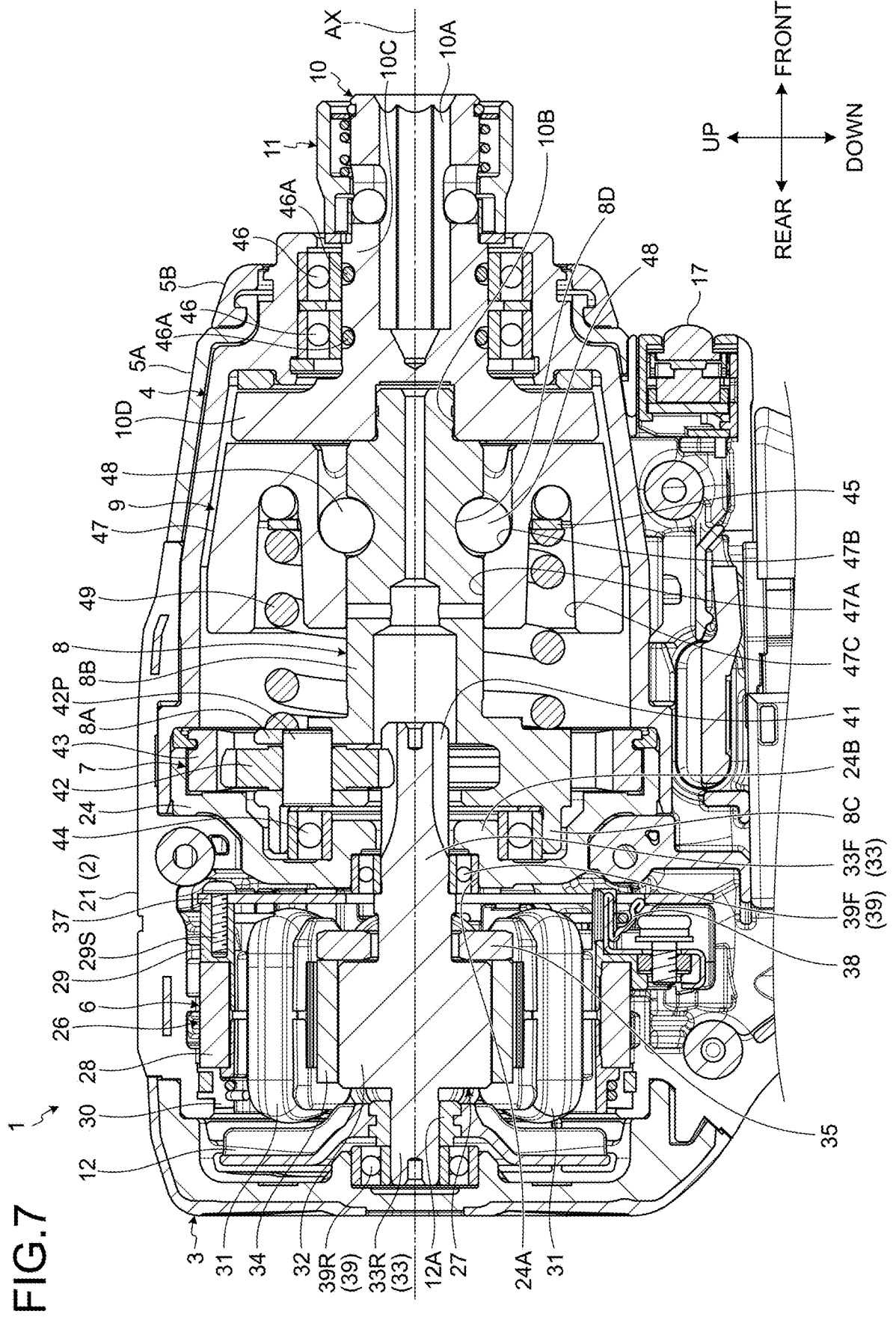
FIG. 7 is a longitudinal sectional view illustrating an upper portion of the power tool according to the embodiment.
Figure 8:
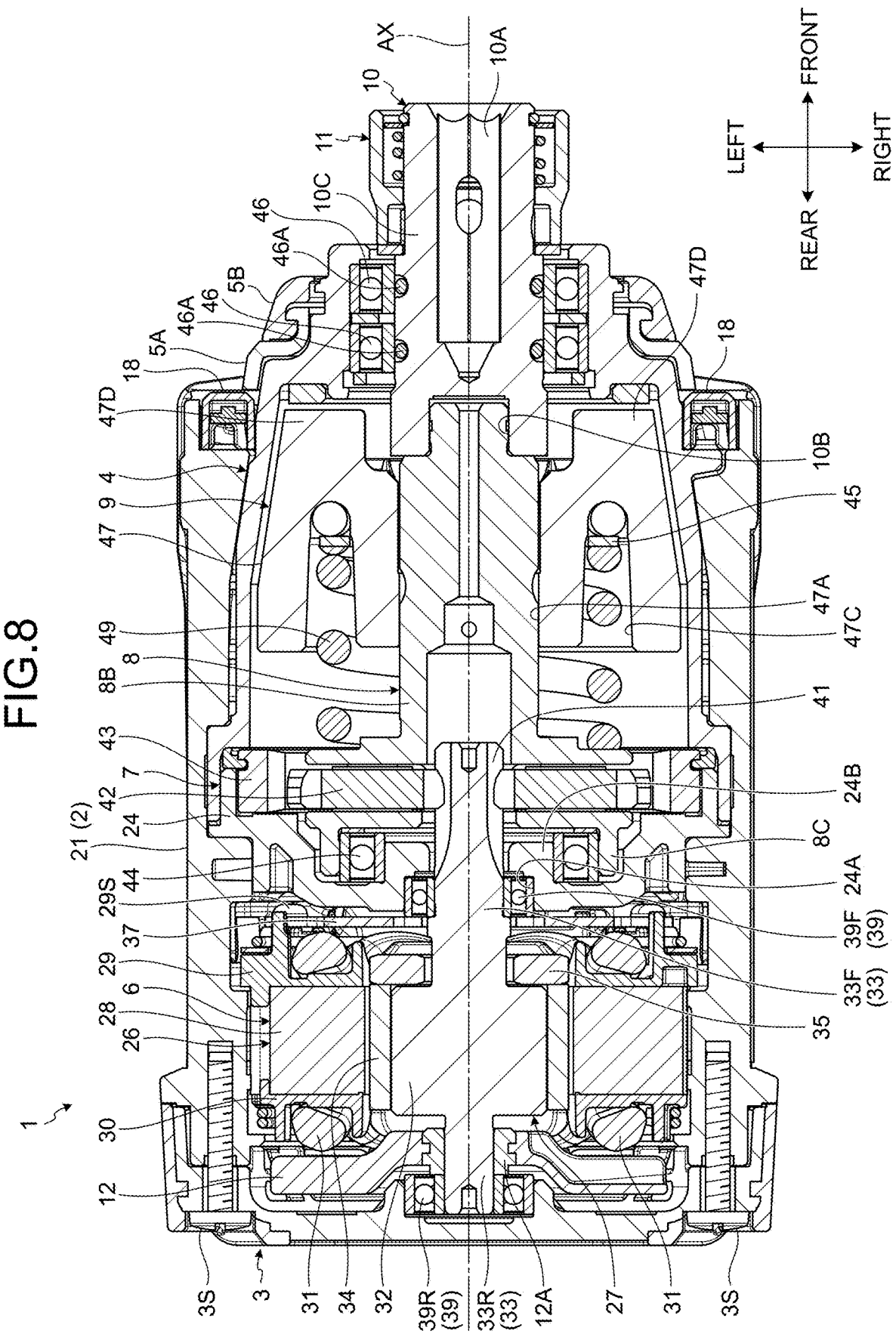
FIG. 8 is a transverse cross-sectional view illustrating the upper portion of the power tool according to the embodiment.

FIG. 1 is a front perspective view illustrating the power tool 1 according to the embodiment. FIG. 2 is a rear perspective view illustrating the power tool 1 according to the embodiment. FIG. 3 is a rear view illustrating the power tool 1 according to the embodiment. FIG. 4 is a top view illustrating the power tool 1 according to the embodiment. FIG. 5 is a right side view illustrating the power tool 1 according to the embodiment. FIG. 6 is a longitudinal sectional view illustrating the power tool 1 according to the embodiment. FIG. 7 is a longitudinal sectional view illustrating an upper portion of the power tool 1 according to the embodiment. FIG. 8 is a transverse cross-sectional view illustrating the upper portion of the power tool 1 according to the embodiment.

In the embodiment, the power tool 1 is an impact driver which is a type of screw tightening tool. The power tool 1 includes a housing 2, a rear cover 3, a hammer case 4, a hammer case cover 5A, a bumper 5B, a motor 6, a speed reducing mechanism 7, a spindle 8, a impact mechanism 9, an anvil 10, a tool holding mechanism 11, a fan 12, a battery mounting part 13, a trigger lever 14, a forward/reverse change lever 15, an operation-and-display part 16, a mode-change switch 17, a light assembly 18, and a control circuit board 19.

The housing 2 is made of a synthetic resin. In the embodiment, the housing 2 is made of nylon. The housing 2 includes a left housing 2L and a right housing 2R disposed on a right side of the left housing 2L. The left housing 2L and the right housing 2R are fixed by a plurality of screws 2S. The housing 2 is implemented by a half-split housing.

The housing 2 includes a motor housing part 21, a grip part 22, and a battery holding part 23.

The motor housing part 21 has a tubular shape. The motor housing part 21 houses the motor 6. The motor housing part 21 houses at least a portion of the hammer case 4.

The grip part 22 extends downward from the motor housing part 21. The trigger lever 14 is provided at a front portion of an upper portion of the grip part 22. The grip part 22 is held by a user.

The battery holding part 23 is connected to a lower end of the grip part 22. In each of the front-rear direction and the left-right direction, an outer dimension of the battery holding part 23 is larger than an outer dimension of the grip part 22.

The rear cover 3 is made of a synthetic resin. The rear cover 3 is disposed rearward of the motor housing part 21. The rear cover 3 houses at least a portion of the fan 12. The fan 12 is disposed on an inner circumference side of the rear cover 3. The rear cover 3 is disposed so as to cover an opening in a rear end of the motor housing part 21. The rear cover 3 is fixed to the rear end of the motor housing part 21 by two screws 3S.

The motor housing part 21 has an air intake ports 20A. The rear cover 3 has an air exhaust ports 20B. Air from outside of the housing 2 flows into an interior space of the housing 2 via the air intake ports 20A. Air from the interior space of the housing 2 flows out to the outside of the housing 2 via the exhaust ports 20B.

The hammer case 4 is made of metal. In the embodiment, the hammer case 4 is made of aluminum. The hammer case 4 has a tubular shape. The hammer case 4 is connected to a front portion of the motor housing part 21. A bearing box 24 is fixed to a rear portion of the hammer case 4. A screw thread is formed on an outer circumferential portion of the bearing box 24. A thread groove is formed on an inner circumferential portion of the hammer case 4. The bearing box 24 and the hammer case 4 are fixed to each other by joining (threadably engaging) the screw thread of the bearing box 24 and the screw groove of the hammer case 4. The hammer case 4 is sandwiched between the left housing 2L and the right housing 2R. At least a portion of the hammer case 4 is housed in the motor housing part 21. The bearing box 24 is fixed to each of the motor housing part 21 and the hammer case 4.

The hammer case 4 houses the speed reducing mechanism 7, the spindle 8, and the impact mechanism 9. The hammer case 4 houses at least a portion of the anvil 10. At least a portion of the speed reducing mechanism 7 is disposed inside the bearing box 24. The speed reducing mechanism 7 includes a plurality of gears.

The hammer case cover 5A covers at least a portion of a surface of the hammer case 4. The hammer case cover 5A protects the hammer case 4. The hammer case cover 5A blocks (shields) contact between the hammer case 4 and objects around the hammer case 4.

The bumper 5B is disposed at a front portion of the hammer case 4. The bumper 5B has an annular shape. The bumper 5B prevents contact between the hammer case 4 and objects around the hammer case 4. The bumper 5B alleviates an impact that occurs when an object is contacted.

The motor 6 is a power source of the power tool 1. The motor 6 is an inner rotor type brushless motor. The motor 6 includes a stator 26 and a rotor 27. The stator 26 is supported by the motor housing part 21. At least a portion of the rotor 27 is disposed in the interior of the stator 26. The rotor 27 rotates relative to the stator 26. The rotor 27 rotates about the motor rotation axis AX extending in the front-rear direction.

The stator 26 includes a stator core 28, a front insulator 29, a rear insulator 30, and coils 31.

The stator core 28 is disposed outward in the radial direction of the rotor 27. The stator core 28 includes a plurality of laminated steel plates. The steel plates are plates made of a metal whose main component is iron. The stator core 28 has a tubular shape. The stator core 28 includes teeth that respectively support the coils 31.

The front insulator 29 is provided at a front portion of the stator core 28. The rear insulator 30 is provided at a rear portion of the stator core 28. The front insulator 29 and the rear insulator 30 each are an electrically insulating member made of a synthetic resin. The front insulator 29 is disposed so as to cover some of teeth surfaces. The rear insulator 30 is disposed so as to cover some of the teeth surfaces.

The coils 31 are mounted on the stator core 28 via the front insulator 29 and the rear insulator 30. The coils 31 are disposed around the teeth of the stator core 28 via the front insulator 29 and the rear insulator 30. The coils 31 and the stator core 28 are electrically insulated from each other by the front insulator 29 and the rear insulator 30. The coils 31 are electrically connected via fusing terminals 38. The coils 31 are electrically connected to the control circuit board 19 via a lead wire (not illustrated).

The rotor 27 rotates about the motor rotation axis AX. The rotor 27 includes a rotor core part 32, a rotor shaft part 33, at least one rotor magnet 34, and at least one sensor magnet 35.

The rotor core part 32 and the rotor shaft part 33 each are made of steel. The rotor shaft part 33 protrudes in the front-rear direction from end surfaces of the rotor core part 32. The rotor shaft part 33 includes a front shaft part 33F protruding forward from a front end surface of the rotor core part 32 and a rear shaft part 33R protruding rearward from a rear end surface of the rotor core part 32.

The rotor magnet 34 is fixed to the rotor core part 32. The rotor magnet 34 has a cylindrical shape. The rotor magnet 34 is disposed around the rotor core part 32.

The sensor magnet 35 is fixed to the rotor core part 32. The sensor magnet 35 has an annular shape. The sensor magnet 35 is disposed on the front end surface of the rotor core part 32 and a front end surface of the rotor magnet 34.

A sensor board 37 is mounted on the front insulator 29. The sensor board 37 is fixed to the front insulator 29 by at least one screw 29S. The sensor board 37 includes: a disk-shaped circuit board having a hole at the center; and a rotation detection element supported by the circuit board. At least a portion of the sensor board 37 faces the sensor magnet 35. The rotation detection element detects a position of the rotor 27 in a rotation direction by detecting a position of the sensor magnet 35 of the rotor 27.

The rotor shaft part 33 is rotatably supported by rotor bearings 39. The rotor bearings 39 include: a front rotor bearing 39F that supports the front shaft part 33F in a rotatable manner; and a rear rotor bearing 39R that supports the rear shaft part 33R in a rotatable manner.

The front rotor bearing 39F is held by the bearing box 24. The bearing box 24 has a recess 24A recessed forward from a rear surface of the bearing box 24. The front rotor bearing 39F is disposed in the recess 24A. The rear rotor bearing 39R is held by the rear cover 3. A front end of the rotor shaft part 33 is disposed in an interior space of the hammer case 4 through an opening in the bearing box 24.

A pinion gear 41 is formed at the front end portion of the rotor shaft part 33. The pinion gear 41 is connected to at least a portion of the speed reducing mechanism 7. The rotor shaft part 33 is connected to the speed reducing mechanism 7 via the pinion gear 41.

The speed reducing mechanism 7 is disposed forward of the motor 6. The speed reducing mechanism 7 connects the rotor shaft part 33 and the spindle 8. The speed reducing mechanism 7 transmits rotation of the rotor 27 to the spindle

8. The speed reducing mechanism 7 causes the spindle 8 to rotate at a rotational speed lower than a rotational speed of the rotor shaft part 33. The speed reducing mechanism 7 includes a planetary gear mechanism.

The speed reducing mechanism 7 includes a plurality of gears. The gears of the speed reducing mechanism 7 are driven by the rotor 27.

The speed reducing mechanism 7 includes a plurality of planetary gears 42 disposed around the pinion gear 41 and an internal gear 43 disposed around the plurality of planetary gears 42. The pinion gear 41, the planetary gears 42, and the internal gear 43 are each housed in the hammer case 4. Each of the planetary gears 42 meshes with the pinion gear 41. The planetary gears 42 are rotatably supported on the spindle 8 via respective pins 42P. The spindle 8 is rotated by the planetary gears 42. The internal gear 43 has internal teeth that mesh with the planetary gears 42. The internal gear 43 is fixed to the bearing box 24. The internal gear 43 is always non-rotatable relative to the bearing box 24.

When the rotor shaft part 33 rotates in response to the drive (energization) of the motor 6, the pinion gear 41 rotates, and the planetary gears 42 revolve around the pinion gear 41. The planetary gears 42 revolve while meshing with the internal teeth of the internal gear 43. Owing to the revolution of the planetary gears 42, the spindle 8 connected to the planetary gears 42 via the pins 42P rotates at the rotational speed lower than the rotational speed of the rotor shaft part 33.

The spindle 8 is disposed more forward than at least a portion of the motor 6. The spindle 8 is disposed forward of the stator 26. At least a portion of the spindle 8 is disposed forward of the rotor 27. At least a portion of the spindle 8 is disposed forward of the speed reducing mechanism 7. The spindle 8 is disposed rearward of the anvil 10. The spindle 8 is rotated by the rotor 27. The spindle 8 is rotated by a rotational force of the rotor 27 transmitted by the speed reducing mechanism 7. The spindle 8 transmits a rotational force of the motor 6 to the anvil 10.

The spindle 8 includes a flange part 8A and a spindle shaft part 8B protruding forward from the flange part 8A. The planetary gears 42 are rotatably supported by the flange part 8A via the pins 42P. A rotation axis of the spindle 8 coincides with the motor rotation axis AX of the motor 6. The spindle 8 rotates about the motor rotation axis AX. The spindle 8 is rotatably supported by a spindle bearing 44. A protruding part 8C is provided at a rear end of the spindle 8. The protruding part 8C protrudes rearward from the flange part 8A. The protruding part 8C is disposed so as to surround the spindle bearing 44.

The bearing box 24 is disposed at least partially around the spindle 8. The spindle bearing 44 is held by the bearing box 24. The bearing box 24 has a protruding part 24B protruding forward from a front surface of the bearing box 24. The spindle bearing 44 is disposed around the protruding part 24B.

The impact mechanism 9 is driven by the motor 6. The rotational force of the motor 6 is transmitted to the impact mechanism 9 via the speed reducing mechanism 7 and the spindle 8. The impact mechanism 9 impacts the anvil 10 in the rotation direction owing to the rotational force of the spindle 8 rotated by the motor 6. The impact mechanism 9 includes a hammer 47, balls 48, and a coil spring 49. The impact mechanism 9 including the hammer 47 is housed in the hammer case 4.

The hammer 47 is disposed more forward than the speed reducing mechanism 7. The hammer 47 is disposed around the spindle 8. The hammer 47 is held by the spindle 8. The balls 48 are disposed between the spindle 8 and the hammer 47. The coil spring 49 is supported by the spindle 8 and the hammer 47.

The hammer 47 has a cylindrical shape. The hammer 47 is disposed around the spindle shaft part 8B. The hammer 47 has a hole 47A in which the spindle shaft part 8B is disposed.

The hammer 47 is rotated by the motor 6. The rotational force of the motor 6 is transmitted to the hammer 47 via the speed reducing mechanism 7 and the spindle 8. The hammer 47 is rotatable together with the spindle 8 owing to the rotational force of the spindle 8 rotated by the motor 6. A rotation axis of the hammer 47, the rotation axis of the spindle 8, and the motor rotation axis AX of the motor 6 coincide with each other. The hammer 47 rotates about the motor rotation axis AX.

The balls 48 are made of a metal such as steel. The balls 48 are disposed between the spindle shaft part 8B and the hammer 47. The spindle 8 has a spindle groove 8D in which at least some of the balls 48 are disposed. The spindle groove 8D is provided on a portion of an outer surface of the spindle shaft part 8B. The hammer 47 has a hammer groove 47B in which at least some of the balls 48 is disposed. The hammer groove 47B is provided on a portion of an inner surface of the hammer 47. The balls 48 are disposed between the spindle groove 8D and the hammer groove 47B. The balls 48 can roll along the inner side of the spindle groove 8D and the inner side of the hammer groove 47B. The hammer 47 is movable as the balls 48 roll. The spindle 8 and the hammer 47 can move relative to each other in the axial direction and the rotation direction within movable ranges defined by the spindle groove 8D and the hammer groove 47B.

The coil spring 49 generates an elastic (spring) force, which causes the hammer 47 to move forward. The coil spring 49 is disposed between the flange part 8A and the hammer 47. A ring-shaped recess 47C is provided on a rear surface of the hammer 47. The recess 47C is recessed forward from the rear surface of the hammer 47. A washer 45 is disposed on the inner side of the recess 47C. A rear end portion of the coil spring 49 is supported by the flange part 8A. A front end portion of the coil spring 49 is disposed inside the recess 47C and is supported by the washer 45.

The anvil 10 is disposed forward of the motor 6. The anvil 10 is an output part of the power tool 1, which rotates in response to application of the rotational force of the rotor 27. At least a portion of the anvil 10 is disposed forward of the hammer 47. The anvil 10 has a tool (bit) hole 10A into which a tool accessory, e.g., a bit, is inserted. The tool hole 10A is provided at a front end portion of the anvil 10. The tool accessory is mounted on the anvil 10.

The anvil 10 has an anvil recess 10B. The anvil recess 10B is provided at a rear end portion of the anvil 10. The anvil recess 10B is recessed forward from the rear end portion of the anvil 10. The spindle 8 is disposed rearward of the anvil 10. A front end portion of the spindle shaft part 8B is disposed in the anvil recess 10B.

The anvil 10 includes a rod-shaped anvil shaft part 10C and an anvil protruding part 10D. The tool hole 10A is provided in a front end portion of the anvil shaft part 10C. The tool accessory is mounted in (on) the anvil shaft part 10C. The anvil protruding part 10D is provided at the rear end portion of the anvil 10. The anvil protruding part 10D protrudes outward in the radial direction from a rear end portion of the anvil shaft part 10C.

The anvil 10 is rotatably supported by anvil bearings 46. A rotation axis of the anvil 10, the rotation axis of the hammer 47, the rotation axis of the spindle 8, and the motor rotation axis AX of the motor 6 coincide with each other.

The anvil 10 rotates about the motor rotation axis AX. The anvil bearings 46 are disposed in the interior of the hammer case 4. The anvil bearings 46 are held by the hammer case 4. In the embodiment, two of the anvil bearings 46 are disposed in the axial direction. The anvil bearings 46 supports a front portion of the anvil shaft part 10C in a rotatable manner. An O-ring 46A is disposed between the anvil bearings 46 and the anvil shaft part 10C.

At least a portion of the hammer 47 is capable of making contact with the anvil protruding part 10D. A hammer protruding portion 47D protruding forward is provided at a front portion of the hammer 47. The hammer protruding portion 47D and the anvil protruding part 10D are capable of making contact with each other. When the motor 6 is energized in a state where the hammer 47 and the anvil protruding part 10D are in contact with each other, the anvil 10 rotates together with the hammer 47 and the spindle 8.

The anvil 10 is impactable (strikable) in the rotation direction by the hammer 47. For example, during screw tightening work, there are situations in which, when a load acting on the anvil 10 becomes high, the anvil 10 can no longer be caused to rotate merely by power generated by the motor 6. When the anvil 10 can no longer be caused to rotate merely by the power generated by the motor 6, the rotation of the anvil 10 and the hammer 47 will stop. As a result, the spindle 8 and the hammer 47 will move relative to each other in the axial direction and the circumferential direction via the balls 48. That is, even if the rotation of the hammer 47 stops, the rotation of the spindle 8 continues owing to the power generated by the motor 6. In the state in which the rotation of the hammer 47 has stopped, when the spindle 8 rotates, the balls 48 move rearward while being guided by the spindle groove 8D and the hammer groove 47B. The hammer 47 receives a force from the balls 48 and moves rearward along with the balls 48. That is, in the state in which the rotation of the anvil 10 is stopped, the hammer 47 moves rearward in response to the relative rotation of the spindle 8. The contact between the hammer 47 and the anvil protruding part 10D is released by the movement of the hammer 47 rearward.

The coil spring 49 generates an elastic (spring) force, which causes the hammer 47 to move forward. The hammer 47 that has previously moved rearward, now moves forward owing to the elastic force of the coil spring 49. When the hammer 47 moves forward, the hammer 47 receives a force in the rotation direction from the balls 48. That is, the hammer 47 moves forward while rotating. When the hammer 47 moves forward while rotating, the hammer 47 comes into contact with the anvil protruding part 10D while rotating. As a result, the anvil protruding part 10D is impacted in the rotation direction by the hammer protruding portion 47D of the hammer 47. Both the power of the motor 6 and an inertial force of the hammer 47 act on the anvil 10. Therefore, the anvil 10 can rotate about the motor rotation axis AX with a high torque.

The tool holding mechanism 11 is disposed around the front portion of the anvil 10. The tool holding mechanism 11 holds the tool accessory, which is inserted into the tool hole 10A.

The fan 12 is disposed rearward of the stator 26 of the motor 6. The fan 12 generates an airflow for cooling the motor 6. The fan 12 is fixed to at least a portion of the rotor 27. The fan 12 is fixed to a rear portion of the rear shaft part 33R via a bush 12A. The fan 12 is disposed between the rear rotor bearing 39R and the stator 26. The fan 12 rotates when the rotor 27 rotates. When the rotor shaft part 33 rotates, the fan 12 rotates together with the rotor shaft part 33. When the fan 12 rotates, the air from outside of the housing 2 flows into the interior space of the housing 2 through the air intake ports 20A. The air that has flowed into the interior space of the housing 2 flows through the interior space of the housing 2 to cool the motor 6. The air that has flowed through the interior space of the housing 2 flows out to the outside of the housing 2 via the air exhaust ports 20B while the fan 12 is rotating.

The battery mounting part 13 is disposed at a lower portion of the battery holding part 23. The battery mounting part 13 is connected to a battery pack 25. The battery pack 25 is mounted on the battery mounting part 13. The battery holding part 23 holds the battery pack 25 via the battery mounting part 13. The battery pack 25 is attached to the battery holding part 23 via the battery mounting part 13. The battery pack 25 is detachable from the battery mounting part 13. The battery pack 25 is mounted on the battery mounting part 13 by being inserted into the battery mounting part 13 from forward of the battery holding part 23. The battery pack 25 is removed from the battery mounting part 13 by being removed forward from the battery mounting part 13. The battery pack 25 includes one or more secondary batteries. In the embodiment, the battery pack 25 includes one or more rechargeable lithium-ion batteries. After being mounted on the battery mounting part 13, the battery pack 25 can supply electric power to the power tool 1. The battery pack 25 supplies electric power to at least the motor 6. The motor 6 operates using the electric power (current) supplied from the battery pack 25. The operation-and-display part 16 operates using the electric power supplied from the battery pack 25. The control circuit board 19 operates using the electric power supplied from the battery pack 25.

The battery mounting part 13 includes a body-side terminal 13A and a terminal holding part 13B. The body-side terminal 13A includes: a body-side power supply terminal connected to a power supply terminal of the battery pack 25; and a body-side communication terminal connected to a communication terminal of the battery pack 25. The electric power from the battery pack 25 is supplied to the body-side terminal 13A. The electric power, which has been supplied from the battery pack 25 to the body-side terminal 13A, is supplied to the motor 6 via the control circuit board 19. The terminal holding part 13B is made of a synthetic resin. The terminal holding part 13B is fixed to the battery holding part 23. The terminal holding part 13B is sandwiched between the left housing 2L and the right housing 2R.

The trigger lever 14 is provided at the front portion of the upper portion of the grip part 22. The trigger lever 14 is manipulated by the user to start the motor 6. The motor is changed between operation (energization) and stoppage by manipulating the trigger lever 14.

The forward/reverse change lever 15 is provided at an upper portion of the grip part 22. The forward/reverse change lever 15 is manipulated by the user. By manipulating the forward/reverse change lever 15, the rotation direction of the motor 6 is changed from one of a forward rotation direction and a reverse rotation direction to the other. By changing the rotation direction of the motor 6, the rotation direction of the spindle 8 is changed.

The operation-and-display part 16 is disposed at a rear portion of the battery holding part 23. The operation-and-display part 16 is manipulated by the user for the purpose of changing the application mode of the motor 6. The operation-and-display part is not provided at a front portion, a left portion, and a right portion of the battery holding part 23.

The mode-change switch 17 is provided at an upper portion of the trigger lever 14. The mode-change switch 17 can be manipulated by the user to change the application mode of the motor 6.

The light assemblies 18 emit illumination light. The light assemblies 18 illuminate the anvil 10 and around the anvil 10 with the illumination light. The light assemblies 18 illuminate forward of the anvil 10 with the illumination light. In addition, the light assemblies 18 illuminate the tool accessory mounted on the anvil 10 and the periphery of the accessory tool with the illumination light. In the embodiment, the light assemblies 18 are disposed at the left portion and the right portion of the hammer case 4.

The control circuit board 19 functions as a controller of the power tool 1 that controls at least the motor 6. The control circuit board 19 outputs control signals that control the motor 6. The control circuit board 19 includes a printed circuit board (PCB) on which a plurality of electronic components are mounted. The electronic components are mounted on a surface 19S of the control circuit board 19. The surface 19S of the control circuit board 19 is oriented upward.

Examples of the electronic component mounted on the printed circuit board include: a processor such as a central processing unit (CPU); nonvolatile memory such as a read only memory (ROM) or storage; volatile memory such as a random access memory (RAM); transistors; and resistors. The control circuit board 19 is housed in the battery holding part 23 while being held by a resin part 60. The control circuit board 19 is disposed inside the battery holding part 23.

The control circuit board 19 changes the application mode of the motor 6 based on a work required to be performed by the power tool 1. The application mode of the motor 6 refers to a control method or a control pattern of the motor 6. The application mode of the motor 6 is changed by manipulating the operation-and-display part 16 and/or the mode-change switch 17.

As illustrated in FIG. 5, in the front-rear direction, a first distance G1 between a front end 22A of the lower end of the grip part 22 and a front end 23A of the battery holding part 23 is equal to or shorter than a second distance G2 between a rear end 22B of the lower end of the grip part 22 and a rear end 23B of the battery holding part 23.

As illustrated in FIG. 6, a rear end 19B of the control circuit board 19 is positioned more rearward than the rear end 22B of the grip part 22 in the front-rear direction.

As described above, the electronic components are mounted on the surface 19S of the control circuit board 19. The surface 19S of the control circuit board 19 is oriented upward. The surface 19S of the control circuit board 19 is parallel to the motor rotation axis AX.

Operation-and-Display Part

Figure 9:
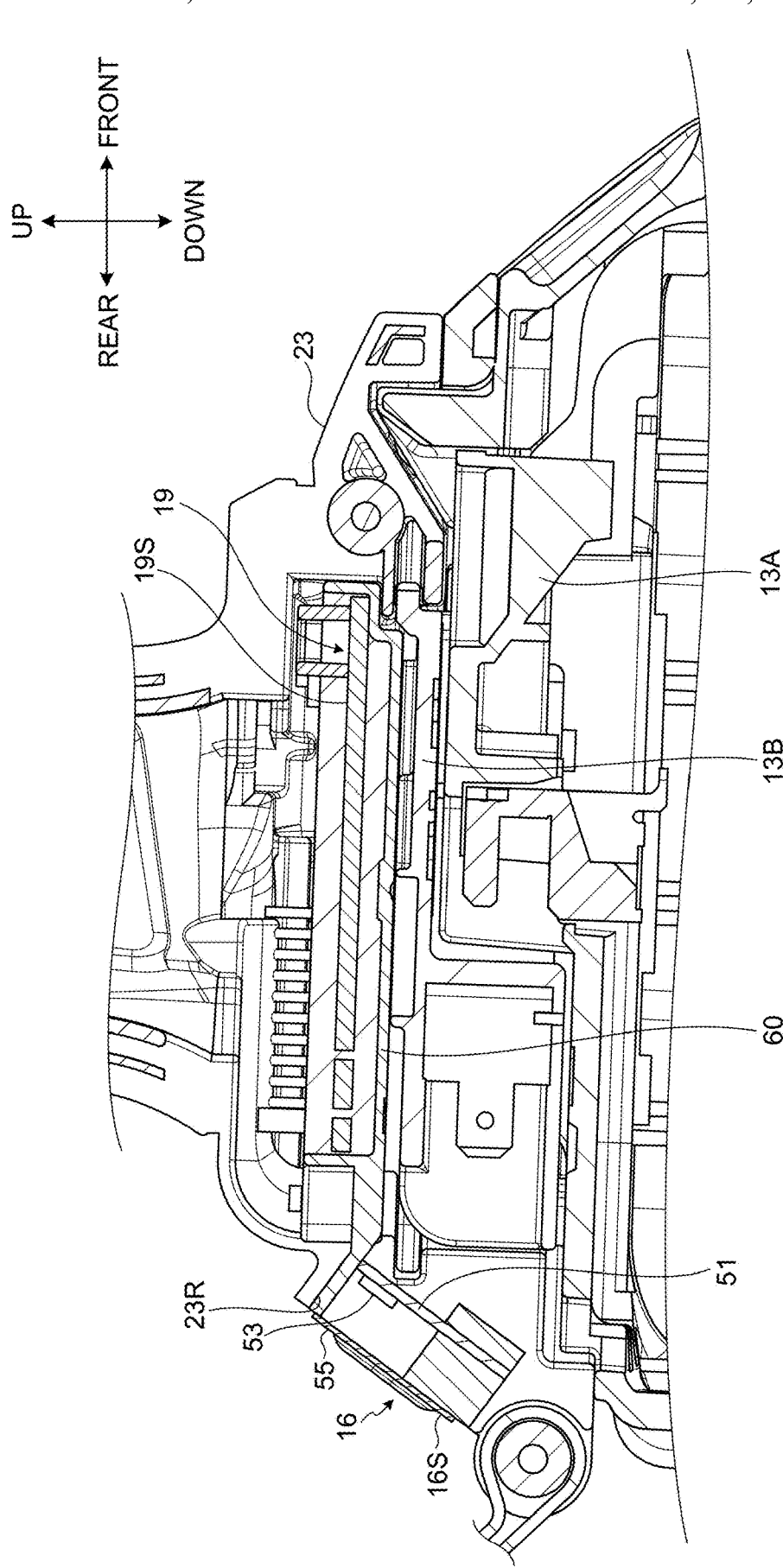
FIG. 9 is a longitudinal sectional view illustrating a lower portion of the power tool according to the embodiment.
Figure 10:
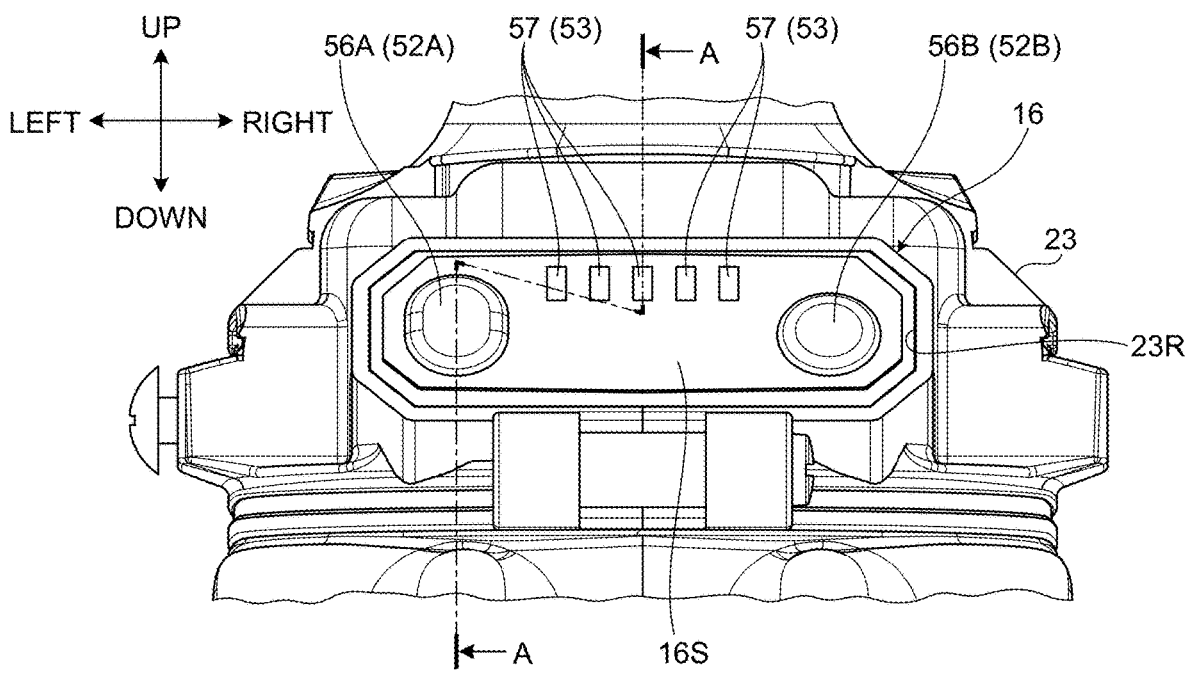
FIG. 10 is a rear view illustrating the lower portion of the power tool according to the embodiment.
Figure 11:
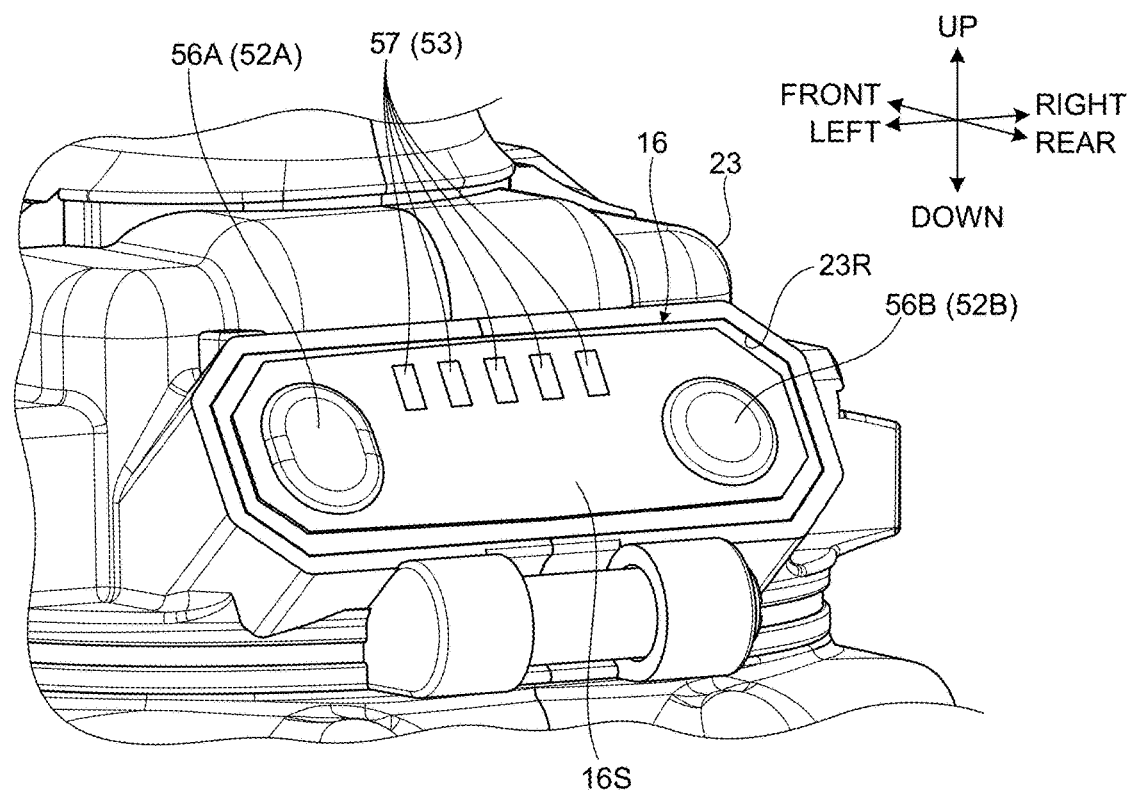
FIG. 11 is a rear perspective view illustrating the lower portion of the power tool according to the embodiment.
Figure 12:
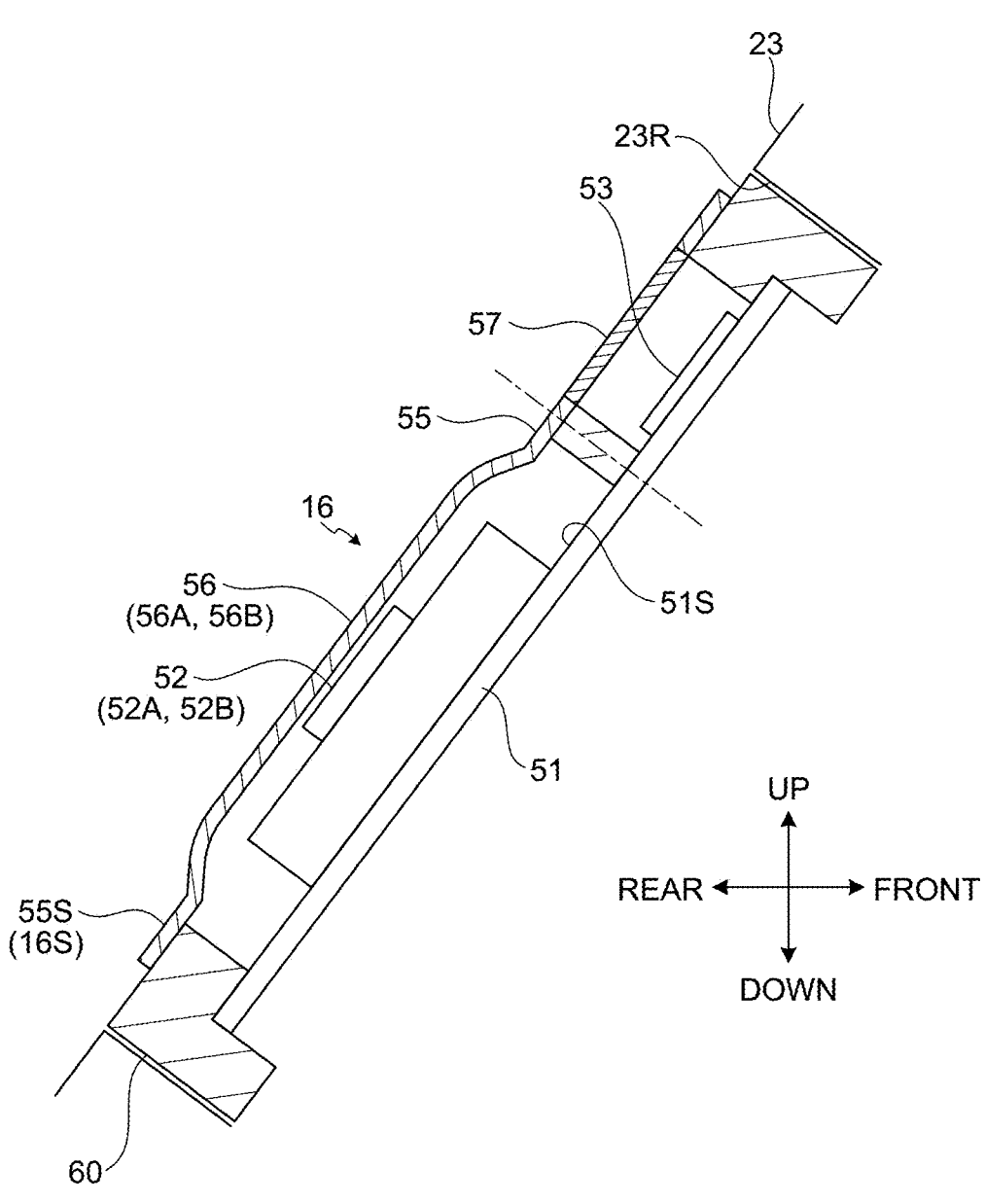
FIG. 12 is a cross-sectional view illustrating an operation-and-display part of the power tool according to the embodiment.

FIG. 9 is a longitudinal sectional view illustrating a lower portion of the power tool 1 according to the embodiment. FIG. 10 is a rear view illustrating the lower portion of the power tool 1 according to the embodiment. FIG. 11 is a rear perspective view illustrating the lower portion of the power tool 1 according to the embodiment. FIG. 12 is a cross-sectional view illustrating the operation-and-display part 16 of the power tool 1 according to the embodiment, and corresponds to a cross-sectional view taken along line A-A in FIG. 10.

The operation-and-display part 16 is disposed at the rear portion of the battery holding part 23. The operation-and-display part 16 is disposed in a recess 23R provided on the battery holding part 23. The operation-and-display part 16 is disposed rearward of the control circuit board 19. The operation-and-display part 16 is electrically connected to the control circuit board 19.

The operation-and-display part 16 includes a circuit board 51, switch elements 52, light emitting elements 53, and a panel 55.

The circuit board 51 includes a printed circuit board (PCB) on which a plurality of electronic components are mounted. The electronic components are mounted on a surface 51S of the circuit board 51. The surface 51S of the circuit board 51 is oriented upward and rearward. The surface 51S of the circuit board 51 is inclined downward as it goes rearward.

The switch elements 52 and the light emitting elements 53 are each supported by the circuit board 51. The switch elements 52 and the light emitting elements 53 are each mounted on the circuit board 51. The switch elements 52 and the light emitting elements 53 are each mounted on the surface 51S of the circuit board 51.

The panel 55 is manipulated by the user to change the application mode indicating the control method or the control pattern of the motor 6. The panel 55 is a plate-shaped member made of a synthetic resin. The panel 55 is disposed at the rear portion of the battery holding part 23. The panel 55 is disposed in the recess 23R provided in the battery holding part 23. The panel 55 is disposed rearward of the control circuit board 19.

The panel 55 faces the circuit board 51. The panel 55 is disposed so as to cover the switch elements 52 and the light emitting elements 53. A surface 16S of the operation-and-display part 16 includes a surface 55S of the panel 55. The surface 16S of the operation-and-display part 16 is oriented upward and rearward. The surface 55S of the panel 55 is inclined downward as it goes rearward.

The switch elements 52 are manipulated via the panel 55. The panel 55 includes manipulatable parts 56 disposed directly above the switch elements 52. Each of the manipulatable parts 56 includes an elastically deformable part provided at at least a portion of the panel 55. By pressing the manipulatable parts 56 of the panel 55, the user can manipulate the switch elements 52 via the panel 55.

A plurality of the light emitting elements 53 are arranged in the left-right direction. In the embodiment, five of the light emitting elements 53 are arranged in the left-right direction. Light emitting diodes (LEDs) are exemplified as the light emitting elements 53. Light emitted from the light emitting elements 53 is emitted to the outside of the battery holding part 23 via (through) the panel 55. The panel 55 includes display parts 57 disposed directly above the light emitting elements 53. Each of the display parts 57 includes an optically transmissive part provided on at least a portion of the panel 55. Each of the light emitting elements 53 irradiates the display part 57 with light. The user can view the light emission states of the light emitting elements 53 through the display parts 57.

In the embodiment, the switch elements 52 include a first switch element 52A and a second switch element 52B. The manipulatable parts 56 include a first manipulatable parts 56A disposed directly above the first switch element 52A and a second manipulatable parts 56B disposed directly above the second switch element 52B.

When the first manipulatable part 56A is manipulated (pressed), the first switch element 52A is manipulated via the first manipulatable part 56A. When the second manipulatable part 56B is manipulated (pressed), the second switch element 52B is manipulated via the second manipulatable part 56B. The user can manipulate the switch elements 52 while gripping the grip part 22.

In the embodiment, five of the display parts 57 are arranged in the left-right direction so as to correspond to the five light emitting elements 53, respectively. Light emitted from the light emitting elements 53 passes through the display parts 57 that are optically transmissive parts. The user can view the light emission states of the light emitting elements 53 through the display parts 57.

As illustrated in FIGS. 3 and 10, in the left-right direction, the center of the operation-and-display part 16 and the center of the battery holding part 23 coincide with each other. The center of the operation-and-display part 16 in the left-right direction includes the center of the panel 55 in the left-right direction.

A dimension of the operation-and-display part 16 in the left-right direction is larger than a dimension of the operation-and-display part 16 in the up-down direction. That is, the operation-and-display part 16 is long in the left-right direction. The dimension of the operation-and-display part 16 in the left-right direction includes a dimension of the panel 55 in the left-right direction. The dimension of the operation-and-display part 16 in the up-down direction includes a dimension of the panel 55 in the up-down direction.

In the embodiment, the first manipulatable part 56A is disposed at a left portion of the panel 55. The second manipulatable part 56B is disposed at a right portion of the panel 55. The display parts 57 are disposed between the first manipulatable part 56A and the second manipulatable part 56B in the left-right direction.

As illustrated in FIGS. 5 and 6, in the front-rear direction, the panel 55 is disposed more rearward than the rear end 22B of the grip part 22. In the front-rear direction, the panel 55 is disposed more rearward than a rear end 21B of the motor housing part 21. In the front-rear direction, the panel 55 is disposed more rearward than the rear cover 3.

The resin part 60 supports the panel 55. The resin part 60 holds the control circuit board 19. The resin part 60 holds the circuit board 51. The panel 55 is in contact with a rear portion of the resin part 60. The panel 55 is fixed to the rear portion of the resin part 60. The rear portion of the resin part 60 is disposed in the recess 23R provided in the battery holding part 23.

The resin part 60 is fixed to the battery holding part 23. The resin part 60 is sandwiched between the left housing 2L and the right housing 2R. The panel 55, the control circuit board 19, and the circuit board 51 are each fixed to the battery holding part 23 via the resin part 60.

The control circuit board 19, the circuit board 51, the switch elements 52, the light emitting elements 53, and the resin part 60 are each disposed inside the battery holding part 23.

As described above, the terminal holding part 13B is made of a synthetic resin. The terminal holding part 13B and the resin part 60 are provided separately from each other. The terminal holding part 13B and the resin part 60 may be integrated with each other.

In the embodiment, the application mode of the motor 6 is changed by manipulating (pressing) the switch element(s) 52 via the manipulatable part(s) 56. In the embodiment, the application modes of the motor 6 includes impact force modes, which are types of general-purpose modes, and dedicated modes, which are specifically used in accordance with a work target. In the embodiment, the impact force modes can be switched by manipulating (pressing) the first switch element 52A. The dedicated modes can be switched by manipulating (pressing) the second switch element 52B.

As one example, the impact force modes include a MAX mode, a HARD mode, a MEDIUM mode, and a SOFT mode. The dedicated modes include a WOOD mode, a T mode (self-drilling screw mode), and a BOLT mode. The operation-and-display part 16 includes regions downward of the display parts 57, and these regions show characters, text, etc. that indicate information to be derived from the illumination of the respective light emitting elements 53.

When the switch element(s) 52 is (are) manipulated via the manipulatable part(s) 56, the circuit board 51 generates an operation signal. The circuit board 51 and the control circuit board 19 are connected via a lead wire (not illustrated). The operation signal generated in the circuit board 51 is transmitted to the control circuit board 19 via the lead wire. The control circuit board 19 sets the application mode of the motor 6 based on the operation signal transmitted from the circuit board 51.

Figure 13:
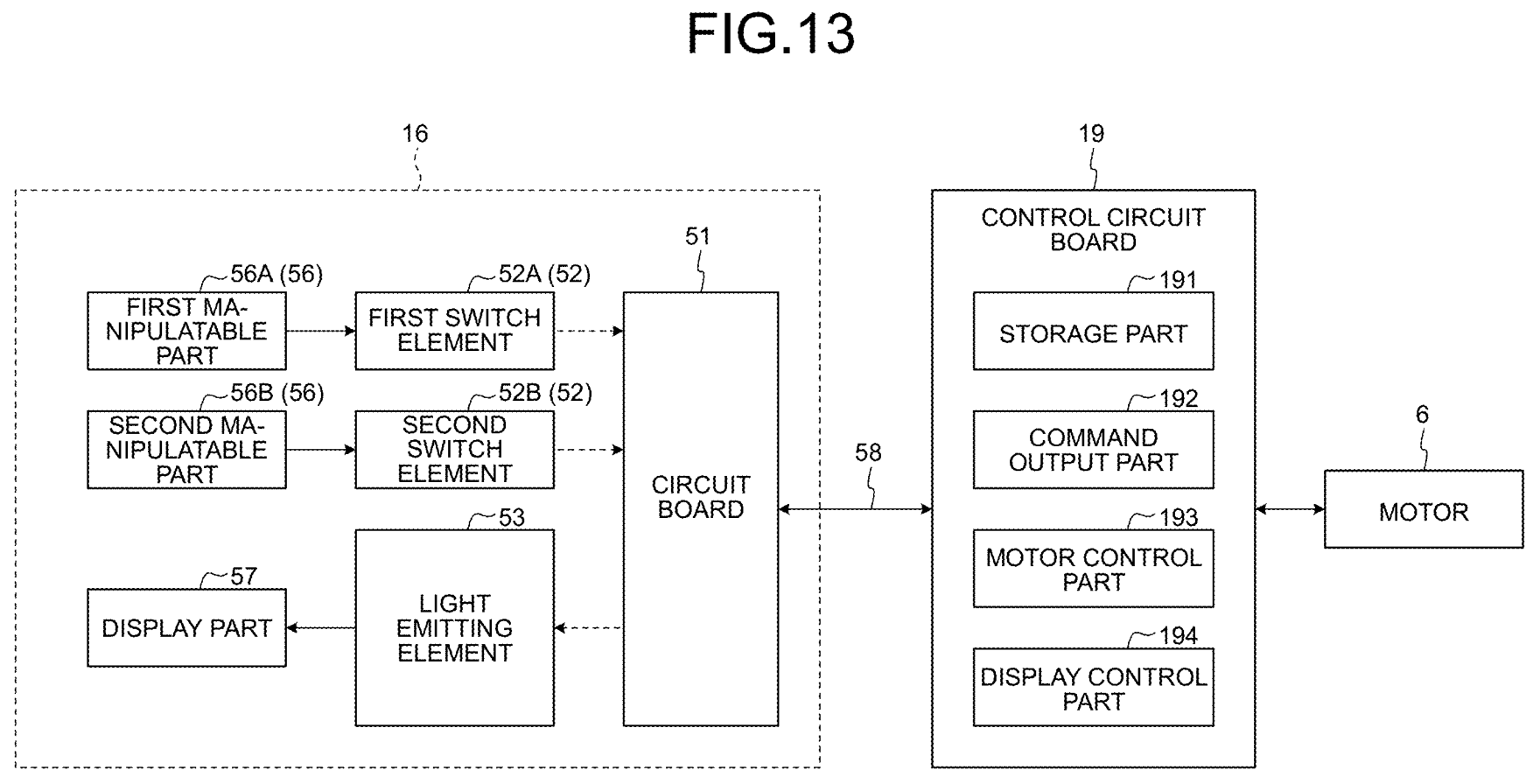

As illustrated in FIG. 13, the control circuit board 19 includes a storage part 191, a command output part 192, a motor control part 193, and a display control part 194.

The storage part 191 stores software for executing the plurality of application modes (MAX mode, HARD mode, MEDIUM mode, SOFT mode, WOOD mode, T mode, and BOLT mode) of the motor 6.

When the manipulatable part(s) 56 of the operation-and-display part 16 is (are) manipulated, a command output part 192 outputs a mode command, which sets the application mode. That is, the command output part 192 outputs a mode command, which is for setting the application mode of the motor 6, based on the operation signal transmitted from the circuit board 51.

The motor control part 193 outputs a motor control signal, which controls the motor 6, based on the mode command output from the command output part 192. The motor control part 193 controls the motor 6 based on the application mode set by operating the manipulatable part(s) 56.

The display control part 194 outputs a display control signal, which controls the display parts 57 (the light emitting elements 53) of the operation-and-display part 16, based on the mode command output from the command output part 192. The display control signal output from the display control part 194 is transmitted to the circuit board 51 via the lead wire. The circuit board 51 controls the display parts 57 based on the display control signal transmitted from the display control part 194. The circuit board 51 causes the plurality of light emitting elements 53 to operate with a light emission pattern corresponding to the application mode that was set.

Operation of Impact Tool

Next, the operation of the power tool 1 will be described. For example, when the screw tightening work is performed on the work target (workpiece), a tool accessory (driver bit), which is used in the screw tightening work, is inserted into the tool hole 10A of the anvil 10. The tool accessory inserted into the tool hole 10A is held by the tool holding mechanism 11. After the tool accessory has been mounted on the anvil 10, the user grips the grip part 22 with, for example, the right hand and pulls the trigger lever 14 with the index finger of the right hand. When the trigger lever 14 is pulled, electric power is supplied from the battery pack 25 to the motor 6, the motor 6 is started (energized), and at the same time, the light assemblies 18 turn ON. When the motor 6 is started, the rotor shaft part 33 of the rotor 27 rotates. When the rotor shaft part 33 rotates, a rotational force of the rotor shaft part 33 is transmitted to the planetary gears 42 via the pinion gear

41. Because the planetary gears 42 mesh with the internal teeth of the internal gear 43, the planetary gears 42 revolve around the pinion gear 41 while rotating. The planetary gears 42 are rotatably supported on the spindle 8 via the respective pins 42P. When the planetary gears 42 are revolving around the pinion gear 41, the spindle 8 rotates at the rotational speed lower than the rotational speed of the rotor shaft part 33.

When the hammer 47 and the anvil protruding part 10D are in contact with each other and the spindle 8 rotates, the anvil 10 rotates together with the hammer 47 and the spindle 8. Owing to the rotation of the anvil 10, the screw tightening work progresses.

When a load that is a predetermined value or greater acts on the anvil 10 during the progression of the screw tightening work, the rotation of the anvil 10 and the hammer 47 stops. When the rotation of the hammer 47 has stopped and the spindle 8 rotates relative to the hammer 47, the hammer 47 moves rearward. In response to the rearward movement of the hammer 47, the contact between the hammer 47 and the anvil protruding part 10D is released. After the hammer 47 has moved rearward, the hammer 47 moves forward while rotating owing to the elastic force of the coil spring 49. When the hammer 47 moves forward while rotating relative to the anvil 10, the anvil 10 is impacted in the rotation direction by the hammer 47. As a result, the anvil 10 rotates about the motor rotation axis AX at a higher torque. Therefore, the screw can be tightened in a work target at a higher torque.

In the screw tightening work, when the user desires to change the application mode of the motor 6, the user can manipulate the manipulatable parts 56 of the operation-and-display part 16 while the front portion of the power tool 1 remains oriented toward the work target. That is, in the state in which the user grips the grip part 22 with, for example, the right hand, the user can manipulate the manipulatable parts 56 of the operation-and-display part 16 with the left hand, while maintaining his/her working posture using the power tool 1 and without pulling the power tool 1 rearward. In addition, when the application mode of the motor 6 has been changed, a display pattern of the display parts 57 (the light emission pattern of the light emitting elements 53) changes. The user can view the display part 57 of the operation-and-display part 16 while maintaining his/her working posture using the power tool 1 and without pulling the power tool 1 back toward him/her.

Effects

As described above, in the embodiment, the power tool 1 includes the motor 6, the control circuit board 19 that controls the motor 6, and the panel 55 that is manipulated to change the control method of the motor 6. The resin part 60 that supports the panel 55 holds the control circuit board 19.

In the above configuration, the panel 55 and the control circuit board 19 are supported by one resin part 60, so that the number of components of the power tool 1 is reduced. Since the number of components of the power tool 1 is reduced, the number of assembly processes of the power tool 1 is reduced.

In the embodiment, the panel 55 is in contact with the resin part 60.

In the above configuration, the panel 55 is directly supported by the resin part 60, so that the number of components of the power tool 1 is reduced.

In the embodiment, the panel 55 is fixed to the resin part 60.

In the above configuration, relative movement between the panel 55 and the resin part 60 is suppressed.

In the embodiment, the panel 55 faces the circuit board 51. The resin part 60 holds the circuit board 51.

In the above configuration, the resin part 60 supports not only the panel 55 and the control circuit board 19 but also the circuit board 51, so that the number of components of the power tool 1 is reduced.

In the embodiment, the panel 55 includes the manipulatable parts 56, which are the elastically deformable parts. The circuit board 51 supports the switch elements 52 manipulated by the manipulatable parts 56 being pressed.

In the above configuration, the manipulatable parts 56 are pressed to manipulate the switch elements 52, thereby changing the control method of the motor 6.

In the embodiment, the panel 55 includes the display parts 57, which are the optically transmissive parts. The circuit board 51 supports the light emitting elements 53 that irradiate the display parts 57 with light.

In the above configuration, the light emission state of the light emitting elements 53 is changed according to the change of the control method of the motor 6, so that the user can visually recognize that the control method of the motor 6 has been changed.

In the embodiment, the power tool 1 includes: the motor 6; the anvil 10, which is the output part; the housing 2; the control circuit board 19; and the operation-and-display part 16. The motor 6 includes the rotor 27 that rotates about the motor rotation axis AX extending in the front-rear direction. The anvil 10 is disposed forward of the motor 6 and rotated by the rotational force of the rotor 27. The housing 2 includes: the motor housing part 21 that houses the motor 6; the grip part 22 that extends downward from the motor housing part 21; and the battery holding part 23 that is connected to the lower end of the grip part 22. The control circuit board 19 is housed in the housing 2. The operation-and-display part 16 is disposed at the rear portion of the housing 2 and connected to the control circuit board 19.

In the above configuration, since the operation-and-display part 16 is disposed at the rear portion of the housing, the user can manipulate and view the operation-and-display part 16 while the front portion of the power tool 1 remains oriented toward the work target. That is, the user can manipulate and view the operation-and-display part 16 while holding the grip part 22 with his/her hand and maintaining his/her working posture using the power tool 1 and without pulling the power tool 1 back toward him/her. Therefore, deterioration in manipulativeness (operability) and visibility of the operation-and-display part 16 is suppressed. In addition, since the operation-and-display part 16 is disposed at the rear portion of the housing 2, it is not necessary to provide, at the front portion of the housing 2, a region for the operation-and-display part 16. Therefore, the weight balance of the power tool 1 is improved.

In the embodiment, the operation-and-display part 16 is disposed at the rear portion of the battery holding part 23.

In the above configuration, since the operation-and-display part 16 is disposed at the rear portion of the battery holding part 23, the user can manipulate and view the operation-and-display part 16 while the front portion of the power tool 1 remains oriented toward the work target. In addition, since the operation-and-display part 16 is disposed at the rear portion of the battery holding part 23, it is not necessary to provide, at the front portion of the battery holding part 23, a region for the operation-and-display part 16. Therefore, the weight balance of the power tool 1 is improved.

In the embodiment, the operation-and-display part 16 is disposed in the recess 23R provided in the battery holding part 23.

In the above configuration, the operation-and-display part 16 does not protrude from a surface of the battery holding part 23, the user can easily handle the power tool 1.

In the embodiment, the center of the operation-and-display part 16 coincides with the center of the battery holding part 23 in the left-right direction. In the above configuration, the weight balance of the power tool 1 in the left-right direction is improved. Further, the manipulativeness (operability) and visibility of the operation-and-display part 16 are improved.

In the embodiment, the dimension of the operation-and-display part 16 in the left-right direction is larger than the dimension of the operation-and-display part 16 in the up-down direction.

In the above configuration, a shape of the operation-and-display part 16 is long in the left-right direction, so that the manipulativeness (operability) and visibility of the operation-and-display part 16 are improved.

In the embodiment, the operation-and-display part 16 is disposed more rearward than the rear end 22B of the grip part 22.

In the above configuration, the weight balance of the power tool 1 in the front-rear direction is improved. Further, the manipulativeness (operability) and visibility of the operation-and-display part 16 are improved.

In the embodiment, the operation-and-display part 16 is disposed more rearward than the rear end 21B of the motor housing part 21.

In the above configuration, the weight balance of the power tool 1 in the front-rear direction is improved. Further, the manipulativeness (operability) and visibility of the operation-and-display part 16 are improved.

In the embodiment, the control circuit board 19 is housed in the battery holding part 23.

In the above configuration, a distance between the operation-and-display part 16 and the control circuit board 19 is shortened. Therefore, it is possible to suppress an increase in size and complexity of a connection structure between the operation-and-display part 16 and the control circuit board 19.

In the embodiment, the rear end 19B of the control circuit board 19 is positioned more rearward than the rear end 22B of the grip part 22.

In the above configuration, the weight balance of the power tool 1 in the front-rear direction is improved.

In the embodiment, the operation-and-display part 16 is disposed rearward of the control circuit board 19.

In the above configuration, the operation-and-display part 16 and the control circuit board 19 do not overlap each other, so that an increase in size of the battery holding part 23 is suppressed, and the weight balance of the power tool 1 is improved.

In the embodiment, the surface 16S of the operation-and-display part 16 is inclined downward as it goes rearward.

In the above configuration, the manipulativeness (operability) and visibility of the operation-and-display part 16 are improved.

In the embodiment, the surface 51S of the circuit board 51 is inclined downward as it goes rearward.

In the above configuration, an increase in size of the operation-and-display part 16 is suppressed. Further, the manipulativeness (operability) and visibility of the operation-and-display part 16 are improved.

In the embodiment, the surface 19S of the control circuit board 19 is parallel to the motor rotation axis AX.

In the above configuration, since the circuit board 51 and the control circuit board 19 are arranged to face different directions, an increase in size of the power tool 1 is suppressed.

In the embodiment, the control circuit board 19 includes: the storage part 191 that stores software for executing the plurality of application modes of the motor 6; the command output part 192 that outputs a mode command, which is for setting the application mode, by manipulating the manipulatable part(s) 56 of the operation-and-display part 16; the motor control part 193 that controls the motor 6 based on the mode command; and the display control part 194 that controls the display parts 57 of the operation-and-display part 16 based on the mode command.

In the above configuration, the application mode of the motor 6 is set by manipulating the manipulatable part(s) 56 of the operation-and-display part 16. The display parts 57 of the operation-and-display part 16 are controlled based on the mode command, so that the user can know the application mode of the motor 6 by looking at the display parts 57.

In the embodiment, in the front-rear direction, the first distance G1 between the front end 22A of the lower end of the grip part 22 and the front end 23A of the battery holding part 23 is equal to or shorter than the second distance G2 between the rear end 22B of the lower end of the grip part 22 and the rear end 23B of the battery holding part 23.

In the above configuration, the grip part 22 is disposed substantially at the center of the battery holding part 23 in the front-rear direction, so that the weight balance of the power tool 1 in the front-rear direction is improved.

In the embodiment, the power tool 1 includes the battery mounting part 13 disposed at the lower portion of the battery holding part 23. The battery pack 25 is inserted from the front of the battery holding part 23 so as to be mounted on the battery mounting part 13.

In the above configuration, the user can easily mount the battery pack 25 on the battery mounting part 13. In addition, in a state where the battery pack 25 is mounted on the battery mounting part 13, the weight balance of the power tool 1 in the front-rear direction is improved.

Second Embodiment

A second embodiment will be described. In the following description, the same or equivalent components as those of the above-described embodiment are denoted by the same reference numerals, and a description of the components is simplified or omitted.

Figure 14:
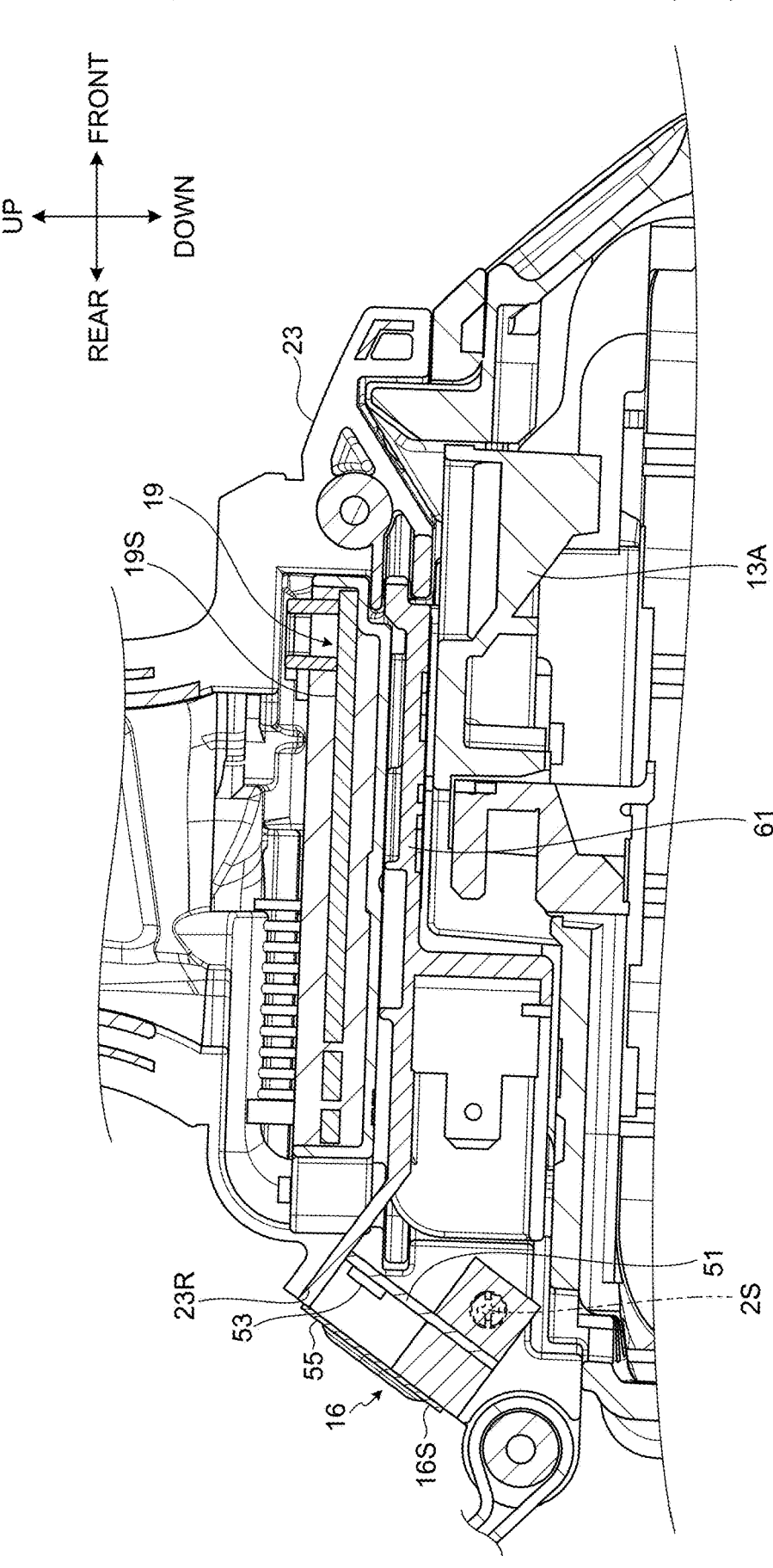
FIG. 14 is a longitudinal sectional view illustrating a lower portion of a power tool according to an embodiment.

FIG. 14 is a longitudinal sectional view illustrating a lower portion of a power tool 1 according to the embodiment. In the embodiment, a resin part 61 supports a panel 55. The resin part 61 holds a body-side terminal 13A of a battery mounting part 13. The resin part 61 holds the circuit board 51. The panel 55 is in contact with a rear portion of the resin part 61. The panel 55 is fixed to the rear portion of the resin part 61. The rear portion of the resin part 61 is disposed in a recess 23R provided in a battery holding part 23.

The resin part 61 is fixed to the battery holding part 23. The resin part 61 is sandwiched between the left housing 2L and the right housing 2R. The resin part 61 is fixed to the left housing 2L and the right housing 2R by a screw 2S. The resin part 61 has a through-hole through which the screw 2S passes. The through-hole penetrates through a left end surface and a right end surface of the resin part 61. The screw 2S passes through a screw opening provided in the right housing 2R, passes through the resin part 61, and is then inserted into a screw hole provided in the left housing 2L. The panel 55, the body-side terminal 13A, and the circuit board 51 are each fixed to the battery holding part 23 via the resin part 61.

The control circuit board 19, the circuit board 51, the switch elements 52, the light emitting elements 53, and the resin part 61 are each disposed inside the battery holding part 23.

The control circuit board 19 is housed in a board case 19C. The control circuit board 19 is disposed inside the battery holding part 23 in a state of being housed in the board case 19C. The board case 19C is made of a synthetic resin. The board case 19C and the resin part 61 are provided separately from each other. The board case 19C and the resin part 61 may be integrated with each other.

As described above, in the embodiment, the power tool 1 includes: the motor 6; the battery mounting part 13 including the body-side terminal 13A through which electric power from a battery pack 25 is supplied; and the panel 55 that is manipulated to change a control method of the motor 6. The resin part 61 that supports the panel 55 holds the body-side terminal 13A.

In the above configuration, the panel 55 and the body-side terminal 13A of the battery mounting part 13 are supported by one resin part 61, so that the number of components of the power tool 1 is reduced. Since the number of components of the power tool 1 is reduced, the number of assembly processes of the power tool 1 is reduced.

In the embodiment, the panel 55 is in contact with the resin part 61.

In the above configuration, the panel 55 is directly supported by the resin part 61, so that the number of components of the power tool 1 is reduced.

In the embodiment, the panel 55 is fixed to the resin part 61.

In the above configuration, relative movement between the panel 55 and the resin part 61 is suppressed.

In the embodiment, the panel 55 faces the circuit board 51. The resin part 61 holds the circuit board 51.

In the above configuration, the resin part 61 supports not only the panel 55 and the body-side terminal 13A but also the circuit board 51, so that the number of components of the power tool 1 is reduced.

Third Embodiment

A third embodiment will be described. In the following description, the same or equivalent components as those of the above-described embodiment are denoted by the same reference numerals, and a description of the components is simplified or omitted.

Figure 15:
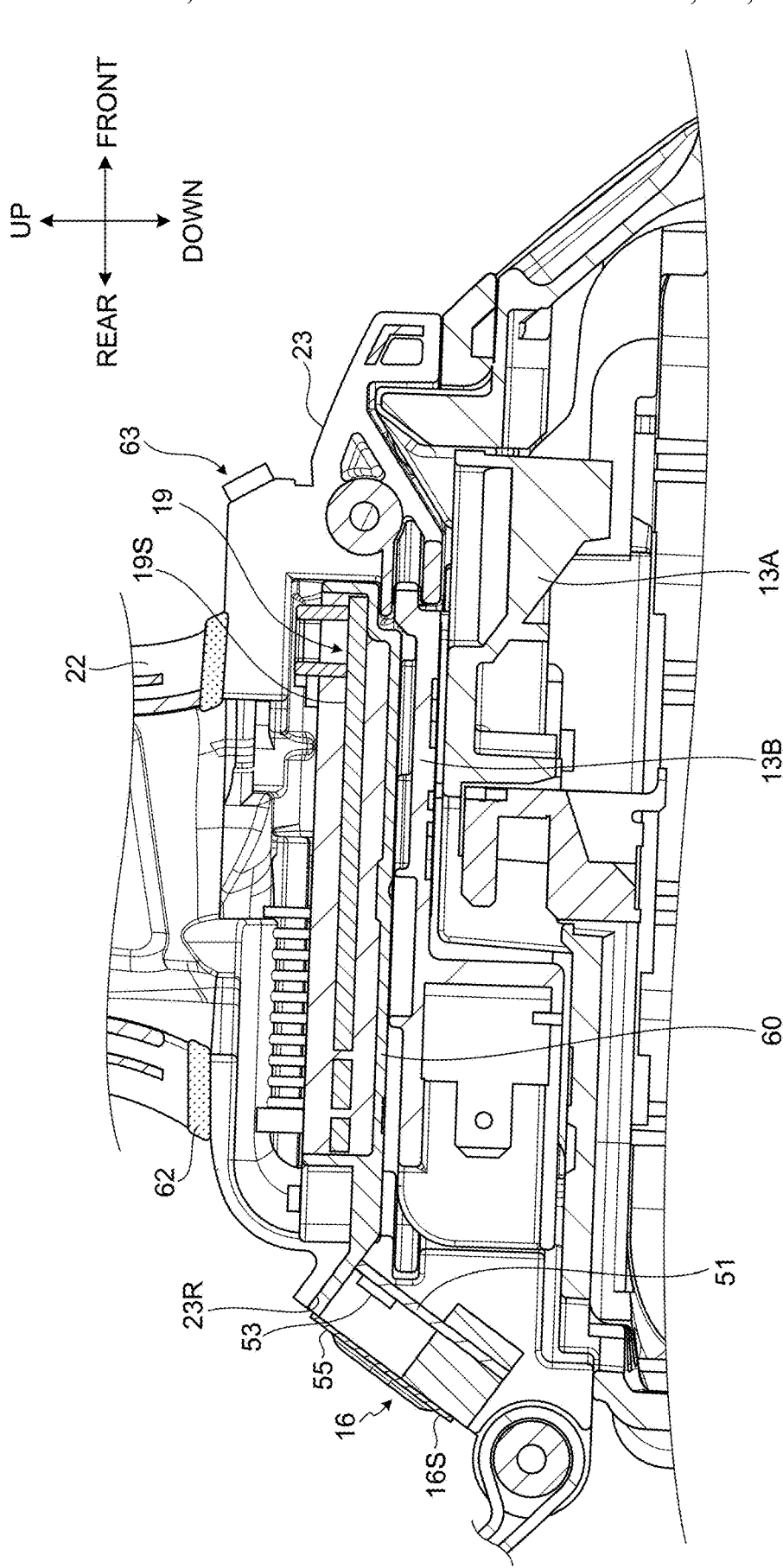
FIG. 15 is a longitudinal sectional view illustrating a lower portion of a power tool according to an embodiment.

FIG. 15 is a longitudinal sectional view illustrating a lower portion of a power tool 1 according to the embodiment. Similarly to the above-described embodiment, a panel 55 is disposed at a rear portion of a battery holding part 23. The panel 55 is supported by a resin part 61.

In the embodiment, an elastic body 62 is disposed between a grip part 22 and the battery holding part 23. In the embodiment, the grip part 22 and the battery holding part 23 are separated from each other. The grip part 22 and the battery holding part 23 are provided separately from each other. The grip part 22 and the battery holding part 23 are connected via the elastic body 62. Rubber is exemplified as the elastic body 62. The elastic body 62 has a ring shape along a lower end portion of the grip part 22. The elastic body 62 may be implemented by, for example, two C-shape elastic bodies.

A light 63 is disposed at a front portion of the battery holding part 23. The light 63 emits illumination light. The light 63 illuminates an anvil 10 and around the anvil 10 with the illumination light. In addition, the light 63 illuminates a tool accessory mounted on the anvil 10 and the periphery of the bit with the illumination light.

As described above, in the embodiment, the power tool 1 includes: the motor 6; the motor housing part 21 that houses the motor 6; the grip part 22 that extends from the motor housing part 21; the battery holding part 23 to which a battery pack 25 for supplying electric power to the motor 6 is attached; the elastic body 62 disposed between the grip part 22 and the battery holding part 23; and the panel 55 that is disposed at the rear portion of the battery holding part 23 and manipulated to change a control method of the motor 6.

In the above configuration, the elastic body 62 prevents vibration of the motor 6 from being transmitted to the battery holding part 23. Since vibration of the battery holding part 23 is suppressed, manipulativeness (operability) and visibility of the panel 55 are improved. In addition, since vibration of an operation-and-display part 16 including the panel 55 is suppressed, durability of the operation-and-display part 16 is improved.

In the embodiment, the power tool 1 includes the light 63 disposed at the front portion of the battery holding part 23.

In the above configuration, the light 63 illuminates the anvil 10 and around the anvil 10 with the illumination light. In addition, the light 63 illuminates the accessory tool mounted on the anvil 10 and the periphery of the bit are illuminated with the illumination light.

Figure 16:
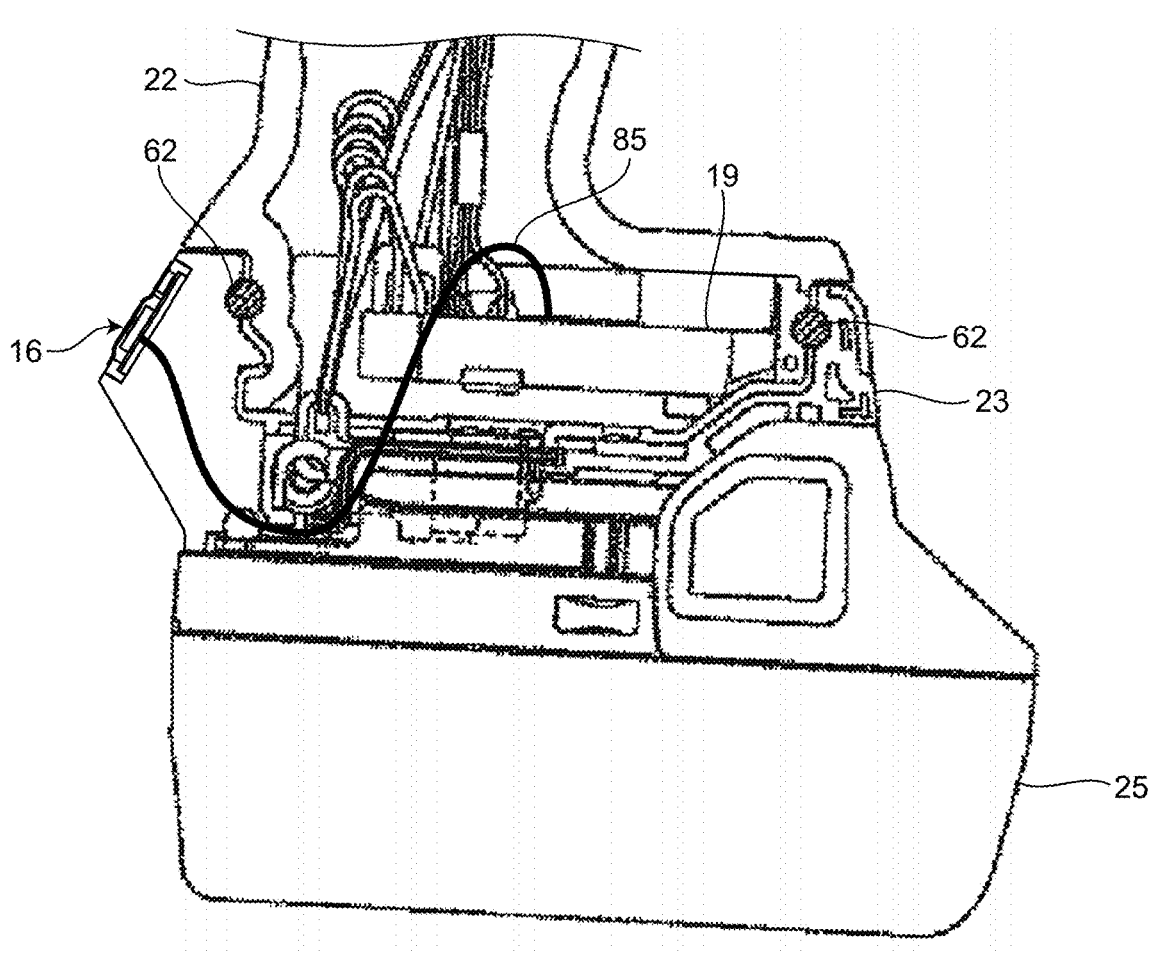
FIG. 16 is a view illustrating a modification of the power tool according to the embodiment.
Figure 16:
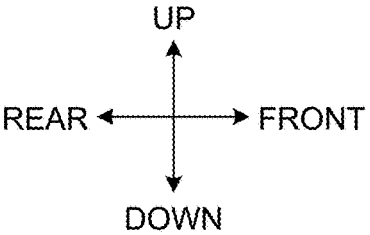
Figure 17:
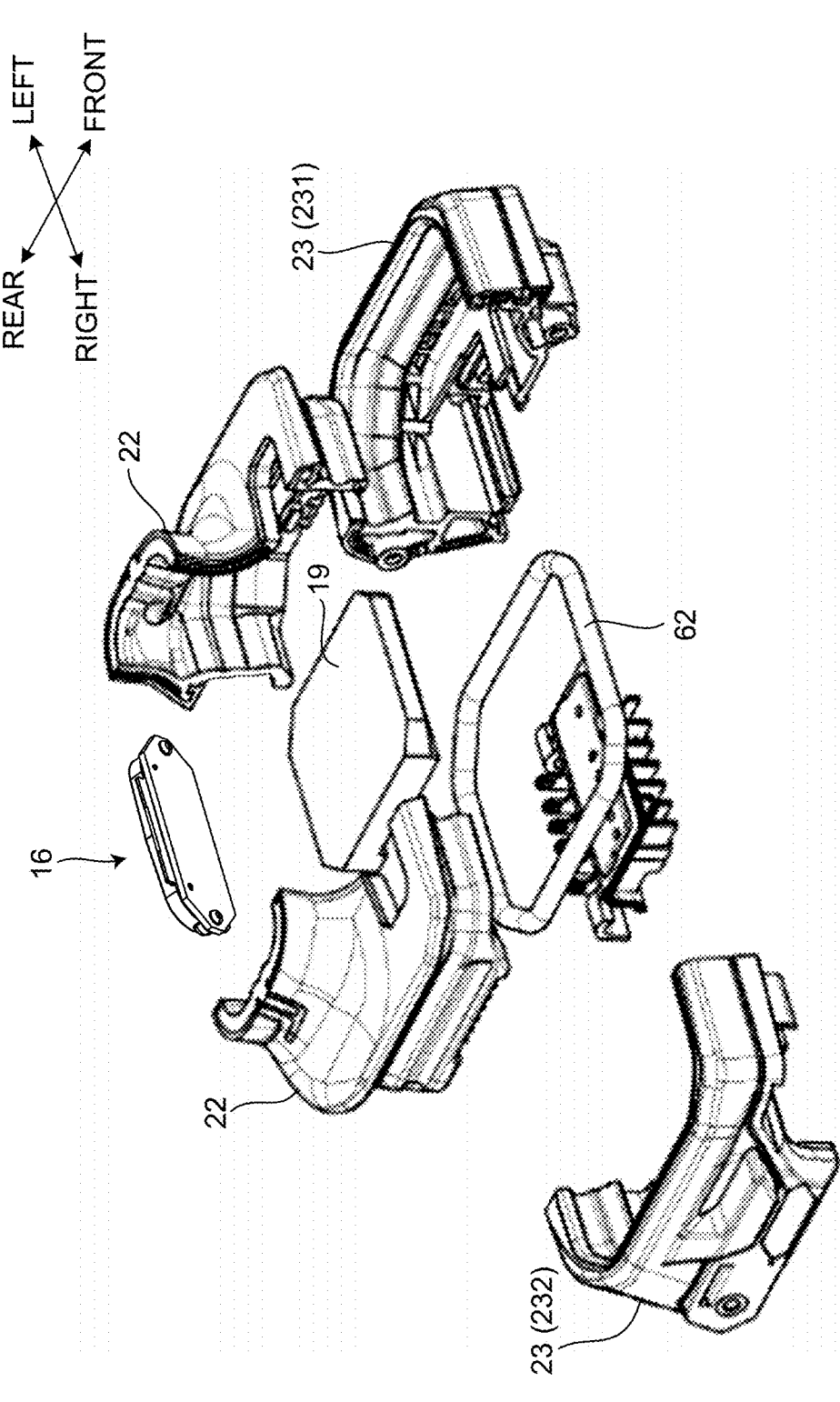
FIG. 17 is an exploded perspective view illustrating a portion of the power tool according to the embodiment.

FIG. 16 is a view illustrating a modification of the power tool 1 according to the third embodiment. FIG. 17 is an exploded perspective view illustrating a portion of the power tool 1 according to the third embodiment. As in the embodiment illustrated in FIG. 15, the grip part 22 and the battery holding part 23 are separated from each other. The elastic body 62 is disposed between the grip part 22 and the battery holding part 23. The operation-and-display part 16 is disposed at the rear portion of the battery holding part 23. The operation-and-display part 16 and a control circuit board 19 are connected via a lead wire 85.

As illustrated in FIG. 17, the grip part 22 and the battery holding part 23 are separated from each other. The elastic body 62 is disposed between the grip part 22 and the battery holding part 23. The elastic body 62 is implemented by one ring-shaped elastic body. The elastic body 62 may be implemented by, for example, two C-shaped elastic bodies. The operation-and-display part 16 is disposed at the rear portion of the battery holding part 23. The grip part 22 has a half-split housing structure split into left and right portions. The battery holding part 23 also has a half-split housing structure divided into left and right portions. The operation-and-display part 16 is sandwiched between a rear portion of the left battery holding part 231 and a rear portion of the right battery holding part 232 in the left-right direction.

Figure 18:
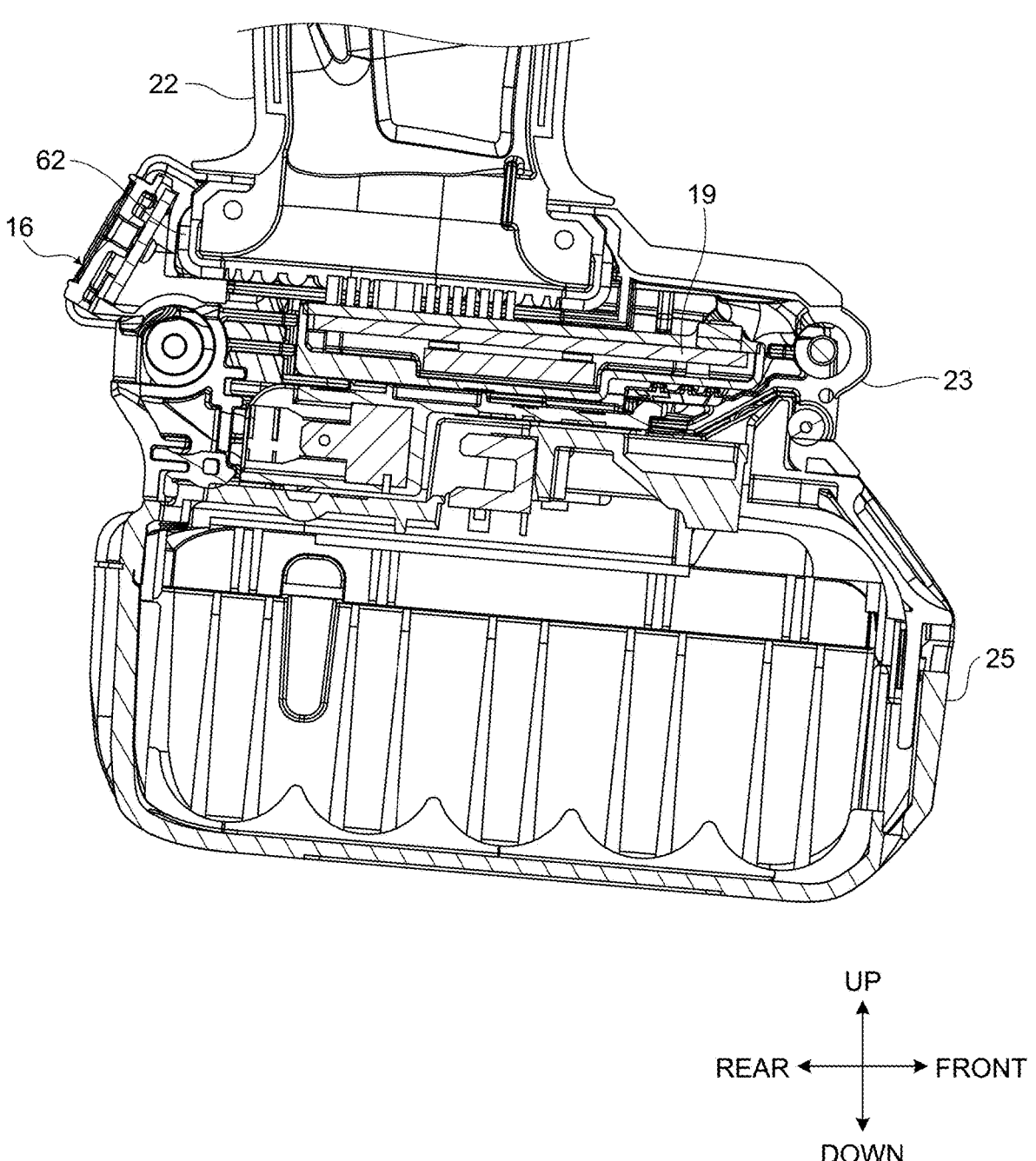
FIG. 18 is a cross-sectional view illustrating a portion of a modification of the power tool according to the embodiment.
Figure 19:
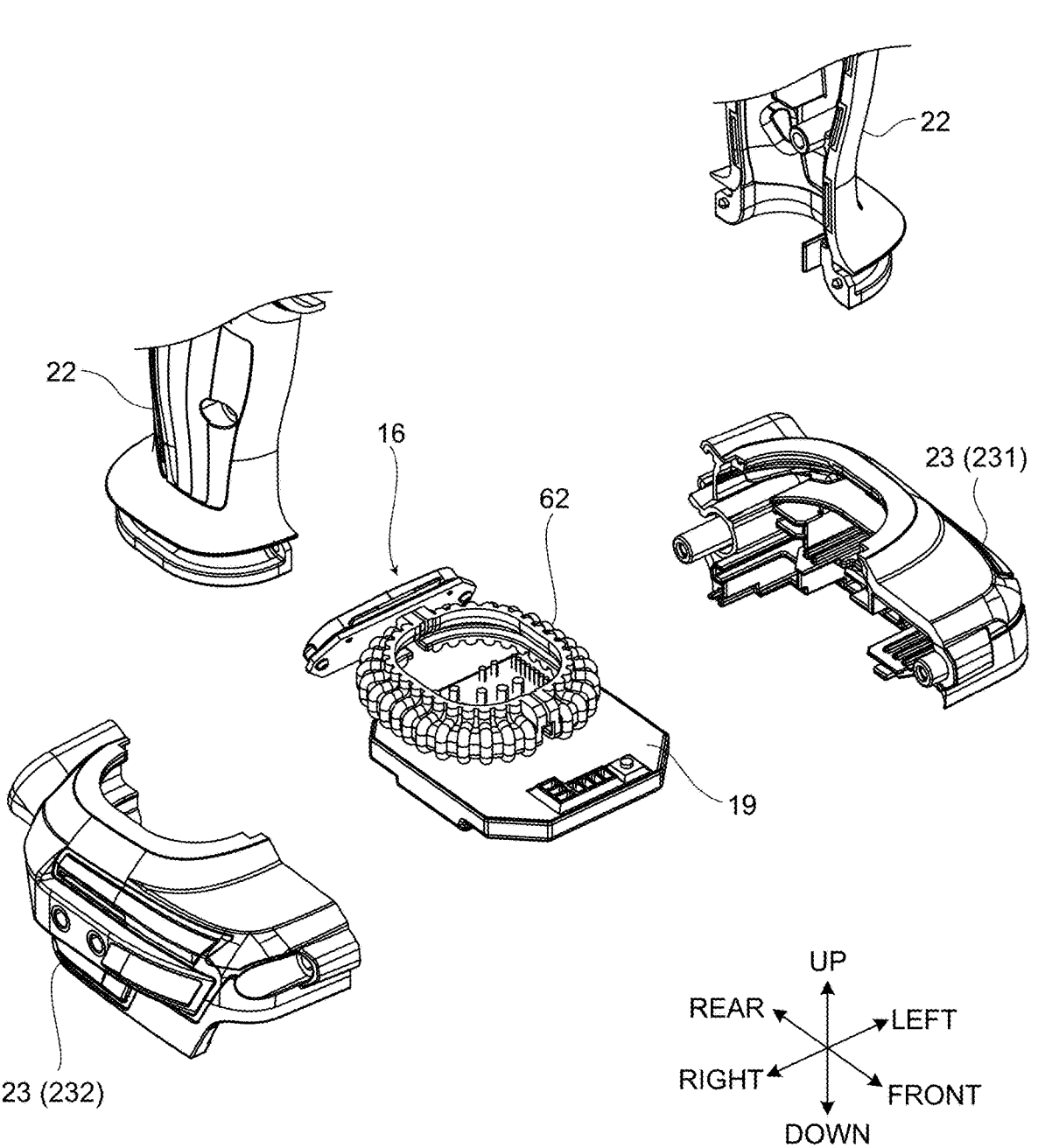
FIG. 19 is an exploded perspective view illustrating a portion of the modification of the power tool according to the embodiment.

FIG. 18 is a cross-sectional view illustrating a portion of a modification of the power tool 1 according to the third embodiment. FIG. 19 is an exploded perspective view illustrating a portion of the modification of the power tool 1 according to the third embodiment. As in the embodiment illustrated in FIGS. 15 and 16, the grip part 22 and the battery holding part 23 are separated from each other. The elastic body 62 is disposed between the grip part 22 and the battery holding part 23. The elastic body 62 is implemented by one ring-shaped elastic body. The elastic body 62 may be implemented by, for example, two C-shaped elastic bodies. The operation-and-display part 16 is disposed at the rear portion of the battery holding part 23. The grip part 22 has a half-split housing structure split into left and right portions. The battery holding part 23 also has a half-split housing structure divided into left and right portions. The operation-and-display part 16 is sandwiched between a rear portion of the left battery holding part 231 and a rear portion of the right battery holding part 232 in the left-right direction.

Fourth Embodiment

A fourth embodiment will be described. In the following description, the same or equivalent components as those of the above-described embodiment are denoted by the same reference numerals, and a description of the components is simplified or omitted.

Figure 20:
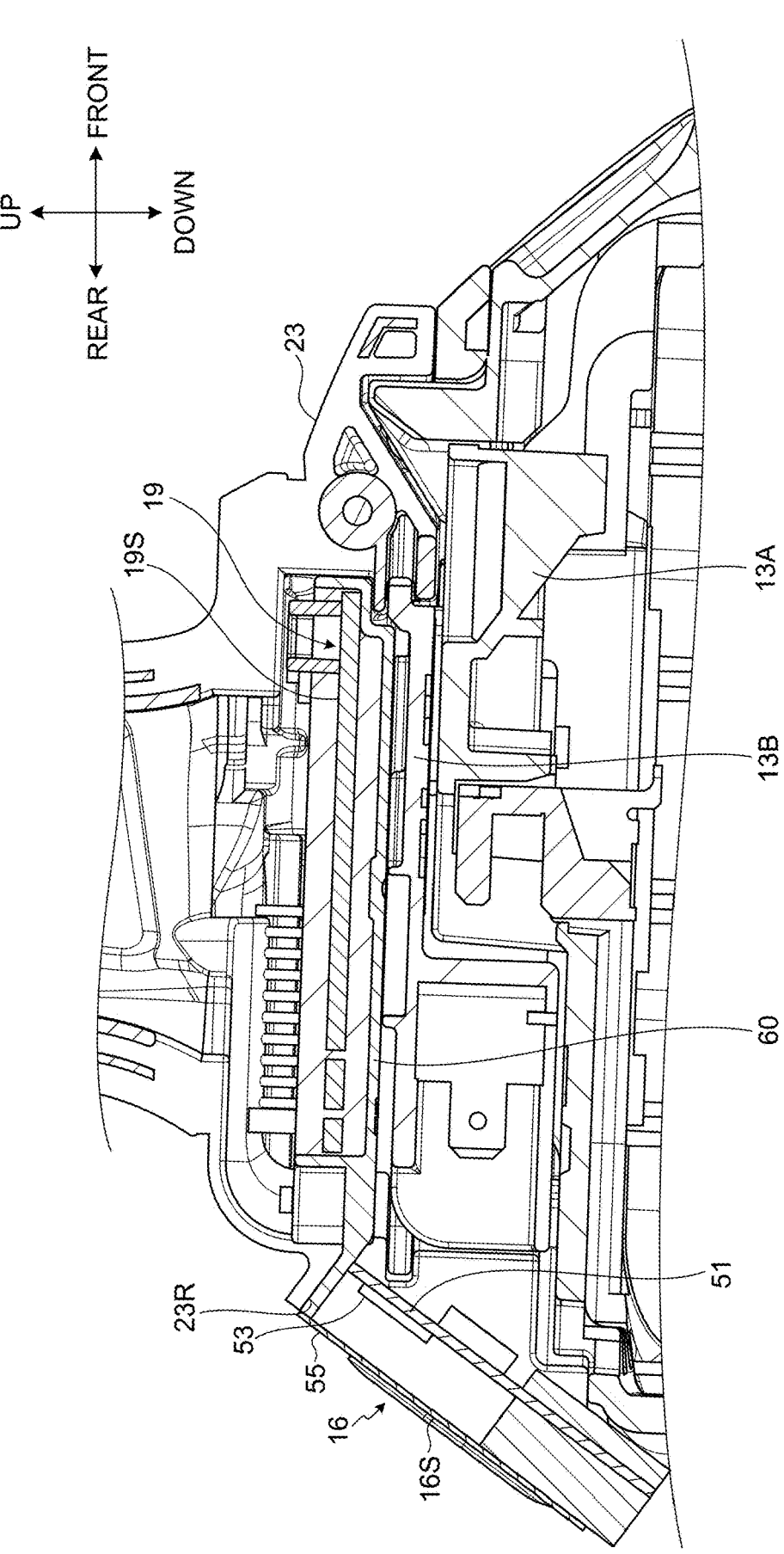
FIG. 20 is a longitudinal sectional view illustrating a lower portion of a power tool according to an embodiment.

FIG. 20 is a longitudinal sectional view illustrating a lower portion of a power tool 1 according to the embodiment. As illustrated in FIG. 20, a lower end of a panel 55 (an operation-and-display part 16) may be positioned more downward than a body-side terminal 13A. Since the panel 55 is enlarged, display items on the panel 55 can be enlarged, so that visibility is improved.

Fifth Embodiment

A fifth embodiment will be described. In the following description, the same or equivalent components as those of the above-described embodiment are denoted by the same reference numerals, and a description of the components is simplified or omitted.

Figure 21:
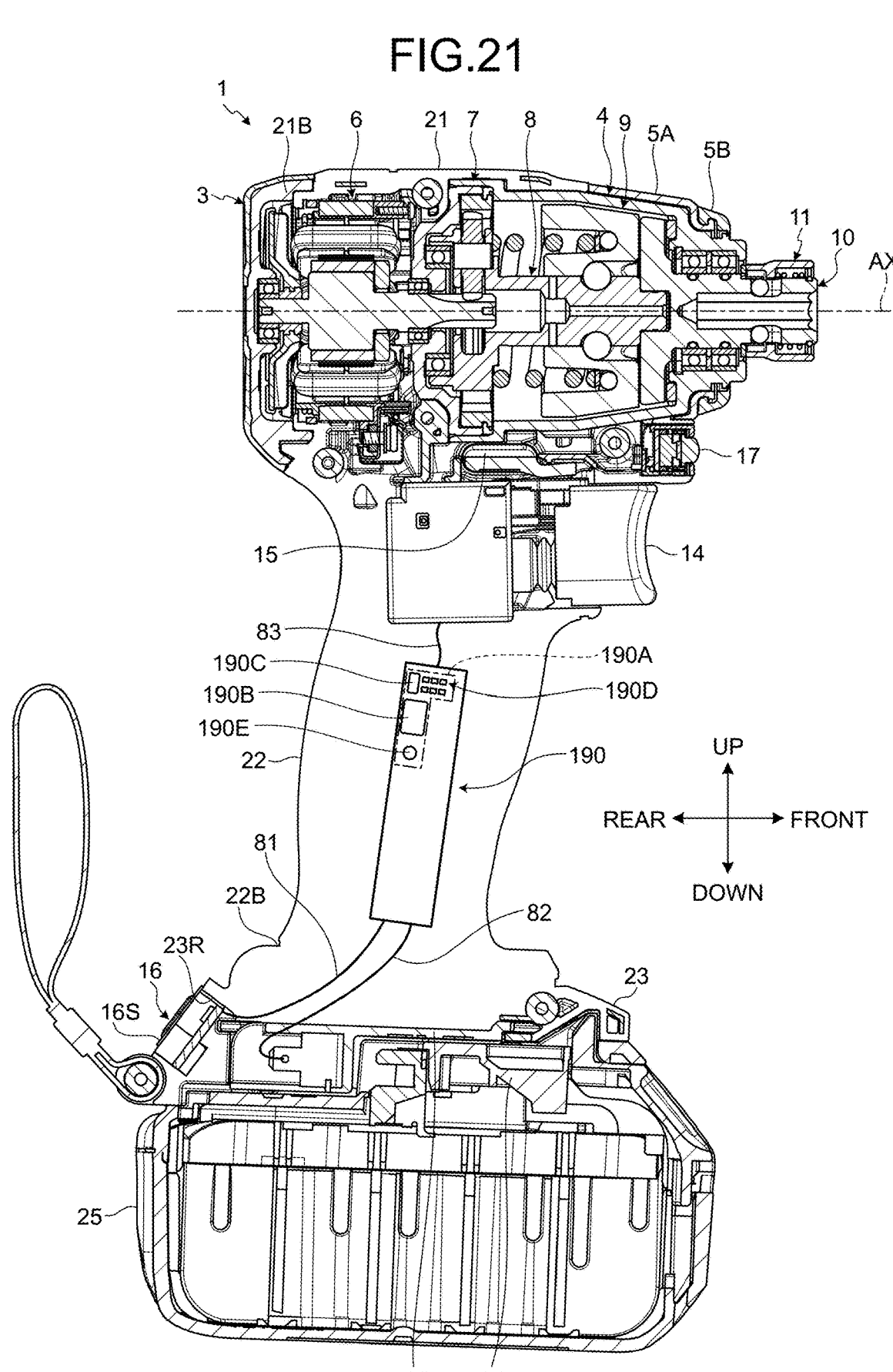
FIG. 21 is a longitudinal sectional view illustrating a power tool according to an embodiment.

FIG. 21 is a longitudinal sectional view illustrating a power tool 1 according to the embodiment. As illustrated in FIG. 21, a control circuit board 190 that controls a motor 6 is housed in a grip part 22. An operation-and-display part 16 including a panel 55 manipulated to change a control method of the motor 6 is disposed at a rear portion of a battery holding part 23. The control circuit board 190 and the operation-and-display part 16 are connected via a lead wire 81. The control circuit board 190 and a body-side terminal 13A are connected via a lead wire 82. The control circuit board 190 and a switch circuit connected to a trigger lever 14 are connected via a lead 83.

A control circuit 190A of the control circuit board 190 includes a microcomputer 190B, a gate drive circuit 190C, an inverter circuit 190D, and a capacitor 190E. The microcomputer 190B includes: a processor such as a central processing unit (CPU); nonvolatile memory such as a read only memory (ROM); and volatile memory such as a random access memory (RAM). The inverter circuit 190D supplies a drive current to the coils 31 of the motor 6 using electric power supplied from a battery pack 25. The inverter circuit 190D includes six switching elements. The switching element includes a field effect transistor (FET). The switching element may be an insulated gate bipolar transistor (IGBT) or a metal-oxide-semiconductor field-effect transistor (MOSFET). The gate drive circuit 190C is a drive circuit that drives the switching elements of the inverter circuit 190D. The microcomputer 190B outputs a control signal to the gate drive circuit 190C to drive the switching elements of inverter circuit 190D. The capacitor 190E is provided to reduce noise at the time of switching by the switching elements.

A surface of the control circuit board 190 is orthogonal to the motor rotation axis AX. A surface 16S of the operation-and-display part 16 is inclined downward as it goes rearward.

As described above, in the embodiment, the power tool 1 includes: the motor 6 including a rotor 27 that rotates about the motor rotation axis AX extending in the front-rear direction; an anvil 10, which is an output part, that is disposed forward of the motor 6 and is rotated by a rotational force of the rotor 27; a housing 2 including a motor housing part 21 that houses the motor 6; the grip part 22 that extends downward from the motor housing part 21; and the battery holding part 23 connected to a lower end of the grip part 22; the control circuit board 190 that is housed in the grip part 22 and controls the motor 6; and the operation-and-display part 16 that is disposed at a rear portion of the battery holding part 23 and includes the panel 55 manipulated to change the control method of the motor 6.

In the above configuration, the control circuit board 190 is housed in the grip part 22, so that an increase in size of the power tool 1 is suppressed. In particular, an increase in size of the battery holding part 23 is suppressed.

In the embodiment, the surface of the control circuit board 190 is orthogonal to the motor rotation axis AX.

In the above configuration, an increase in size of the power tool 1 is suppressed. The control circuit board 190 is long in the up-down direction. The grip part 22 is also long in the up-down direction. Since the control circuit board 190 is housed along the grip part 22, an increase in size of the power tool 1 is suppressed.

Figure 22:
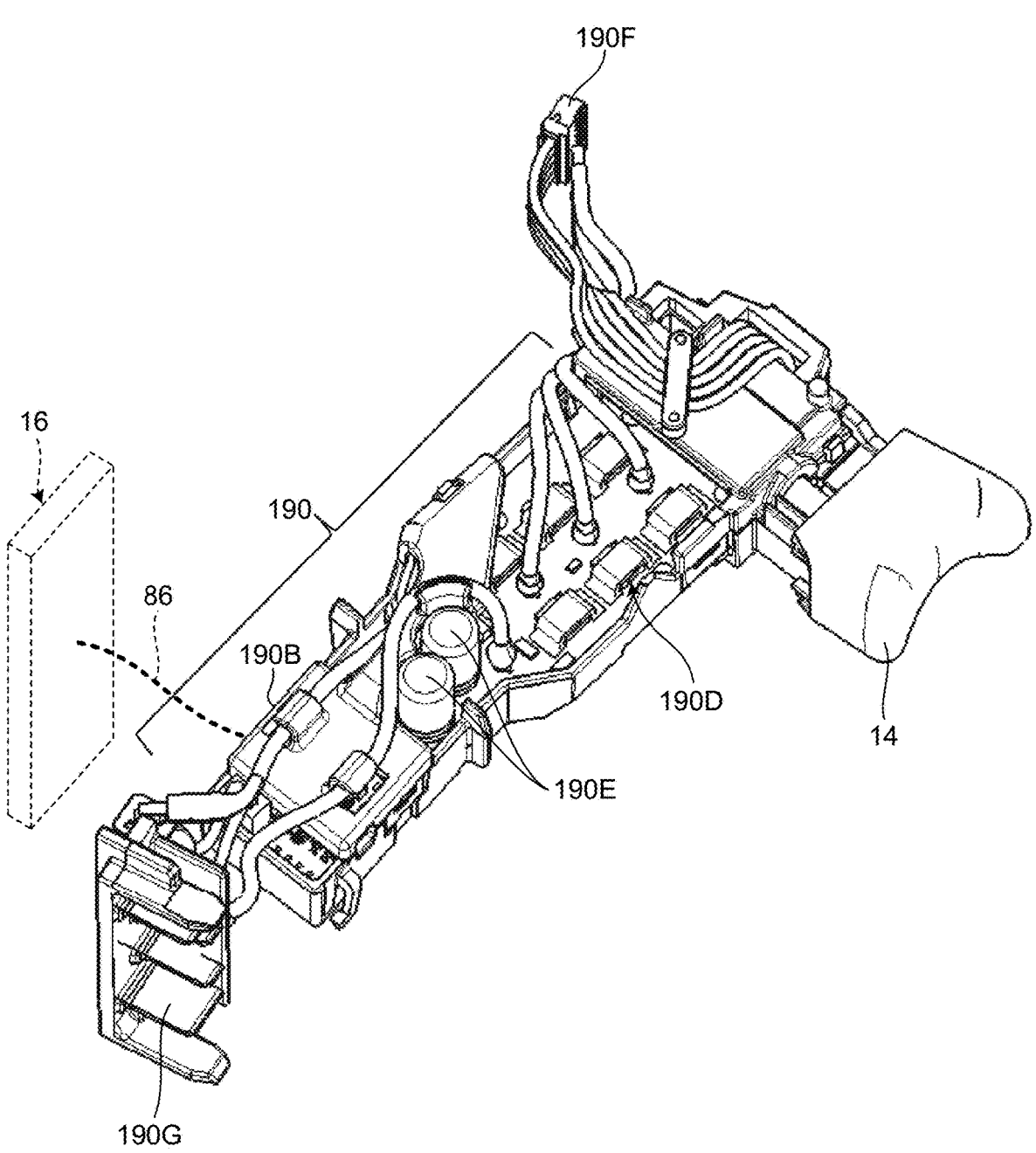
FIG. 22 is a perspective view illustrating a modification of a control circuit board and a trigger lever according to the embodiment.

FIG. 22 is a perspective view illustrating a modification of the control circuit board 190 and the trigger lever 14 according to the fifth embodiment. As illustrated in FIG. 22, the control circuit board 190 and the switch circuit connected to the trigger lever 14 may be integrated with each other. In the example illustrated in FIG. 22, the control circuit board 190 includes the microcomputer 190B, the inverter circuit 190D including six switching elements, and the capacitor 190E. The control circuit board 190 further include a motor terminal 190F connected to the motor 6 and a body-side terminal 190G to which the battery pack 25 is connected. The body-side terminal 190G has a function equivalent to that of the body-side terminal 13A described in the above embodiment. The operation-and-display part 16 and the microcomputer 190B are connected via a lead wire 86.

Sixth Embodiment

A sixth embodiment will be described. In the following description, the same or equivalent components as those of the above-described embodiment are denoted by the same reference numerals, and a description of the components is simplified or omitted.

Figure 23:
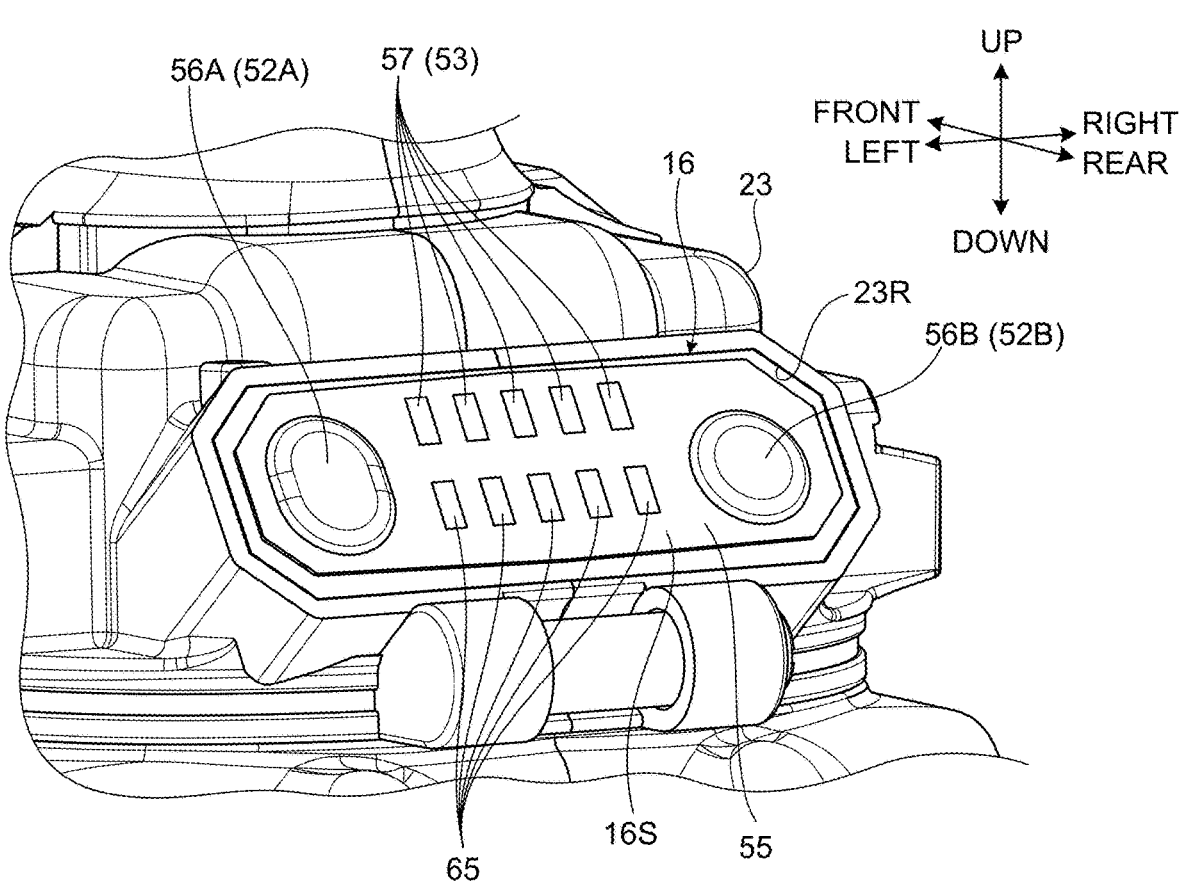
FIG. 23 is a rear perspective view illustrating a lower portion of a power tool according to an embodiment.
Figure 24:
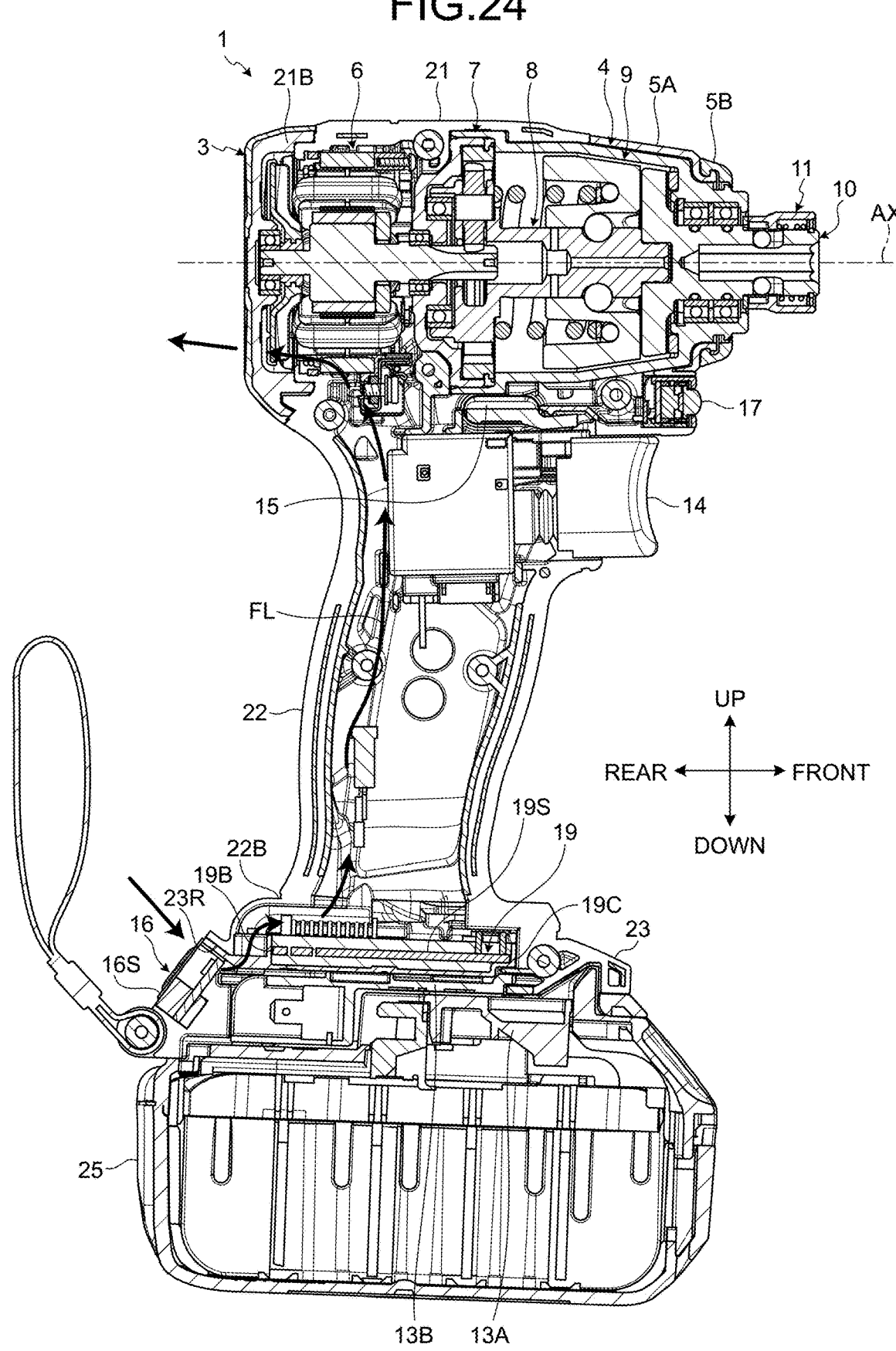
FIG. 24 is a longitudinal sectional view illustrating the power tool according to the embodiment.

FIG. 23 is a rear perspective view illustrating a lower portion of a power tool 1 according to the embodiment. FIG. 24 is a longitudinal sectional view illustrating the power tool according to the embodiment. As illustrated in FIG. 23, intake ports 65 may be provided in a panel 55. When the fan 12 rotates, air around a battery holding part 23 flows into an internal space of a battery holding part 23 through the intake ports 65. As indicated by an arrow FL in FIG. 24, the air flowing into the internal space of the battery holding part 23 cools a circuit board 51 and a control circuit board 19. The air that has cooled the circuit board 51 and the control circuit board 19 flows through an internal space of a grip part 22, cools a motor 6, and then is exhausted from the exhaust port 20B provided in the rear cover 3.

Seventh Embodiment

A seventh embodiment will be described. In the following description, the same or equivalent components as those of the above-described embodiment are denoted by the same reference numerals, and a description of the components is simplified or omitted.

Figure 25:
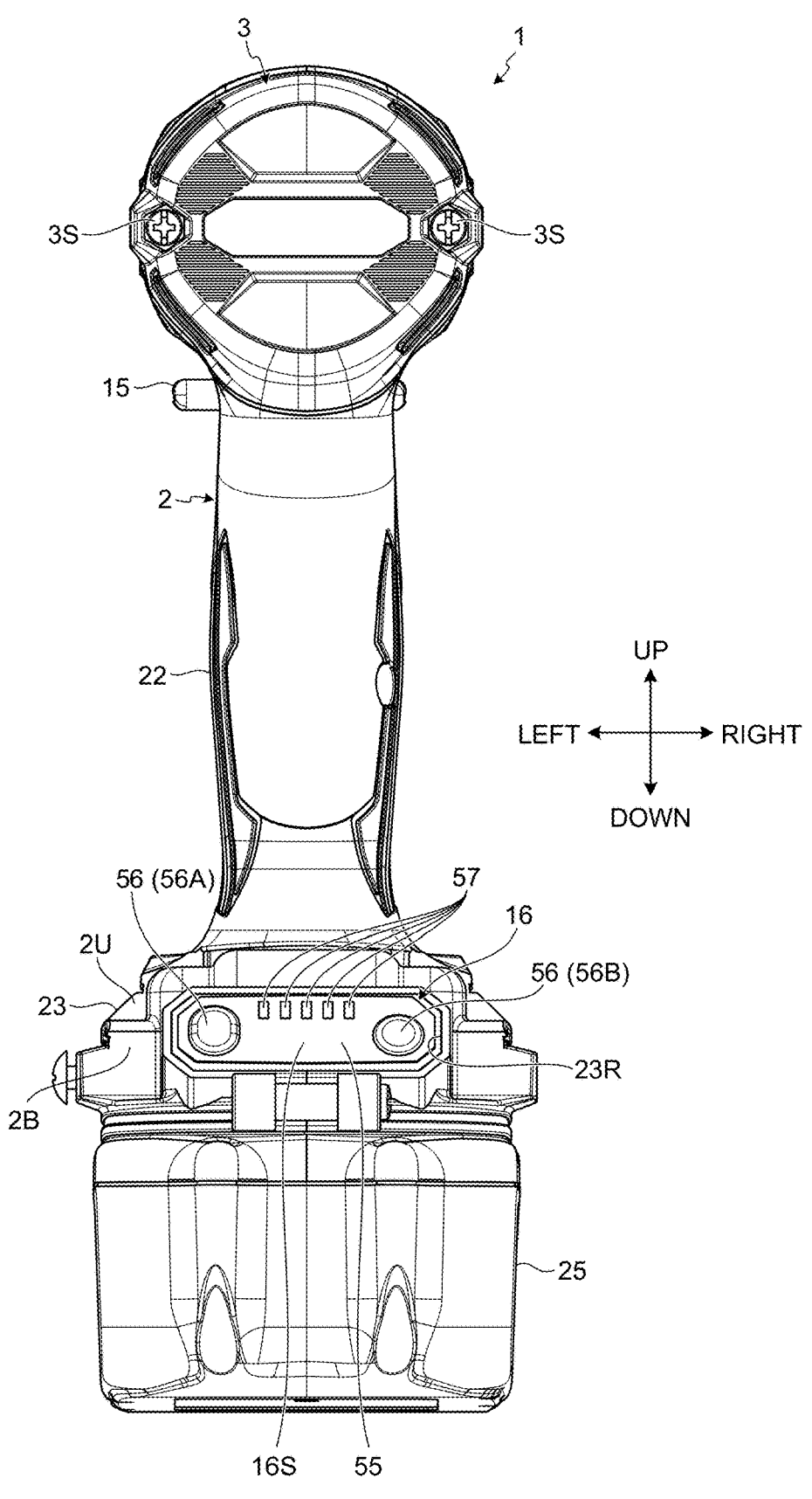
FIG. 25 is a rear view illustrating a power tool according to an embodiment.

FIG. 25 is a rear view illustrating a power tool 1 according to the embodiment. As illustrated in FIG. 25, a housing 2 may include an upper housing 2U and a lower housing 2B. An operation-and-display part 16 including a panel 55 may be sandwiched between the upper housing 2U and the lower housing 2B.

Eighth Embodiment

An eighth embodiment will be described. In the following description, the same or equivalent components as those of the above-described embodiment are denoted by the same reference numerals, and a description of the components is simplified or omitted.

Figure 26:
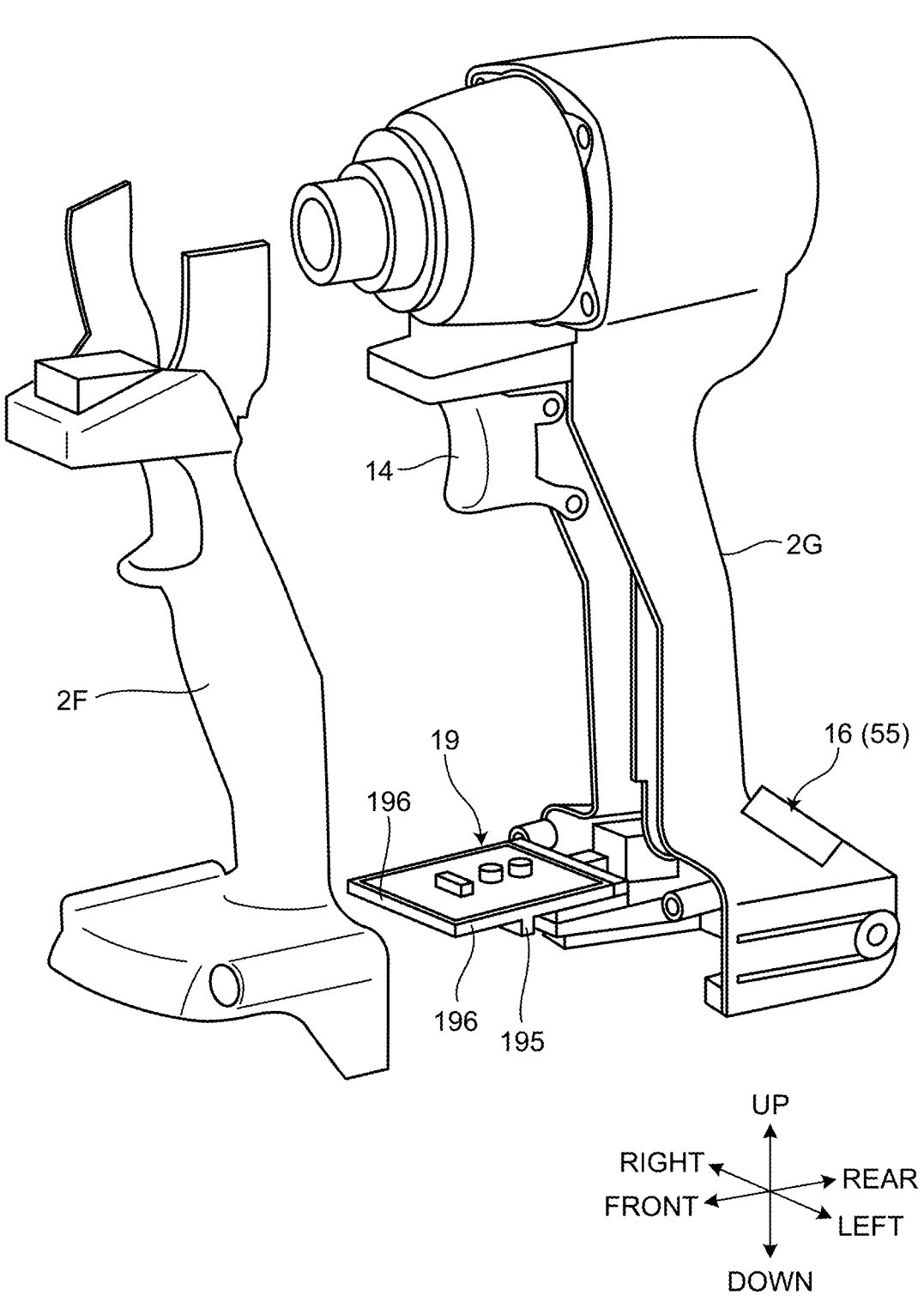
FIG. 26 is an exploded front perspective view illustrating a power tool according to an embodiment.
Figure 27:
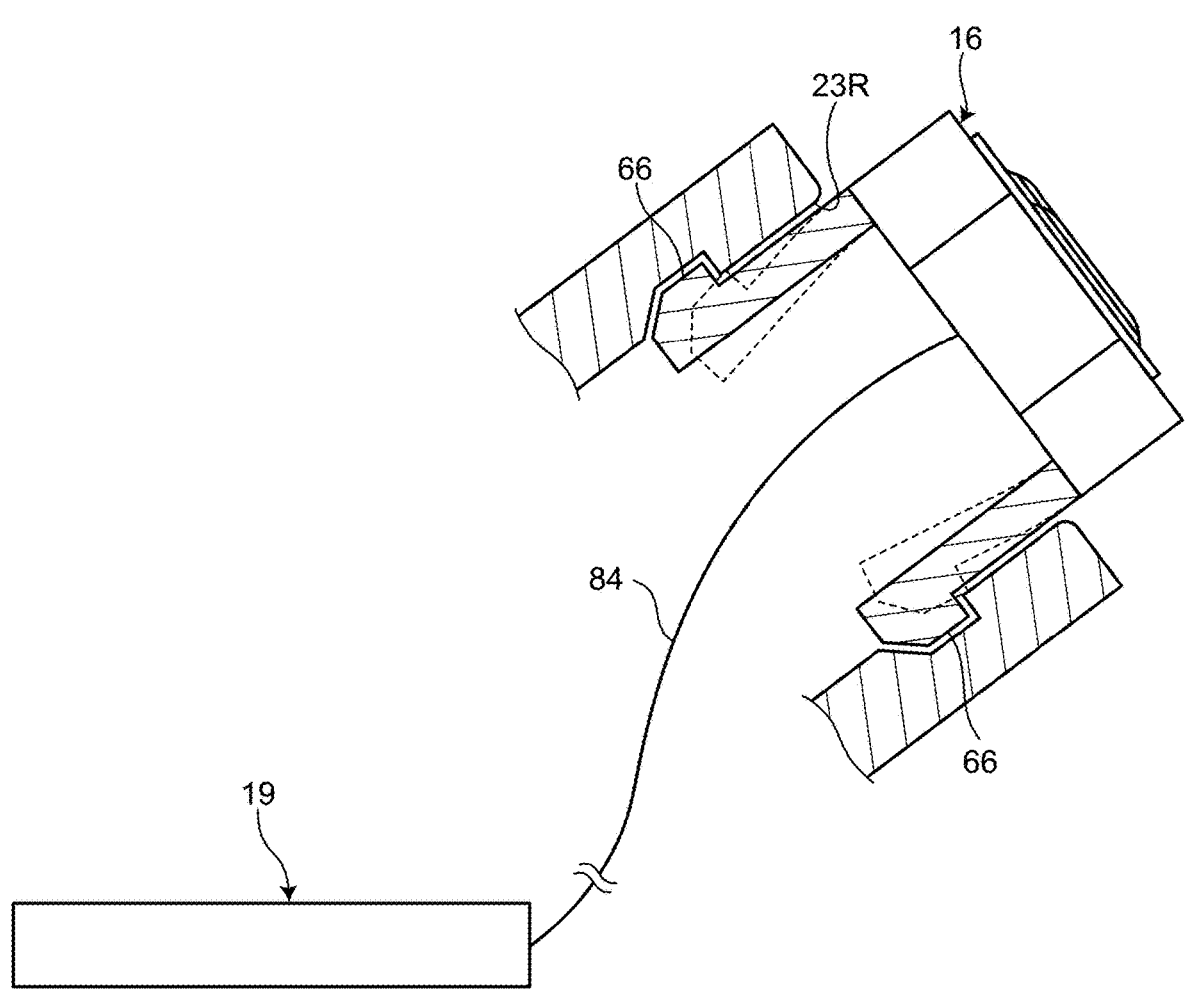
FIG. 27 is a longitudinal sectional view illustrating a lower portion of the power tool according to the embodiment.
Figure 27:
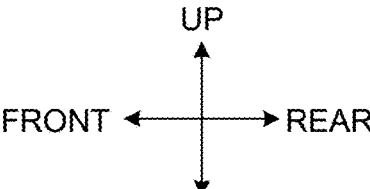
Figure 28:
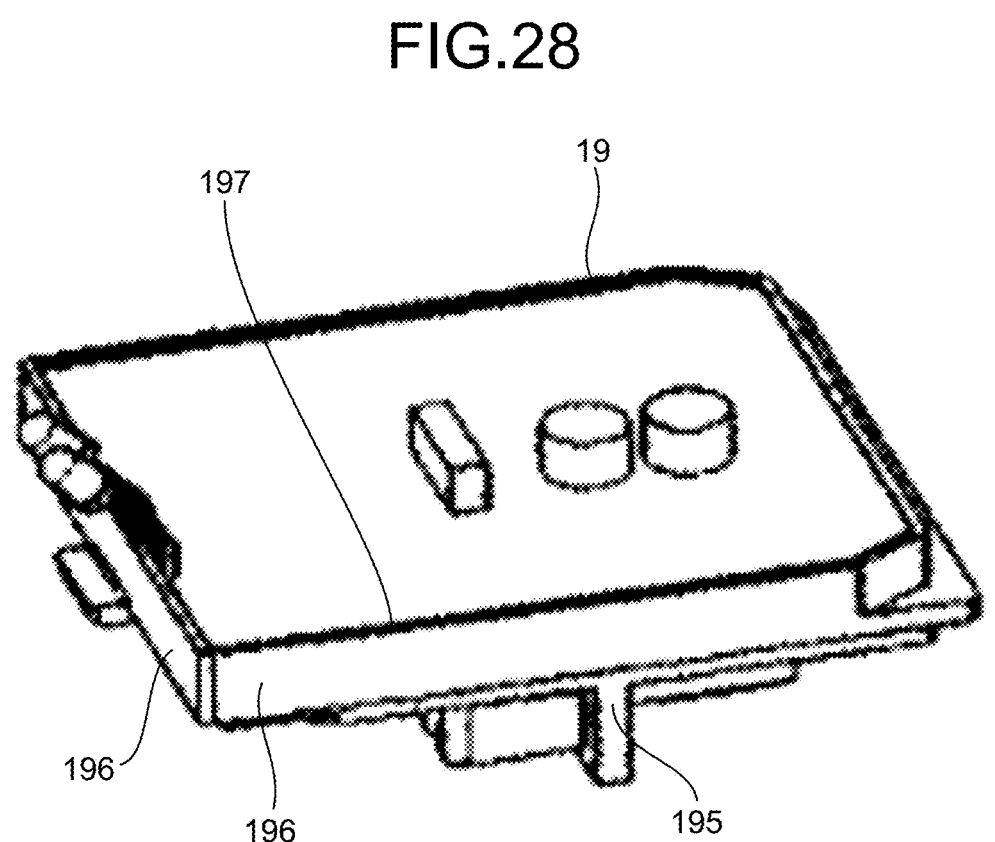
FIG. 28 is a perspective view illustrating a control circuit board according to the embodiment.

FIG. 26 is an exploded front perspective view illustrating a power tool according to the embodiment. FIG. 27 is a longitudinal sectional view illustrating a lower portion of a power tool 1 according to the embodiment. FIG. 28 is a perspective view illustrating a control circuit board 19 according to the embodiment. As illustrated in FIG. 26, a housing 2 includes a front housing 2F and a rear housing 2G. That is, in the embodiment, the housing 2 includes a pair of half-split housings split into front and rear portions. The housing 2 is formed by connecting the front housing 2F and the rear housing 2G. An operation-and-display part 16 is disposed at a rear portion of a battery holding part 23 of the rear housing 2G.

A battery connector 195 for electrically coupling a battery pack 25 and the control circuit board 19 is provided. The control circuit board 19 is integrally mounted on the battery connector 195. Specifically, in order to integrally mount the control circuit board 19 on the battery connector 195, side plate parts 196 are erected to surround the battery connector 195, so that the battery connector 195 is formed in a case shape having a depth. Then, after necessary wiring connections between a control circuit mounted on the control circuit board 19 and the battery connector 195 are established, the control circuit board 19 is inserted into the battery connector 195, which is formed in a case shape, so as to have a desired assembling structure. Then, a potting material (not illustrated) is dropped on the battery connector 195 and then solidified, so that the control circuit board 19 is integrated on the battery connector 195 with the desired assembling structure. The control circuit board 19 includes a battery terminal 197 connected to the battery pack 25.

As illustrated in FIG. 27, the operation-and-display part 16 may include a hook portion 66 that is hooked on an inner wall of the battery holding part 23. A snap-fit is exemplified as the hook portion 66. The operation-and-display part 16 may be inserted into a recess 23R of the battery holding part 23. The operation-and-display part 16 is connected to the control circuit board 19 via a lead wire 84. In the embodiment, the lead wire 84 is connected to the control circuit board 19 via a connector.

Ninth Embodiment

A ninth embodiment will be described. In the following description, the same or equivalent components as those of the above-described embodiment are denoted by the same reference numerals, and a description of the components is simplified or omitted.

Figure 29:
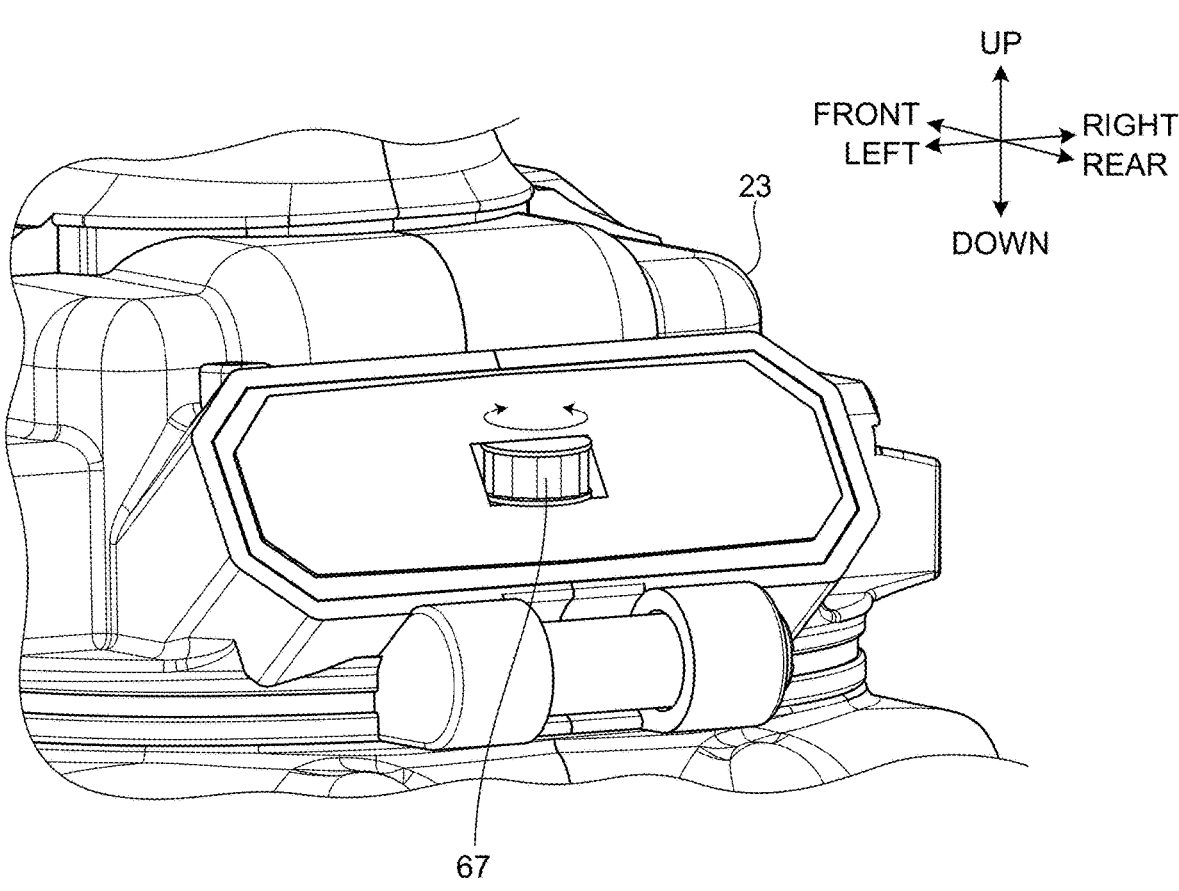
FIG. 29 is a rear perspective view illustrating a lower portion of a power tool according to an embodiment.

FIG. 29 is a rear perspective view illustrating a lower portion of a power tool 1 according to the embodiment. In the above-described embodiments, the operation-and-display part 16 includes the manipulatable parts 56 pressed by the user. Alternatively, as illustrated in FIG. 29, an operation-and-display part may include a dial 67. The dial 67 is disposed at a rear portion of a battery holding part 23. The dial 67 rotates about a rotation axis extending in the up-down direction. A control method of a motor 6 may be changed by rotating the dial 67. The user can intuitively change the control method of the motor 6.

Tenth Embodiment

A tenth embodiment will be described. In the following description, the same or equivalent components as those of the above-described embodiment are denoted by the same reference numerals, and a description of the components is simplified or omitted.

Figure 30:
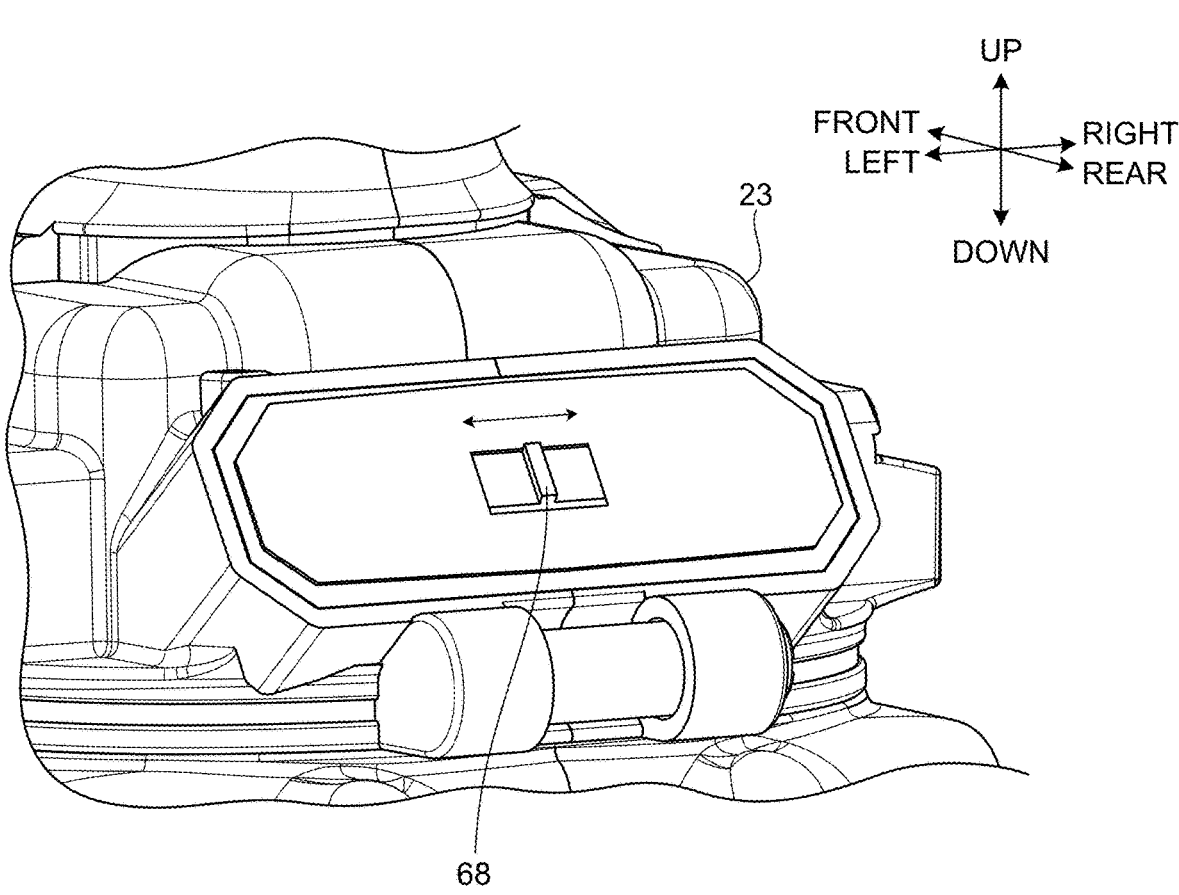
FIG. 30 is a rear perspective view illustrating a lower portion of a power tool according to an embodiment.

FIG. 30 is a rear perspective view illustrating a lower portion of a power tool 1 according to the embodiment. As illustrated in FIG. 30, an operation-and-display part may include a lever 68 movable in the left-right direction. The lever 68 is disposed at a rear portion of a battery holding part 23. A control method of a motor 6 may be changed by moving the lever 68. The user can intuitively change the control method of the motor 6.

Eleventh Embodiment

An eleventh embodiment will be described. In the following description, the same or equivalent components as those of the above-described embodiment are denoted by the same reference numerals, and a description of the components is simplified or omitted.

Figure 31:
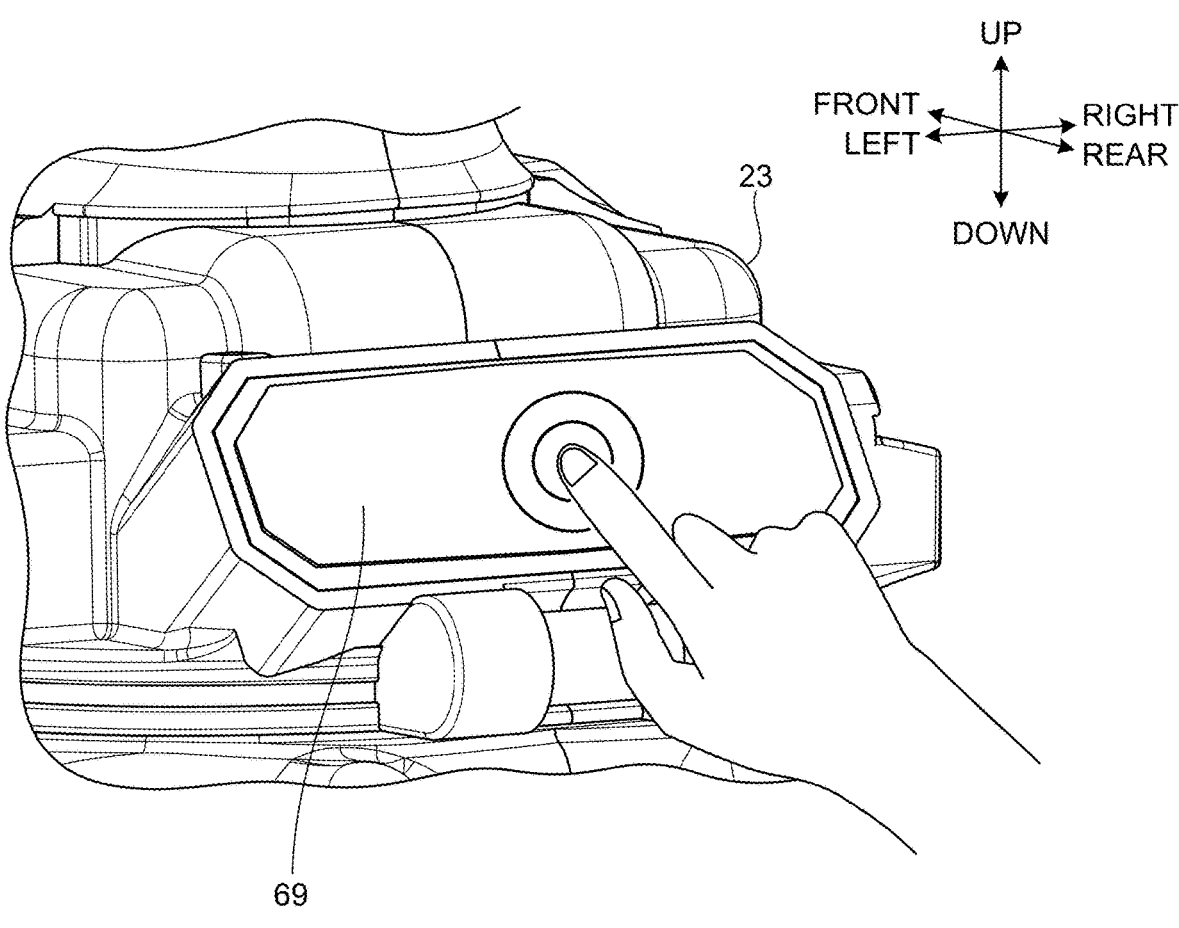
FIG. 31 is a rear perspective view illustrating a lower portion of a power tool according to an embodiment.

FIG. 31 is a rear perspective view illustrating a lower portion of a power tool 1 according to the embodiment. As illustrated in FIG. 31, an operation-and-display part may include a touch panel 69. The touch panel 69 includes a display and a touch sensor disposed in the display. The touch panel 69 is disposed at a rear portion of a battery holding part 23. An application mode of a motor 6 is displayed on the display. A control method of the motor 6 may be changed by manipulating the touch panel 69.

Twelfth Embodiment

A twelfth embodiment will be described. In the following description, the same or equivalent components as those of the above-described embodiment are denoted by the same reference numerals, and a description of the components is simplified or omitted.

Figure 32:
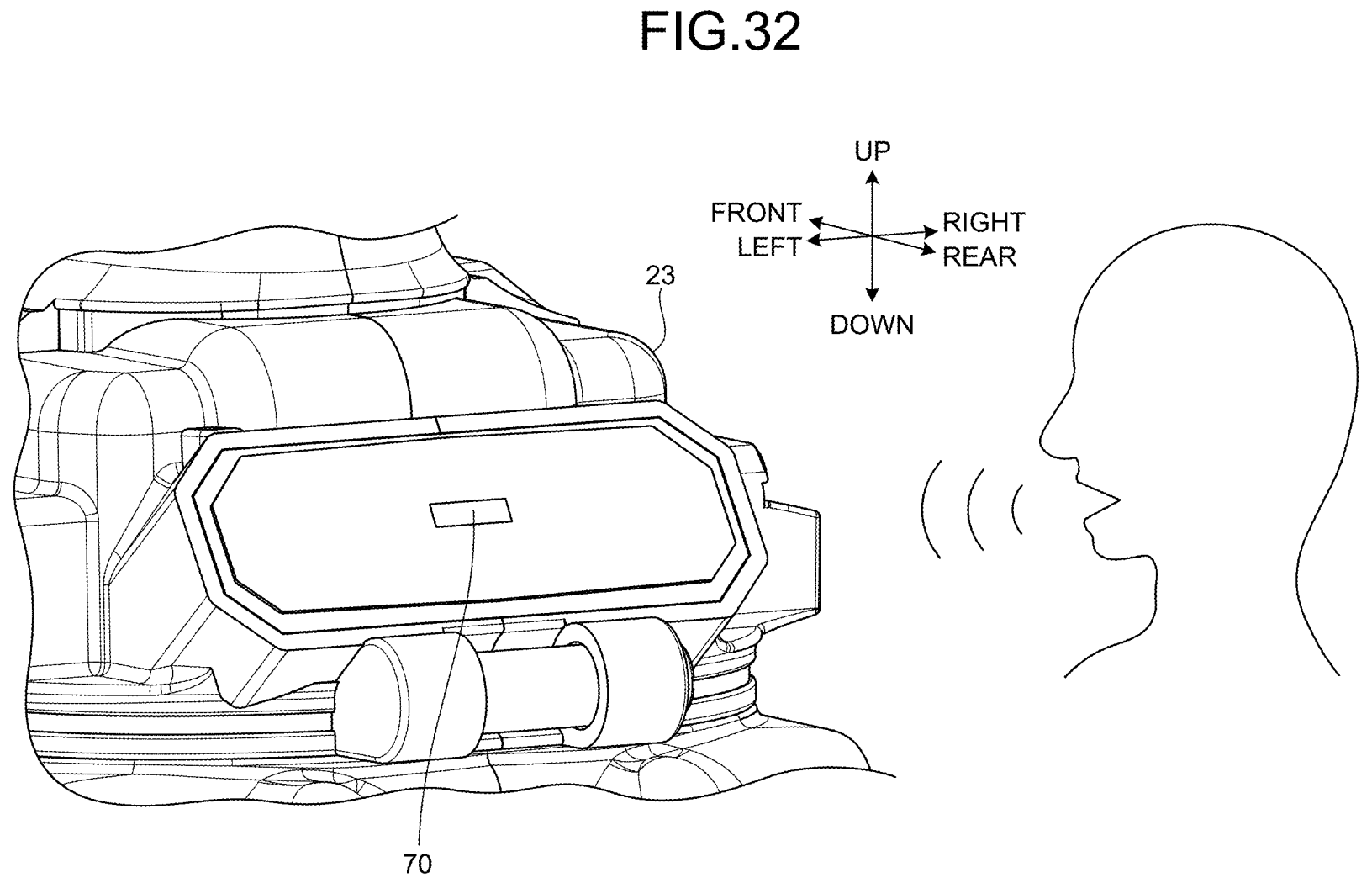

FIG. 32 is a rear perspective view illustrating a lower portion of a power tool 1 according to the embodiment. As illustrated in FIG. 32, an operation-and-display part may include a microphone 70. A control circuit board 19 may change a control method of a motor 6 in accordance with a speech input to the microphone 70.

Thirteenth Embodiment

A thirteenth embodiment will be described. In the following description, the same or equivalent components as those of the above-described embodiment are denoted by the same reference numerals, and a description of the components is simplified or omitted.

Figure 33:
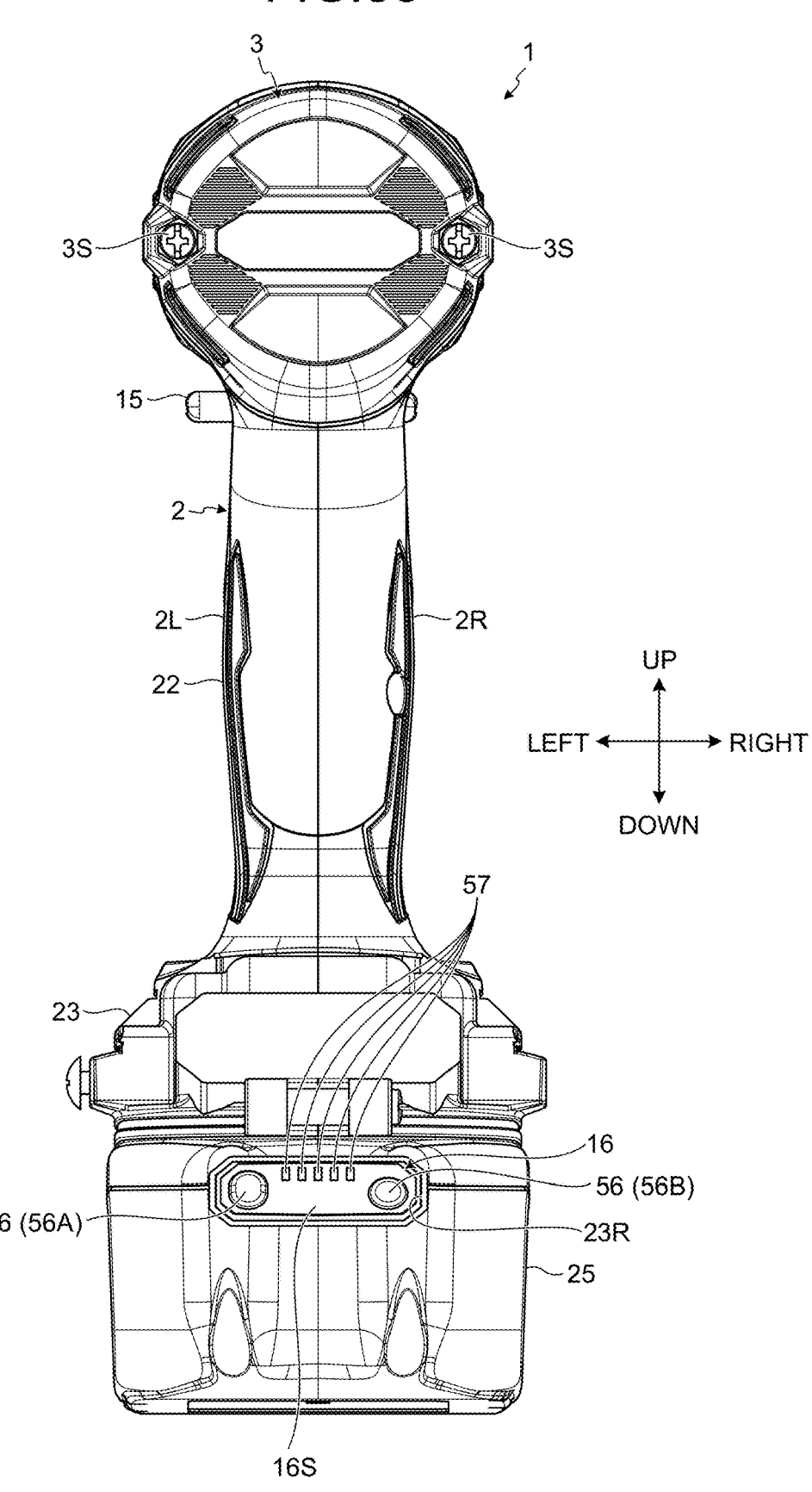
FIG. 33 is a rear view illustrating a power tool according to an embodiment.
Figure 34:
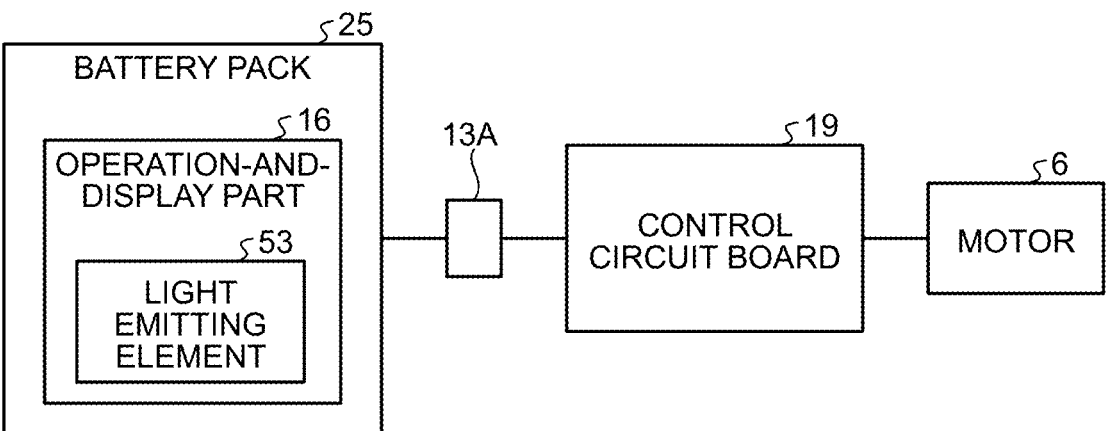
FIG. 34 is a block diagram illustrating the power tool according to the embodiment.

FIG. 33 is a rear view illustrating a power tool 1 according to the embodiment. FIG. 34 is a block diagram illustrating the power tool 1 according to the embodiment. An operation-and-display part 16 may be provided on a battery pack 25. The operation-and-display part 16 may be disposed at a rear portion of the battery pack 25. The battery pack 25 communicates with a control circuit board 19 via a body-side terminal 13A. An operation signal generated by manipulating the operation-and-display part 16 is transmitted to the control circuit board 19 via the body-side terminal 13A. The control circuit board 19 may change a control method of a motor 6 based on the operation signal from the battery pack 25. The control circuit board 19 may transmit a control signal for causing light emitting elements 53 of the operation-and-display part 16 to emit light to the battery pack 25 via the body-side terminal 13A.

Fourteenth Embodiment

A fourteenth embodiment will be described. In the following description, the same or equivalent components as those of the above-described embodiment are denoted by the same reference numerals, and a description of the components is simplified or omitted.

Figure 35:
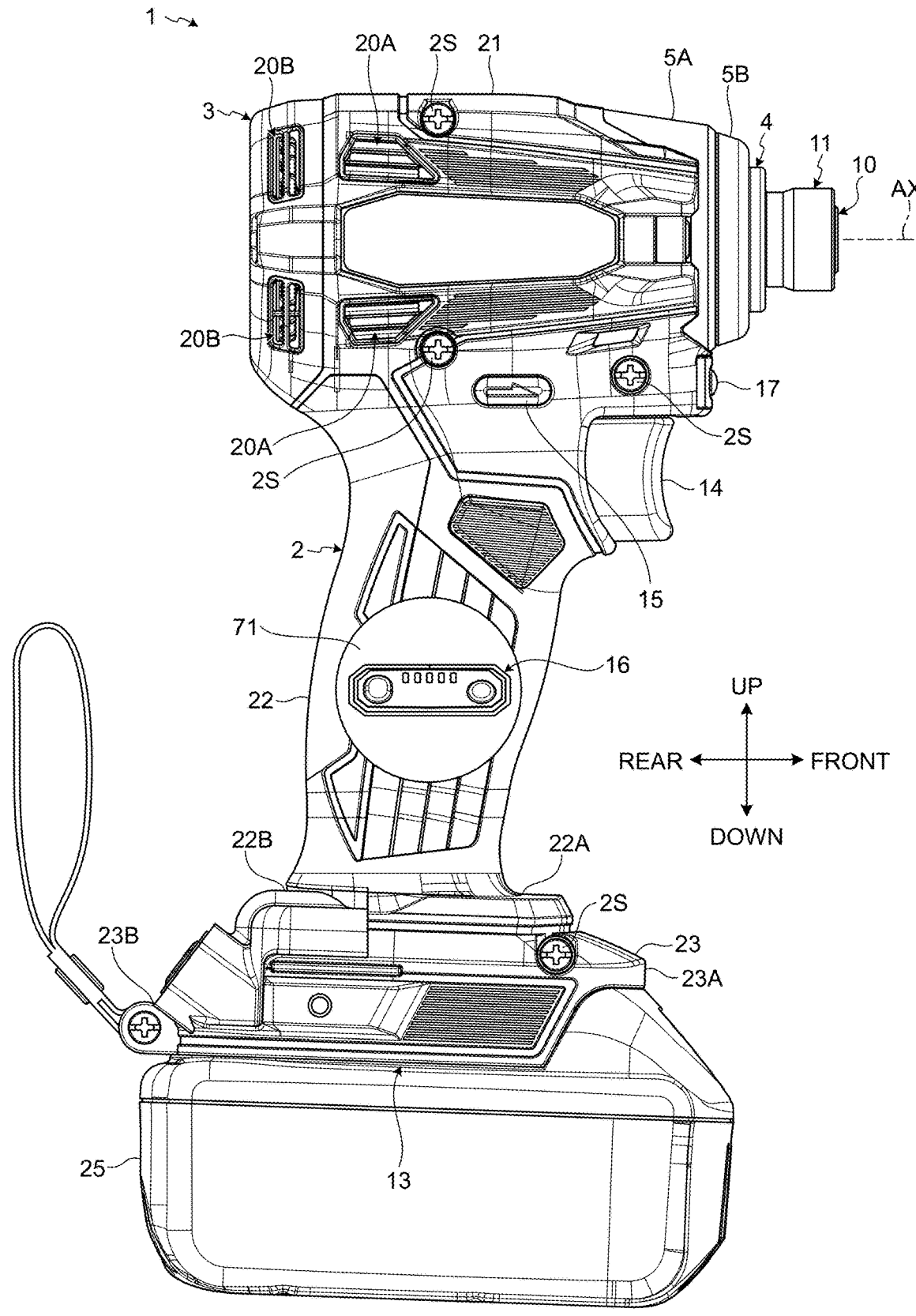
FIG. 35 is a right side view illustrating a power tool according to an embodiment.

FIG. 35 is a right side view illustrating a power tool 1 according to the embodiment. In the embodiment, a button battery is mounted on a grip part 22. Even in a case where a battery pack 25 is removed from a battery mounting part 13, a control circuit board 19 can continue to operate by electric power supplied from the button battery. A lid 71 that covers the button battery is provided on the grip part 22. An operation-and-display part 16 may be disposed on the lid 71.

Fifteenth Embodiment

A fifteenth embodiment will be described. In the following description, the same or equivalent components as those of the above-described embodiment are denoted by the same reference numerals, and a description of the components is simplified or omitted.

Figure 36:
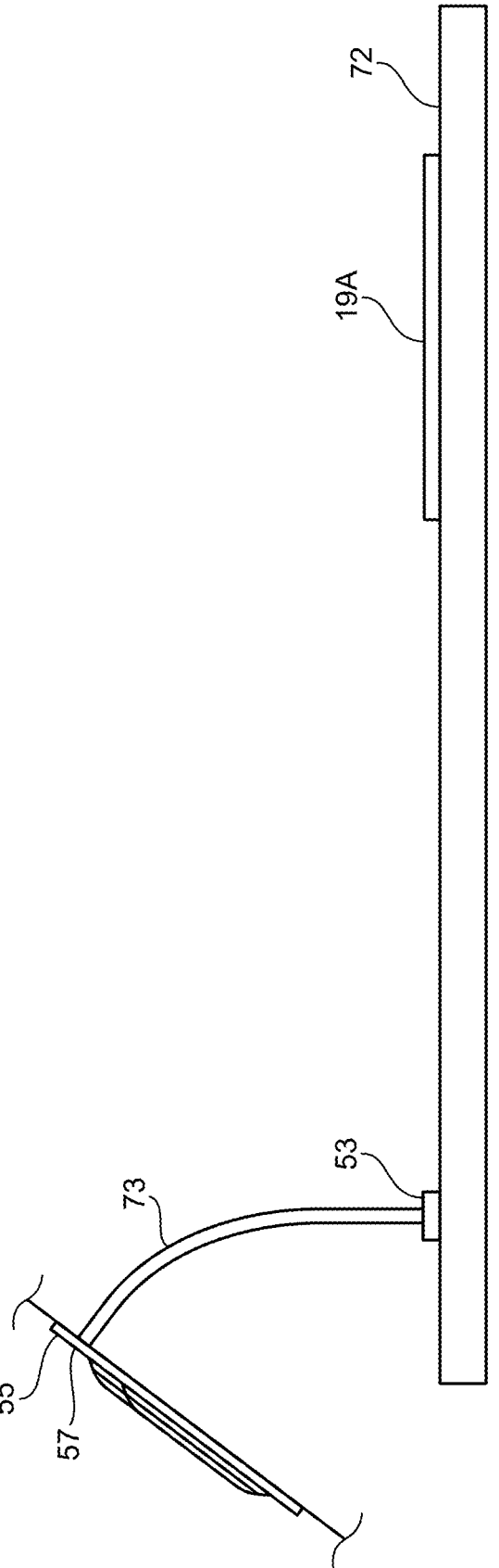
FIG. 36 is a view schematically illustrating a control circuit board and a panel according to an embodiment.
Figure 36:
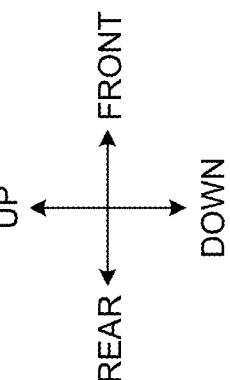

FIG. 36 is a view schematically illustrating a control circuit board 72 and a panel 55 according to the embodiment. The control circuit board 72 includes a motor control circuit 19A for controlling a motor 6. In the embodiment, a light emitting element 53 is mounted on the control circuit board 72. The circuit board 51 described in the above-described embodiments is omitted. The light emitting element 53 is disposed rearward of the motor control circuit 19A. Light emitted from the light emitting element 53 is supplied to a display part 57 of the panel 55 via a light guide member 73. According to the embodiment, the circuit board 51 is omitted, and thus, the number of components of the power tool 1 is reduced, and an increase in size of the power tool 1 is suppressed.

Sixteenth Embodiment

A sixteenth embodiment will be described. In the following description, the same or equivalent components as those of the above-described embodiment are denoted by the same reference numerals, and a description of the components is simplified or omitted.

Figure 37:
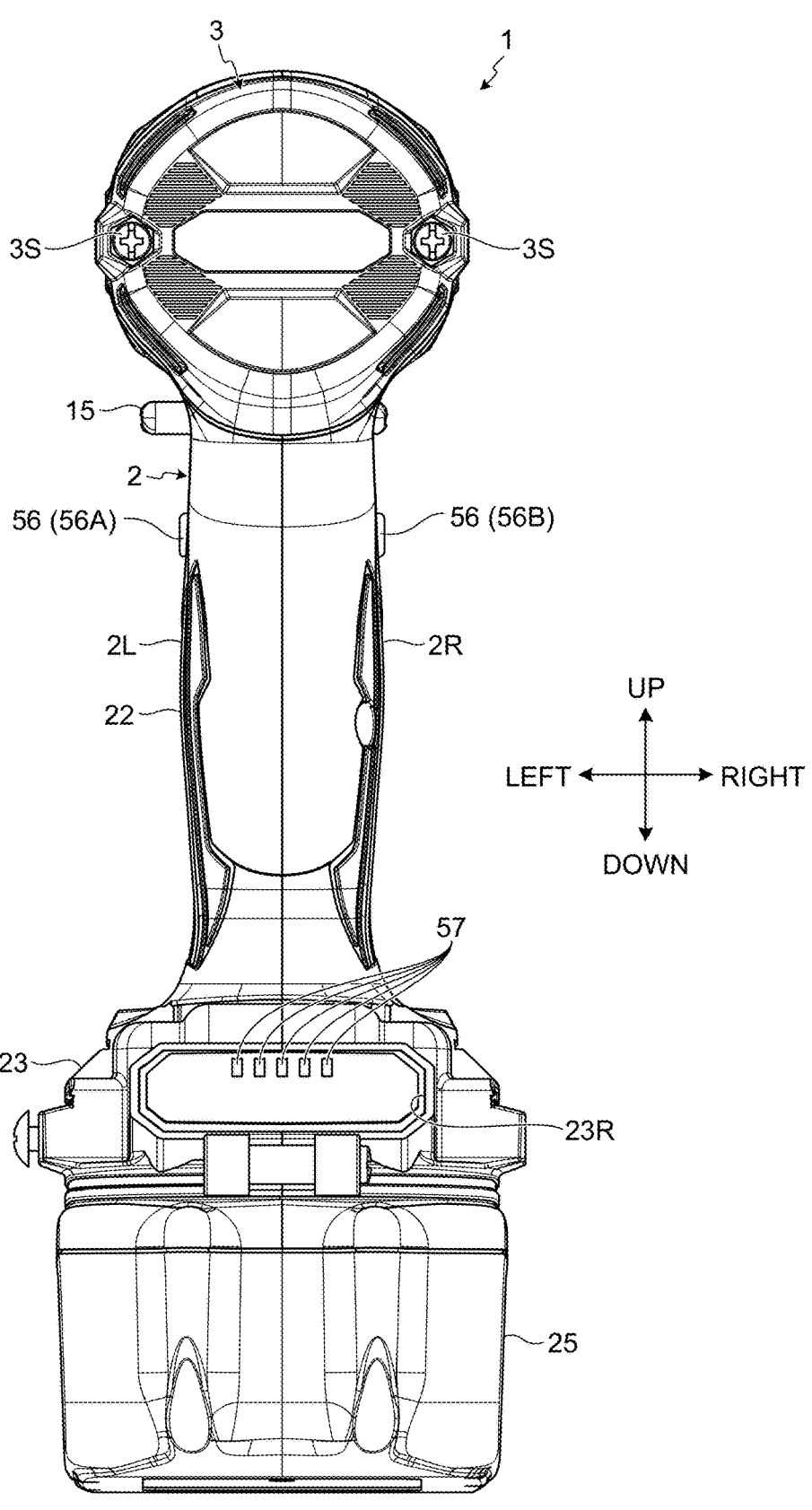
FIG. 37 is a rear view illustrating a power tool according to an embodiment.

FIG. 37 is a rear view illustrating a power tool 1 according to the embodiment. In the above-described embodiments, a panel 55 includes manipulatable parts 56 and display parts 57. The display parts 57 may be provided on the panel 55, and the manipulatable parts 56 may be disposed upward of the panel 55. In the example illustrated in FIG. 37, the manipulatable parts 56 are disposed on a grip part 22. A first manipulatable part 56A is disposed on a left portion of the grip part 22, and a second manipulatable part 56B is disposed on a right portion of the grip part 22. The manipulatable parts 56 may be disposed at a rear portion of the grip part 22. The manipulatable parts 56 may be disposed in a motor housing part 21.

Seventeenth Embodiment

A seventeenth embodiment will be described. In the following description, the same or equivalent components as those of the above-described embodiment are denoted by the same reference numerals, and a description of the components is simplified or omitted.

Figure 38:
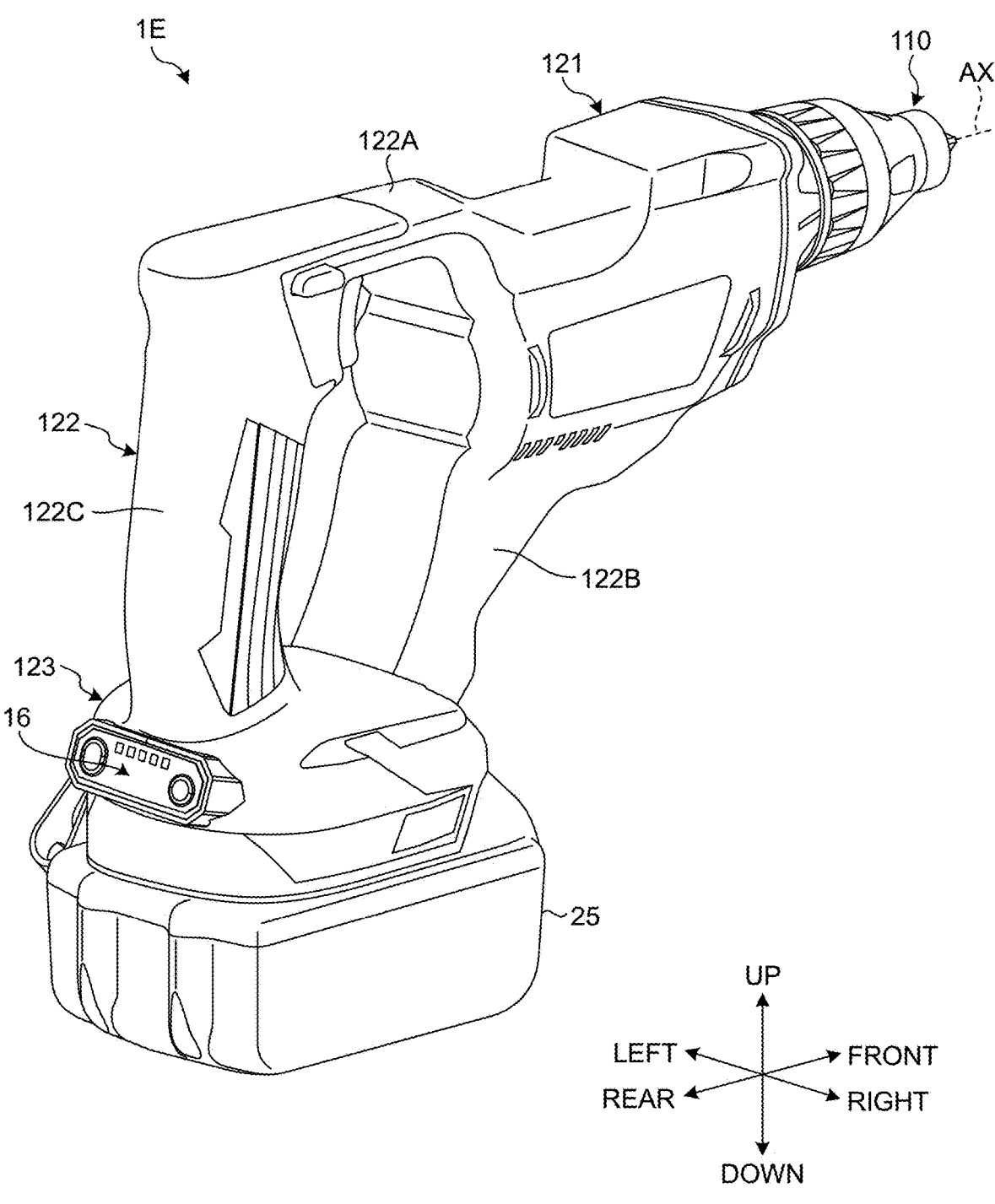
FIG. 38 is a rear perspective view illustrating a power tool according to an embodiment.

FIG. 38 is a rear perspective view illustrating a power tool 1E according to the embodiment. The power tool 1E includes: a motor housing part 121 that houses a motor; a grip part 122; and a battery holding part 123 to which a battery pack 25 is attached. An output part 110 is rotated by a rotational force generated by the motor. The grip part 122 includes: a first portion 122A extending rearward from an upper portion of the motor housing part 121; a second portion 122B extending downward from a lower portion of the motor housing part 121 toward the rear; and a third portion 122C extending downward from a rear end of the first portion 122A. A lower end portion of the second portion 122B is connected to a front portion of the battery holding part 123. A lower end portion of the third portion 122C is connected to a rear portion of the battery holding part 123. The grip part 122 implements a so-called loop handle (D-shaped handle).

An operation-and-display part 16 is disposed at the rear portion of the battery holding part 123. Since the operation-and-display part 16 is disposed at the rear portion of the battery holding part 123, manipulativeness (operability) and visibility of the operation-and-display part 16 are improved.

Figure 39:
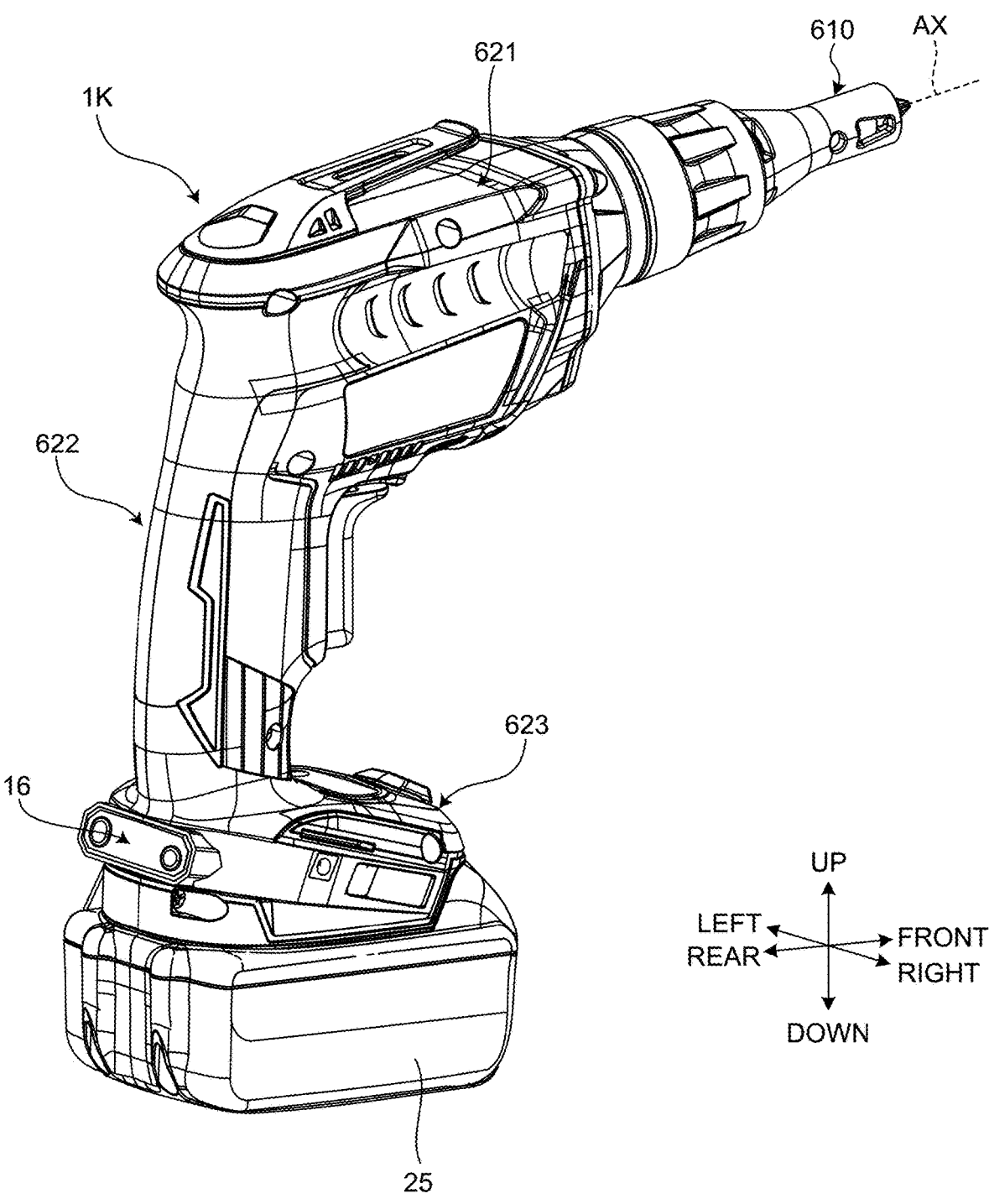
FIG. 39 is a rear perspective view illustrating the power tool according to the embodiment.

FIG. 39 is a rear perspective view illustrating a power tool 1K according to the embodiment. The power tool 1K is a pistol type screwdriver. The power tool 1K includes: a motor housing part 621 that houses a motor; a grip part 622; and a battery holding part 623 to which a battery pack 25 is attached. An output part 610 is rotated by the rotational force generated by the motor. The grip part 622 extends downward from a lower portion of a rear portion of the motor housing part 621. A lower end portion of the grip part 622 is connected to a front portion of the battery holding part 623.

An operation-and-display part 16 is disposed at a rear portion of the battery holding part 623. Since the operation-and-display part 16 is disposed at the rear portion of the battery holding part 623, manipulativeness (operability) and visibility of the operation-and-display part 16 are improved.

Eighteenth Embodiment

An eighteenth embodiment will be described. In the following description, the same or equivalent components as those of the above-described embodiment are denoted by the same reference numerals, and a description of the components is simplified or omitted.

Figure 40:
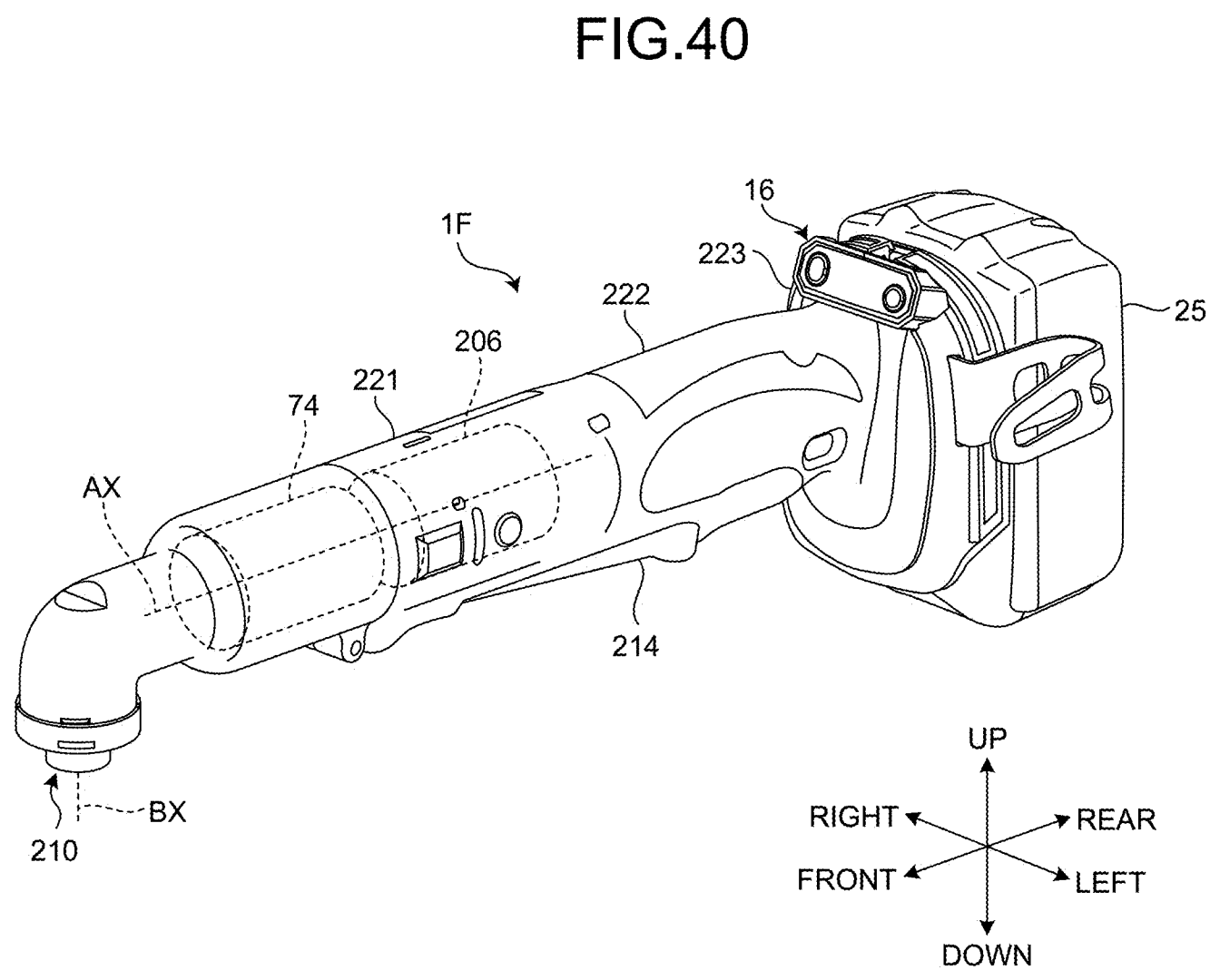

FIG. 40 is a front perspective view illustrating a power tool 1F according to the embodiment. The power tool 1F is an angle tool. The power tool 1F includes: a motor housing part 221 that houses a motor 206 and a speed reducing mechanism 74; a grip part 222; and a battery holding part 223 to which a battery pack 25 is attached. The grip part 222 is connected to a rear portion of the motor housing part 221. The battery holding part 223 is connected to a rear portion of the grip part 222. A trigger lever 214 is disposed at a lower portion of the grip part 222. The motor rotation axis AX of the motor 206 extends in the front-rear direction. An output part 210 is rotated by a rotational force generated by the motor 206. A rotation axis BX of the output part 210 extends in the up-down direction.

An operation-and-display part 16 is disposed at an upper portion of the battery holding part 223. Since the operation-and-display part 16 is disposed at the upper portion of the battery holding part 223, manipulativeness (operability) and visibility of the operation-and-display part 16 are improved.

Nineteenth Embodiment

A nineteenth embodiment will be described. In the following description, the same or equivalent components as those of the above-described embodiment are denoted by the same reference numerals, and a description of the components is simplified or omitted.

Figure 41:
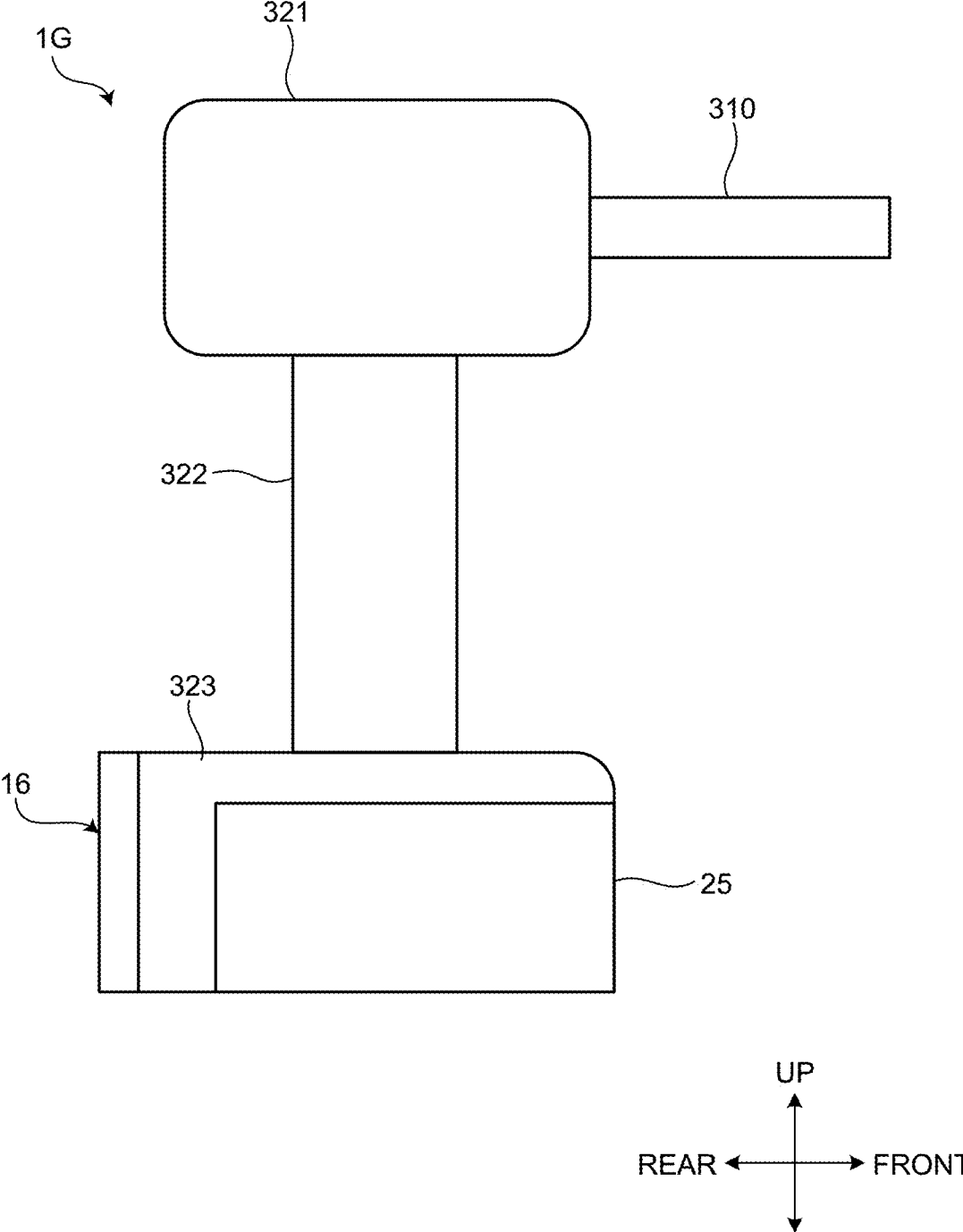
FIG. 41 is a side view schematically illustrating a power tool according to an embodiment.

FIG. 41 is a side view schematically illustrating a power tool 1G according to the embodiment. The power tool 1G is an impact wrench. The power tool 1G includes: a motor housing part 321 that houses a motor; a grip part 322 that extends downward from the motor housing part 321; a battery holding part 323 that is connected to a lower end of the grip part 322; and an anvil 310 that is disposed forward of the motor housing part 321. The anvil 310 is a long anvil. A battery pack 25 is attached to the battery holding part 323. A portion of the battery holding part 323 is disposed rearward of the battery pack 25. An operation-and-display part 16 is disposed at a rear portion of the battery holding part 323. According to the embodiment, the operation-and-display part 16 can be enlarged, so that manipulativeness (operability) and visibility of the operation-and-display part 16 are improved.

Twentieth Embodiment

A twentieth embodiment will be described. In the following description, the same or equivalent components as those of the above-described embodiment are denoted by the same reference numerals, and a description of the components is simplified or omitted.

Figure 42:
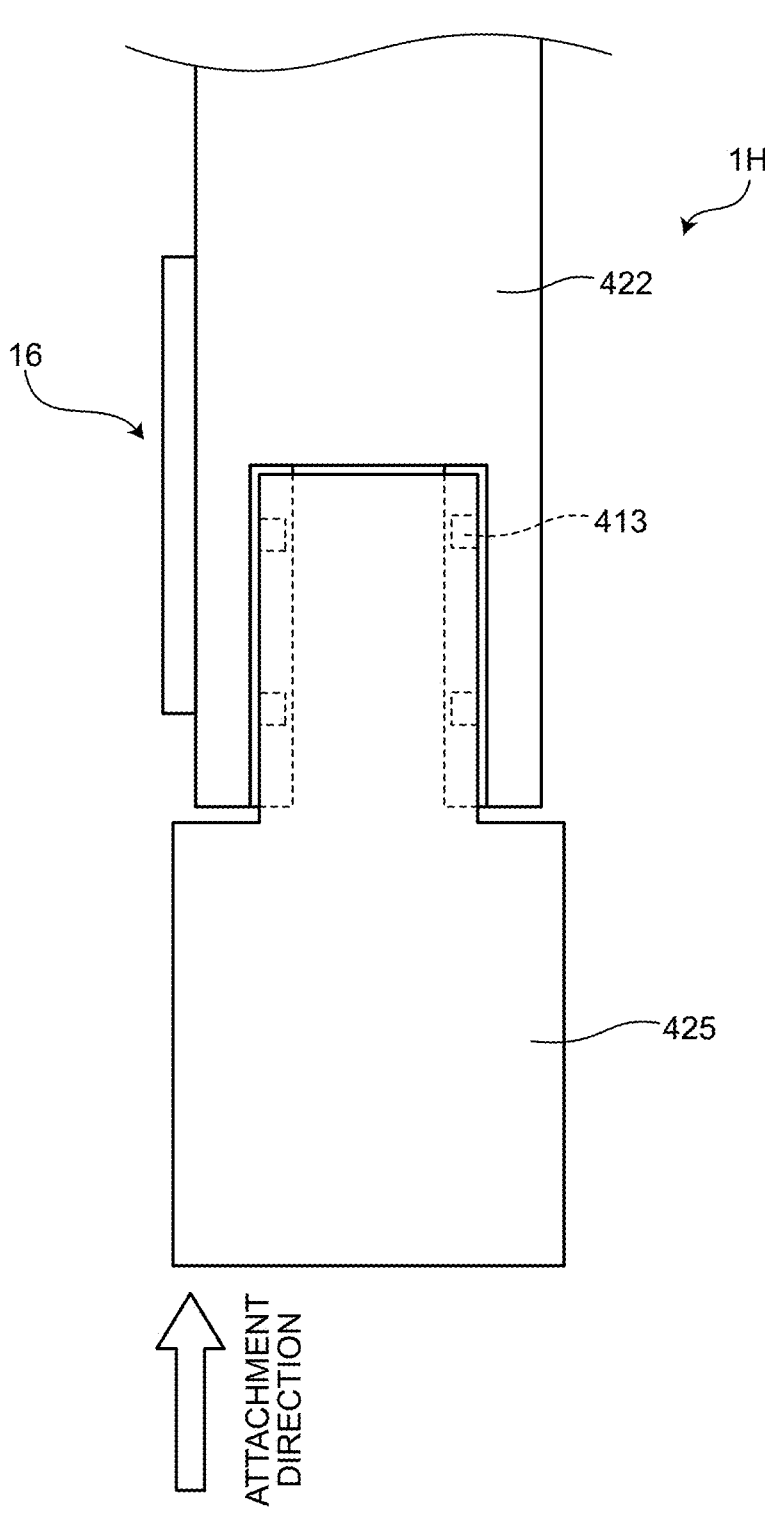
FIG. 42 is a view schematically illustrating a portion of a power tool according to an embodiment.

FIG. 42 is a view schematically illustrating a portion of a power tool 1H according to the embodiment. In the embodiment, a battery pack 425 has a stick shape that is long in the up-down direction. The battery pack 425 is inserted into a grip part 422 from an opening provided in a lower portion of the grip part 422. A body-side terminal 413 connected to a battery pack 425 is disposed inside the grip part 422.

An operation-and-display part 16 is disposed at a rear portion of the grip part 422. The operation-and-display part 16 and at least a portion of the battery pack 425 are disposed at the same position in the up-down direction.

Twenty-First Embodiment

A twenty-first embodiment will be described. In the following description, the same or equivalent components as those of the above-described embodiment are denoted by the same reference numerals, and a description of the components is simplified or omitted.

Figure 43:
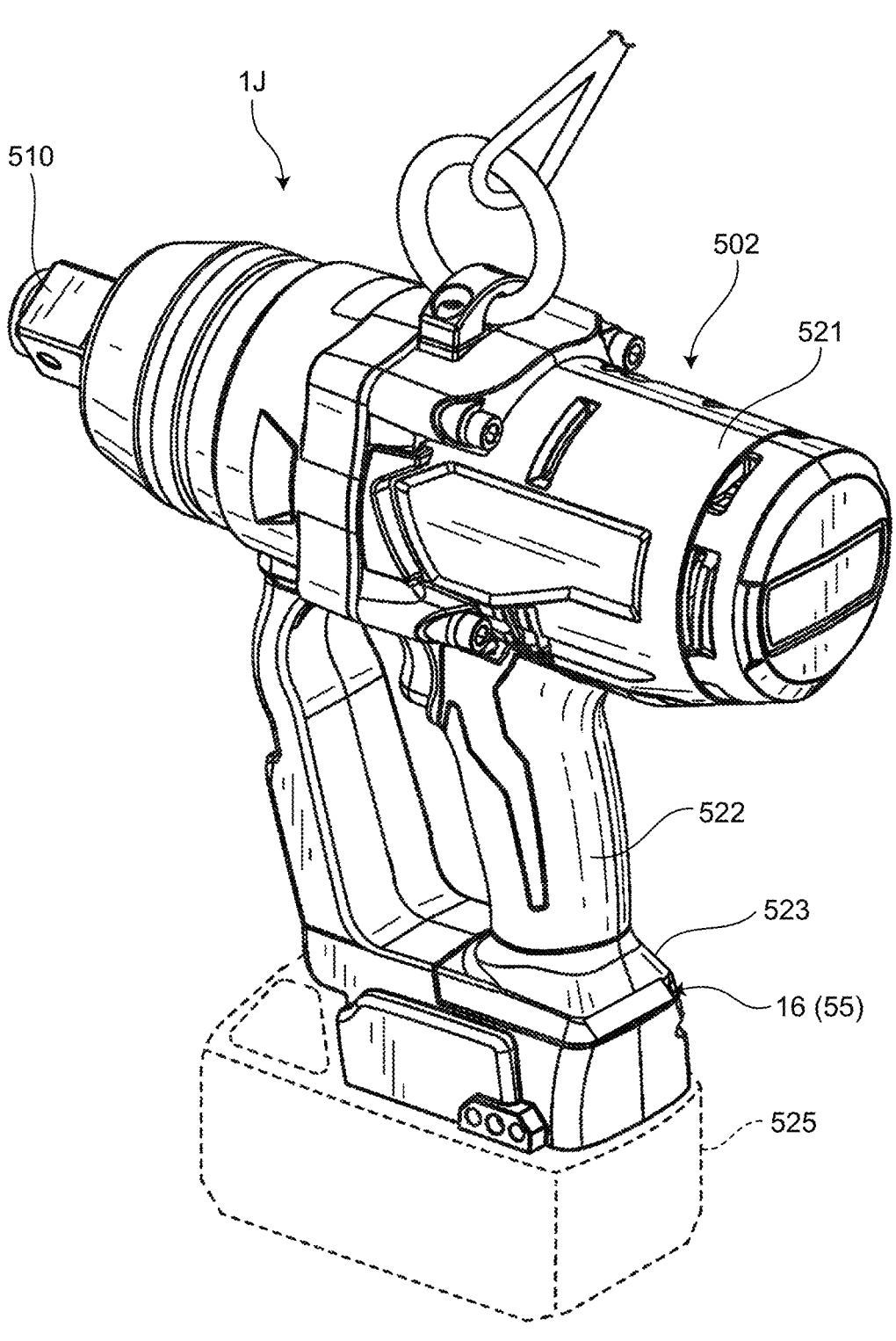
FIG. 43 is a rear perspective view illustrating a portion of a power tool according to an embodiment.
Figure 44:
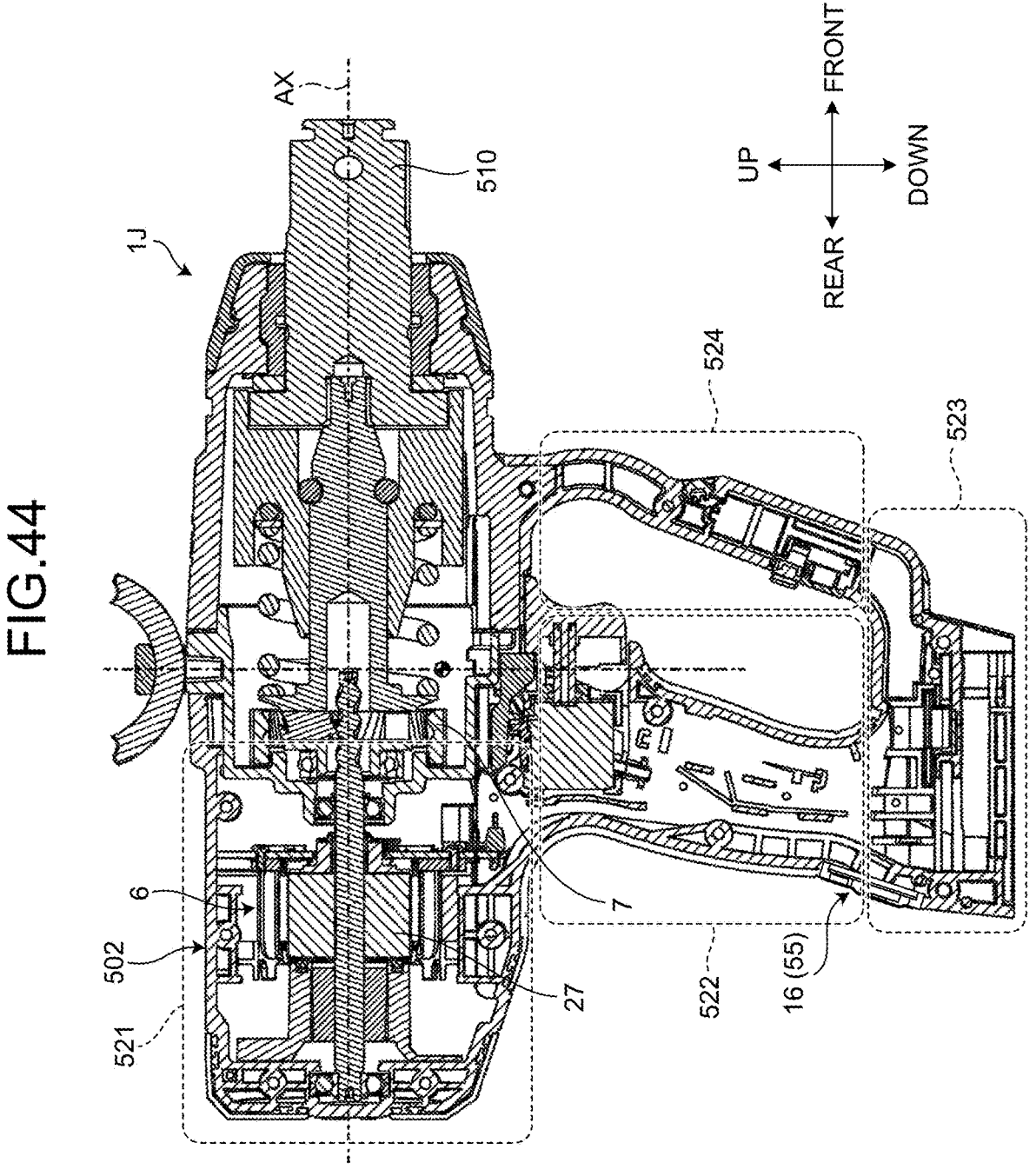
FIG. 44 is a longitudinal sectional view illustrating a portion of the power tool according to the embodiment.

FIG. 43 is a rear perspective view illustrating a portion of a power tool 1J according to the embodiment. FIG. 44 is a longitudinal sectional view illustrating a portion of the power tool 1J according to the embodiment. As illustrated in FIGS. 43 and 44, the power tool 1J includes: a motor 6; a speed reducing mechanism 7; an anvil 510, which is an output part; and a housing 502. The motor 6 included a rotor 27 that rotates about the motor rotation axis AX extending in the front-rear direction. The speed reducing mechanism 7 decelerates rotation input from the motor 6. The anvil 510 is driven with an output of the speed reducing mechanism 7. The housing 502 includes: a motor housing part 521 that houses the motor 6; a grip part 522 that extends downward from the motor housing part 521; a support part 524 that is positioned forward of the grip part 522; and a battery holding part 523, which is disposed downward of the grip part 522 and the support part 524 and to which a battery pack 525 is connected by being slid. A rail portion on which the battery pack 525 is slid is provided at a lower end portion of the battery holding part 523.

The power tool 1J further includes: a control circuit board 19 that is housed in the housing 502 and controls the motor 6; and an operation-and-display part 16, which is disposed from a lower portion of the grip part 522 to a rear portion of the battery holding part 523 and includes a panel 55 that is manipulated to change a control method of the motor 6.

The control circuit board 19 is disposed at any position in an internal space of the housing 502. The control circuit board 19 may be housed in an internal space of the motor housing part 521, may be housed in an internal space of the grip part 522, may be housed in an internal space of the battery holding part 523, or may be housed in an internal space of the support part 524.

Figure 45:
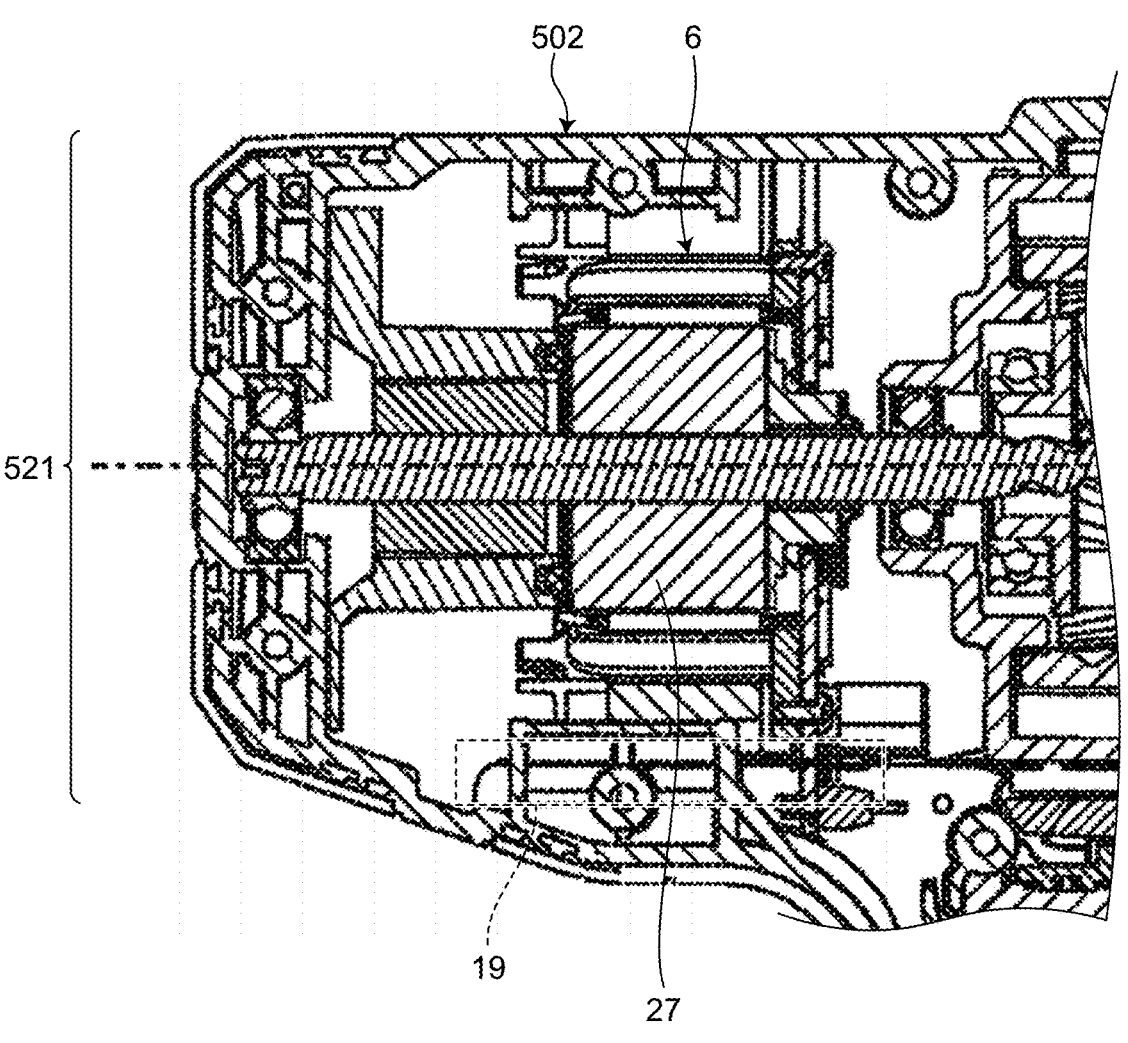
FIG. 45 is a view illustrating a control circuit board disposed in an internal space of a motor housing part according to the embodiment.
Figure 46:
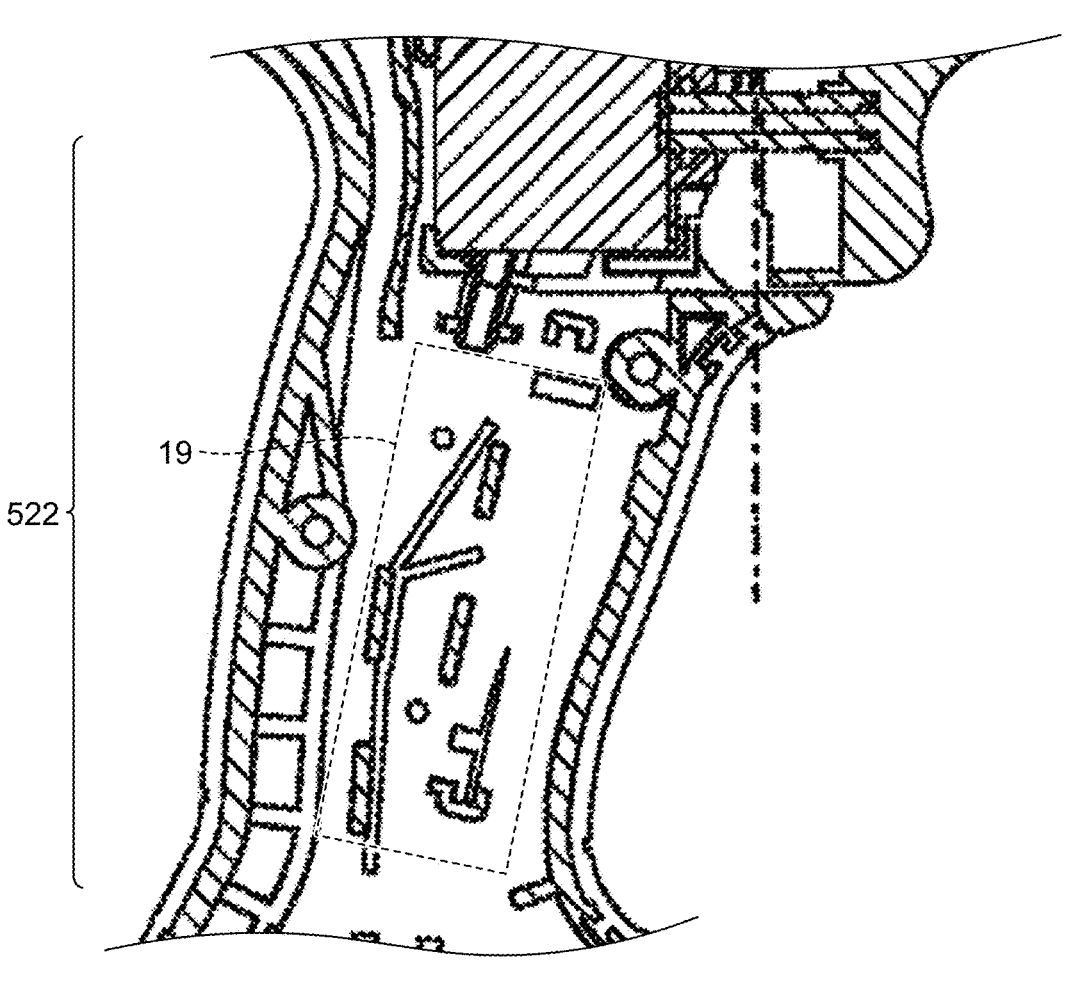
FIG. 46 is a view illustrating the control circuit board disposed in an internal space of a grip part according to the embodiment.
Figure 47:
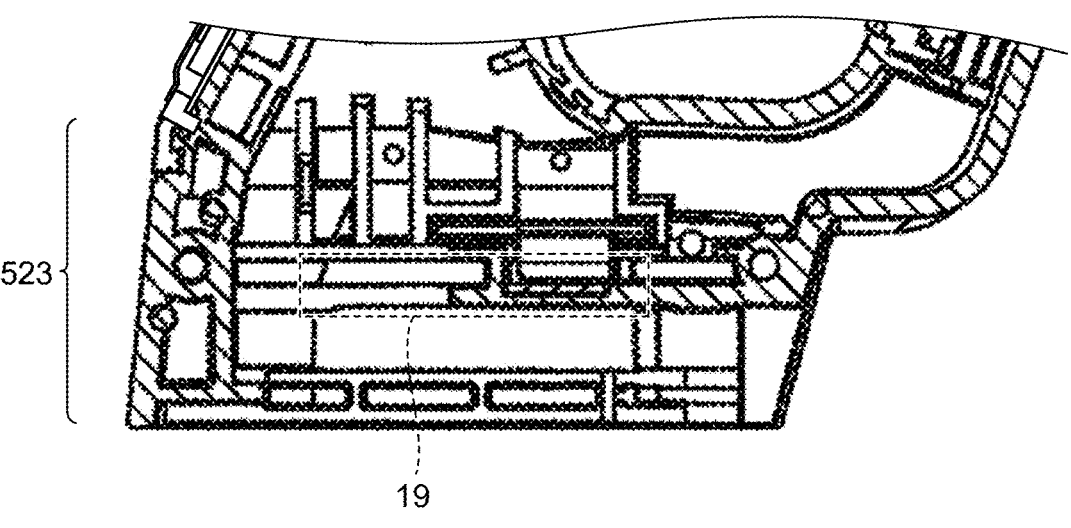
FIG. 47 is a view illustrating the control circuit board disposed in an internal space of a battery holding part according to the embodiment.
Figure 48:
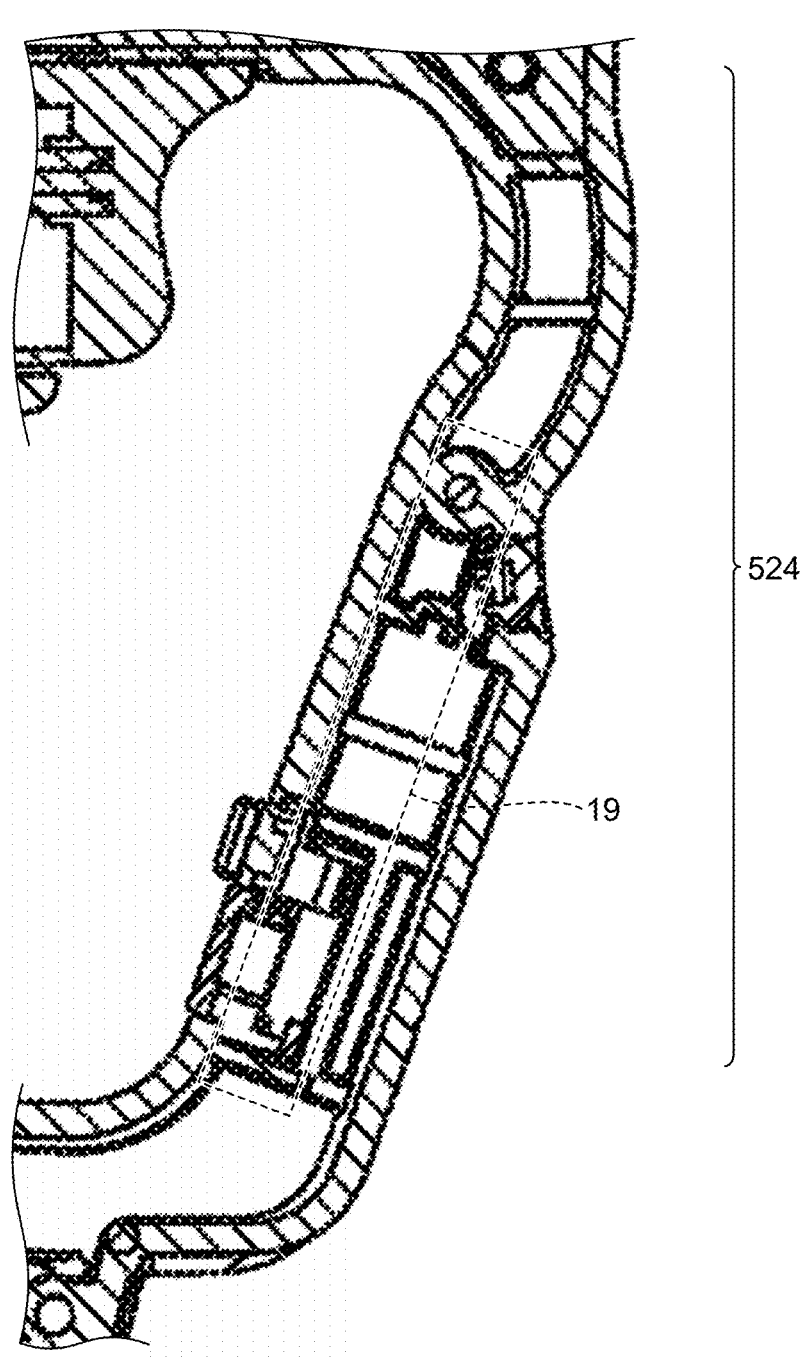
FIG. 48 is a view illustrating the control circuit board disposed in an internal space of a support part according to the embodiment.

FIG. 45 is a view illustrating the control circuit board 19 disposed in the internal space of the motor housing part 521 according to the embodiment. FIG. 46 is a view illustrating the control circuit board 19 disposed in the internal space of the grip part 522 according to the embodiment. FIG. 47 is a view illustrating the control circuit board 19 disposed in the internal space of the battery holding part 523 according to the embodiment. FIG. 48 is a view illustrating the control circuit board 19 disposed in the internal space of the support part 524 according to the embodiment.

In the embodiment, the anvil 510 has a quadrangular prism shape on which a socket is mounted. The power tool 1J is an impact wrench.

Modifications

In the above-described embodiment, the panel 55 may be made of metal. In a case where the panel 55 is made of metal, even when an impact is exerted on the panel 55 due to, for example, fall of the impact tool 1, breakage of the panel 55 is suppressed.

In the above-described embodiment, the anvil 10 has the hexagonal tool hole 10A that holds the accessory tool (bit). The anvil 10 may have a quadrangular prism shape on which a socket is mounted. The power tool may be an impact wrench.

In the above-described embodiment, the power tool 1 may be at least one of an impact driver, a hammer, a hammer drill, a driver drill, an angle drill, a grinder, a circular saw, or a reciprocating saw.

In the above-described embodiment, a power supply of the power tool 1 does not have to be the battery pack 25, and may be a commercial power supply (AC power supply).

According to the present teachings disclosed herein, the number of components of the power tool is reduced. Further, according to the present teachings disclosed herein, an increase in size of the power tool is suppressed. Still further, according to the present teaching disclosed herein, the visibility of the panel of the operation-and-display part is improved, and the durability of the panel of the operation-and-display part is improved.

Additional aspects of the present teachings include, but are not limited to:

A1. A power tool comprising:

a motor;

a battery mounting part, which includes a body-side terminal through which electric power from a battery is supplied; and a panel that is manipulated to change a control method of the motor, wherein a resin part that supports the panel includes the body-side terminal.

A2. The power tool according to the above aspect A1, wherein the panel is in contact with the resin part.

A3. The power tool according to the above aspect A1, wherein the panel is fixed to the resin part.

A4. The power tool according to the above aspect A1, wherein the panel faces a circuit board, and the resin part holds the circuit board.

A5. The power tool according to the above aspect A4, wherein the panel includes an elastically deformable part, and the circuit board supports a switching element that is manipulated by the elastically deformable part being pressed.

A6. The power tool according to the above aspect A4, wherein the panel includes an optically transmissive part, and the circuit board supports a light emitting element that irradiates the optically transmissive part with light.

A7. The power tool according to the above aspect A1, further comprising:

a control circuit board configured to control the motor; and a housing that houses the control circuit board, wherein the housing includes a left housing and a right housing fixed to the left housing by a screw.

A8. The power tool according to the above aspect A7, wherein the housing includes a motor housing part that houses the motor, a grip part that extends downward from the motor housing part, and a battery holding part that is connected to a lower end of the grip part, the battery mounting part is disposed at a lower portion of the battery holding part, and the panel is disposed on the battery holding part.

A9. The power tool according to the above aspect A8, further comprising a trigger lever, which is provided at a front portion of the grip part and is manipulated to start the motor, wherein the panel is disposed at a rear portion of the battery holding part.

A10. The power tool according to the above aspect A9, wherein the panel is disposed in a recess provided in the battery holding part.

A11. The power tool according to the above aspect A9, wherein in a left-right direction, a center of the panel coincides with a center of the battery holding part.

A12. The power tool according to the above aspect A8, wherein
the panel is disposed rearward of a rear end of the grip part.

A13. The power tool according to the above aspect A8, wherein
the panel is disposed rearward of a rear end of the motor housing part.

A14. The power tool according to the above aspect A8, wherein
the control circuit board is housed in the battery holding part.

A15. The power tool according to the above aspect A14, wherein
a rear end of the control circuit board is positioned rearward of a rear end of the grip part.

A16. The power tool according to the above aspect A14, wherein
the panel is disposed rearward of the control circuit board.

A17. The power tool according to the above aspect A1, wherein
a surface of the panel is inclined downward as the surface goes rearward.

A18. The power tool according to the above aspect A1, wherein
a dimension of the panel in a left-right direction is larger than a dimension of the panel in an up-down direction.

A19. The power tool according to the above aspect A4, wherein
a surface of the circuit board is inclined downward as the surface goes rearward.

A20. The power tool according to the above aspect A14, wherein
a surface of the control circuit board is parallel to a motor rotation axis.

B1. A power tool comprising:
a motor;
a control circuit board configured to control the motor; and
a panel that is manipulated to change a control method of the motor, wherein
a resin part that supports the panel includes the control circuit board.

B2. The embedded-object scanner device according to the above aspect B1, wherein
the panel is in contact with the resin part.

B3. The power tool according to the above aspect B1, wherein
the panel is fixed to the resin part.

B4. The power tool according to the above aspect B1, wherein
the panel faces a circuit board, and
the resin part holds the circuit board.

B5. The power tool according to the above aspect B4, wherein
the panel includes an elastically deformable part, and
the circuit board supports a switching element that is manipulated by the elastically deformable part being pressed.

B6. The power tool according to the above aspect B4, wherein
the panel includes an optically transmissive part, and
the circuit board supports a light emitting element that irradiates the optically transmissive part with light.

B7. The power tool according to the above aspect B1, further comprising
a housing that houses the control circuit board, wherein
the housing includes a left housing and a right housing fixed to the left housing by a screw.

B8. The power tool according to the above aspect B7, wherein
the housing includes
a motor housing part that houses the motor,
a grip part that extends downward from the motor housing part, and
a battery holding part, which is connected to a lower end of the grip part and to which a battery for supplying electric power to the motor is attached, and
the panel is disposed on the battery holding part.

B9. The power tool according to the above aspect B8, further comprising
a trigger lever, which is provided at a front portion of the grip part and is manipulated to start the motor, wherein
the panel is disposed at a rear portion of the battery holding part.

B10. The power tool according to the above aspect B9, wherein
the panel is disposed in a recess provided in the battery holding part.

B11. The power tool according to the above aspect B9, wherein
in a left-right direction, a center of the panel coincides with a center of the battery holding part.

B12. The power tool according to the above aspect B8, wherein
the panel is disposed rearward of a rear end of the grip part.

B13. The power tool according to the above aspect B8, wherein
the panel is disposed rearward of a rear end of the motor housing part.

B14. The power tool according to the above aspect B8, wherein
the control circuit board is housed in the battery holding part.

B15. The power tool according to the above aspect B14, wherein
a rear end of the control circuit board is positioned rearward of a rear end of the grip part.

B16. The power tool according to the above aspect B14, wherein
the panel is disposed rearward of the control circuit board.

B17. The power tool according to the above aspect B1, wherein
a surface of the panel is inclined downward as the surface goes rearward.

B18. The power tool according to the above aspect B1, wherein
a dimension of the panel in a left-right direction is larger than a dimension of the panel in an up-down direction.

B19. The power tool according to the above aspect B4, wherein
a surface of the circuit board is inclined downward as the surface goes rearward.

B20. The power tool according to the above aspect B14, wherein
a surface of the control circuit board is parallel to a motor rotation axis.

C1. A power tool comprising:

a motor, which includes a rotor rotatable about a motor rotation axis extending in a front-rear direction;

an output part, which is disposed forward of the motor and is rotated by a rotational force of the rotor;

a housing that includes a motor housing part that houses the motor, a grip part that extends downward from the motor housing part, and a battery holding part that is connected to a lower end of the grip part;

a control circuit board, which is housed in the grip part and is configured to control the motor; and a panel, which is disposed at a rear portion of the battery holding part and is manipulated to change a control method of the motor.

C2. The power tool according to the above aspect C1, further comprising a resin part that supports the panel.

C3. The power tool according to the above aspect C2, wherein the panel is in contact with the resin part.

C4. The power tool according to the above aspect C2, wherein the panel is fixed to the resin part.

C5. The power tool according to the above aspect C2, wherein the panel faces a circuit board, and the resin part holds the circuit board.

C6. The power tool according to the above aspect C5, wherein the panel includes an elastically deformable part, and the circuit board supports a switching element that is manipulated by the elastically deformable part being pressed.

C7. The power tool according to the above aspect C5, wherein the panel includes an optically transmissive part, and the circuit board supports a light emitting element that irradiates the optically transmissive part with light.

C8. The power tool according to the above aspect C1, wherein the housing includes a left housing and a right housing fixed to the left housing by a screw.

C9. The power tool according to the above aspect C1, further comprising a battery mounting part, which includes a body-side terminal through which electric power from a battery is supplied, wherein the battery mounting part is disposed at a lower portion of the battery holding part.

C10. The power tool according to the above aspect C1, further comprising a trigger lever, which is provided at a front portion of the grip part and is manipulated to start the motor.

C11. The power tool according to the above aspect C1, wherein the panel is disposed in a recess provided in the battery holding part.

C12. The power tool according to the above aspect C1, wherein in a left-right direction, a center of the panel coincides with a center of the battery holding part.

C13. The power tool according to the above aspect C1, wherein the panel is disposed rearward of a rear end of the grip part.

C14. The power tool according to the above aspect C1, wherein the panel is disposed rearward of a rear end of the motor housing part.

C15. The power tool according to the above aspect C14, wherein a rear end of the control circuit board is positioned forward of a front end of the battery holding part.

C16. The power tool according to the above aspect C1, wherein the panel is disposed rearward of the control circuit board.

C17. The power tool according to the above aspect C1, wherein a surface of the panel is inclined downward as the surface goes rearward.

C18. The power tool according to the above aspect C1, wherein a dimension of the panel in a left-right direction is larger than a dimension of the panel in an up-down direction.

C19. A power tool comprising:

a motor, which includes a rotor rotatable about a motor rotation axis extending in a front-rear direction;

a speed reducing mechanism configured to decelerate rotation input from the motor;

an output part configured to be driven with an output of the speed reducing mechanism;

a housing, which includes a motor housing part that houses the motor, a grip part that extends downward from the motor housing part, a support part that is disposed forward of the grip part, and a battery holding part, which is disposed downward of the support part and to which a battery pack is connected by being slid;

a control circuit board, which is housed in the housing and is configured to control the motor; and a panel, which is disposed at either or both of a lower portion of the grip part and a rear portion of the battery holding part and is manipulated to change a control method of the motor.

C20. The power tool according to the above aspect C19, wherein the control circuit board is housed in the grip part, the support part, or the battery holding part.

D1. A power tool comprising:

a motor;

a motor housing part that houses the motor;

a grip part that extends from the motor housing part;

a battery holding part to which a battery for supplying electric power to the motor is attached;

an elastic body that is disposed between the grip part and the battery holding part; and a panel, which is disposed at a rear portion of the battery holding part and is manipulated to change a control method of the motor.

D2. The power tool according to the above aspect D1, further comprising a light that is disposed at a front portion of the battery holding part.

D3. The power tool according to the above aspect D1, further comprising a resin part that supports the panel.

D4. The power tool according to the above aspect D3, wherein the panel is in contact with the resin part.

D5. The power tool according to the above aspect D3, wherein the panel is fixed to the resin part.

D6. The power tool according to the above aspect D3, wherein the panel faces a circuit board, and the resin part holds the circuit board.

D7. The power tool according to the above aspect D6, wherein the panel includes an elastically deformable part, and the circuit board supports a switching element that is manipulated by the elastically deformable part being pressed.

D8. The power tool according to the above aspect D6, wherein the panel includes an optically transmissive part, and the circuit board supports a light emitting element that irradiates the optically transmissive part with light.

D9. The power tool according to the above aspect D1, further comprising a battery mounting part, which includes a body-side terminal through which electric power from a battery is supplied, wherein the battery mounting part is disposed at the battery holding part.

D10. The power tool according to the above aspect D1, further comprising a trigger lever, which is provided at a front portion of the grip part and is manipulated to start the motor.

D11. The power tool according to the above aspect D1, wherein the panel is disposed in a recess provided in the battery holding part.

D12. The power tool according to the above aspect D1, wherein in a left-right direction, a center of the panel coincides with a center of the battery holding part.

D13. The power tool according to the above aspect D1, wherein the panel is disposed rearward of a rear end of the grip part.

D14. The power tool according to the above aspect D1, wherein the panel is disposed rearward of a rear end of the motor housing part.

D15. The power tool according to the above aspect D1, further comprising a control circuit board configured to control the motor, wherein the circuit board is housed in the battery holding part.

D16. The power tool according to the above aspect D15, wherein a rear end of the control circuit board is positioned rearward of a rear end of the grip part.

D17. The power tool according to the above aspect D16, wherein the panel is disposed rearward of the control circuit board.

D18. The power tool according to the above aspect D1, wherein a surface of the panel is inclined downward as the surface goes rearward.

D19. The power tool according to the above aspect D1, wherein a dimension of the panel in a left-right direction is larger than a dimension of the panel in an up-down direction.

D20. The power tool according to the above aspect D6, wherein a surface of the circuit board is inclined downward as the surface goes rearward.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power tool comprising:

a motor, which includes a rotor rotatable about a motor rotation axis extending in a front-rear direction;

an output part, which is disposed forward of the motor and is rotated by a rotational force of the rotor;

a housing that includes a motor housing part that houses the motor, a grip part that extends downward from the motor housing part, and a battery holding part that is connected to a lower end of the grip part;

a control circuit board, which is housed in the grip part and is configured to control the motor; and a panel, which is disposed at a rear portion of the battery holding part and is manipulated to change a control method of the motor, wherein the control circuit board includes:

a motor terminal connected to the motor; and a body-side terminal to which a battery pack is connected.

2. The power tool according to claim 1, further comprising a resin part that supports the panel.

3. The power tool according to claim 2, wherein the panel is in contact with the resin part.

4. The power tool according to claim 2, wherein the panel is fixed to the resin part.

5. The power tool according to claim 2, wherein the panel faces a circuit board, and the resin part holds the circuit board.

6. The power tool according to claim 5, wherein the panel includes an optically transmissive part, and the circuit board supports a light emitting element that irradiates the optically transmissive part with light.

7. The power tool according to claim 1, wherein in a left-right direction, a center of the panel coincides with a center of the battery holding part.

8. The power tool according to claim 1, wherein the panel is disposed rearward of a rear end of the grip part.

9. The power tool according to claim 1, wherein the panel is disposed rearward of a rear end of the motor housing part.

10. The power tool according to claim 9, wherein a rear end of the control circuit board is positioned forward of a front end of the battery holding part.

11. The power tool according to claim 1, wherein the panel is disposed rearward of the control circuit board.

12. The power tool according to claim 1, wherein a surface of the control circuit board extends along a direction in which the grip part extends.

13. A power tool comprising:

a motor, which includes a rotor rotatable about a motor rotation axis extending in a front-rear direction;

a speed reducing mechanism configured to decelerate rotation input from the motor;

a hammer configured to be rotated with an output of the speed reducing mechanism;

an output part configured to be rotated tother with the hammer and to be impacted in a rotation direction by the hammer;

a housing, which includes a motor housing part that houses the motor, a hammer housing part that houses a hammer, a grip part that extends downward from the motor housing part, a support part that is disposed forward of the grip part and that extends downward from the hammer housing part, and a battery holding part, which is connected to a lower end portion of the support part and to which a battery pack is connected by being slid; and a control circuit board, which is housed in the housing and is configured to control the motor; and a panel, which is disposed at either or both of a lower portion of the grip part and a rear portion of the battery holding part and is manipulated to change a control method of the motor.

14. The power tool according to claim 13, wherein the control circuit board is housed in the grip part, the support part, or the battery holding part.

15. A power tool comprising:

a motor;

a motor housing part that houses the motor;

a grip part that extends from the motor housing part;

a battery holding part to which a battery for supplying electric power to the motor is attached, the battery holding part and the grip part being formed as separate parts;

an elastic body that is sandwhiched between the grip part and the battery holding part to directly contact with the grip part and the battery holding part; and a panel, which is disposed at a rear portion of the battery holding part and is manipulated to change a control method of the motor.

16. The power tool according to claim 15, further comprising a light that is disposed at a front portion of the battery holding part.

17. The power tool according to claim 15, wherein the panel faces a circuit board, and a resin part holds the circuit board such that the circuit board is fixed to the battery holding part via the resin part.

18. The power tool according to claim 17, wherein a surface of a motor control circuit board is inclined downward as the surface goes rearward.

19. The power tool according to claim 15, wherein a motor control circuit board is housed in the battery holding part.

20. The power tool according to claim 15, wherein a rear end of a motor control circuit board is positioned rearward of a rear end of the grip part.

* * * * *